US006719327B2

(12) United States Patent
Yamaguchi et al.

(10) Patent No.: US 6,719,327 B2
(45) Date of Patent: Apr. 13, 2004

(54) METER COVER STRUCTURE

(75) Inventors: Seiji Yamaguchi, Saitama (JP); Masamoto Ito, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 33 days.

(21) Appl. No.: 10/219,763

(22) Filed: Aug. 16, 2002

(65) Prior Publication Data
US 2003/0052482 A1 Mar. 20, 2003

(30) Foreign Application Priority Data
Sep. 17, 2001 (JP) ........................... 2001-282457

(51) Int. Cl.$^7$ ............................................... B60P 3/22
(52) U.S. Cl. ........................................................... 280/833
(58) Field of Search ............................ 220/86.1, 86.2, 220/562, DIG. 33, 327; 280/833, 835; 180/219

(56) References Cited

U.S. PATENT DOCUMENTS

| | | | | |
|---|---|---|---|---|
| 3,944,009 A | * | 3/1976 | Katagiri | ........................ 180/219 |
| 6,237,710 B1 | * | 5/2001 | Mori et al. | ................. 180/219 |
| 6,253,790 B1 | * | 7/2001 | Hara | ........................ 137/565.17 |
| 6,497,300 B2 | * | 12/2002 | Mori et al. | ................. 180/219 |

FOREIGN PATENT DOCUMENTS

JP     2000-128052 A     5/2000

* cited by examiner

*Primary Examiner*—Lesley D. Morris
*Assistant Examiner*—Paul Royal
(74) *Attorney, Agent, or Firm*—Birch, Stewart, Kolasch & Birch, LLP

(57) ABSTRACT

To provide a meter cover structure capable of enhancing the visibility of a meter, and preventing, even if an object comes in contact with a meter cover, the meter from being damaged by the contact with the object. A meter cover structure includes a meter, and a meter cover disposed over a fuel tank. The meter cover has an opening portion in which the meter is disposed. A chamfer portion having a linear cross-section tilted downwardly toward the front side is formed at an edge portion, on the rear side of the opening portion, of the meter cover. An upper surface portion of the meter is tilted such that a tilting angle of the upper surface portion of the meter with respect to the chamfer portion of the meter cover is different from a tilting angle of the upper surface portion of the meter with respect to an upper surface portion, continuous to the rear end of the chamfer portion, of the meter cover.

14 Claims, 41 Drawing Sheets

METER COVER STRUCTURE

CROSS-REFERENCE TO RELATED APPLICATIONS

The present application claims priority under 35 USC 119 to Japanese Patent Application No. 2001-282457 filed on Sep. 17, 2001 the entire contents thereof is hereby incorporated by reference.

BACKGROUND OF THE INVENTION

1. Field of the Invention

The present invention relates to a meter cover structure, provided for a fuel tank, of a motorcycle or the like.

2. Description of Background Art

Meter cover structures, provided for fuel tanks, of motorcycles have been disclosed, for example, in Japanese Patent Laid-open No. 2000-128052. The meter cover structure described in this document includes a meter, and a meter cover disposed over a tank that includes an opening portion in which the meter is disposed. A planar portion is provided having an approximately circular-arc cross-section and is formed on a portion on the rear side of the opening portion of the meter cover and a portion, immediately behind the opening portion, of the planar portion is disposed substantially within the same plane as that of an upper surface portion of the meter so as to be continuous thereto.

The related art meter cover structure, however, has a problem. Since the portion, immediately behind the opening portion, of the meter cover is disposed substantially within the same plane as that of the upper surface portion of the meter, if a plating member is used as the meter cover, there may occur a reflection of light from the meter cover, and if an object is brought into contact with the meter cover, the meter may be often damaged by contact with the object.

SUMMARY AND OBJECTS OF THE INVENTION

Accordingly, an object of the present invention is to provide a meter cover structure capable of further improving the visibility of a meter and preventing, if an object is brought into contact with a meter cover, the meter from being damaged by contact with the object.

To achieve the above object, there is provided a meter cover structure including a meter (for example, a meter 625 in an embodiment), and a meter cover (for example a meter cover 621 in the embodiment) disposed over a fuel tank (for example, a fuel tank 14 in the embodiment). The meter cover includes an opening portion (for example, an opening 622 in the embodiment) in which the meter is disposed. A chamfer portion (for example, a chamfer portion 627 in the embodiment) is provided having a linear cross-section tilted downwardly toward the front side is formed at an edge portion (for example, an edge portion 626 in the embodiment), on the rear side of the opening portion, of the meter cover. An upper surface portion (for example, an upper surface portion 628 in the embodiment) of the meter is tilted such that a tilting angle of the upper surface portion of the meter with respect to the chamfer portion of the meter cover is different from a tilting angle of the upper surface portion of the meter with respect to an upper surface portion (for example, an upper surface portion 632 in the embodiment), continuous to the rear end of the chamfer portion, of the meter cover.

With this configuration, the chamfer portion having the linear cross-section tilted downwardly toward the front side is formed at the edge portion, on the rear side of the opening portion, of the meter cover, and the upper surface portion of the meter is tilted such that the tilting angle of the upper surface portion of the meter with respect to the chamfer portion of the meter cover is different from the tilting angle of the upper surface portion of the meter with respect to the upper surface portion, continuous to the rear end of the chamfer portion, of the meter cover. As a result, even if light is reflected from both the chamfer portion of the meter cover and the upper surface portion, continuous to the rear end of the chamfer portion, of the meter cover, it is possible to ensure the enhanced visibility of the meter. Also since the upper surface portion of the meter is not disposed within the same plane as that of each of the chamfer portion and the upper surface portion continuous to the rear end of the chamfer portion, even if an object comes in contact with the meter cover, the meter can be prevented from being brought into contact with the object.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, one embodiment of the present invention will be described with reference to the drawings. In the description, the terms "front", "rear", "left", and "right" represent directions as viewed from a driver.

Figure 1:
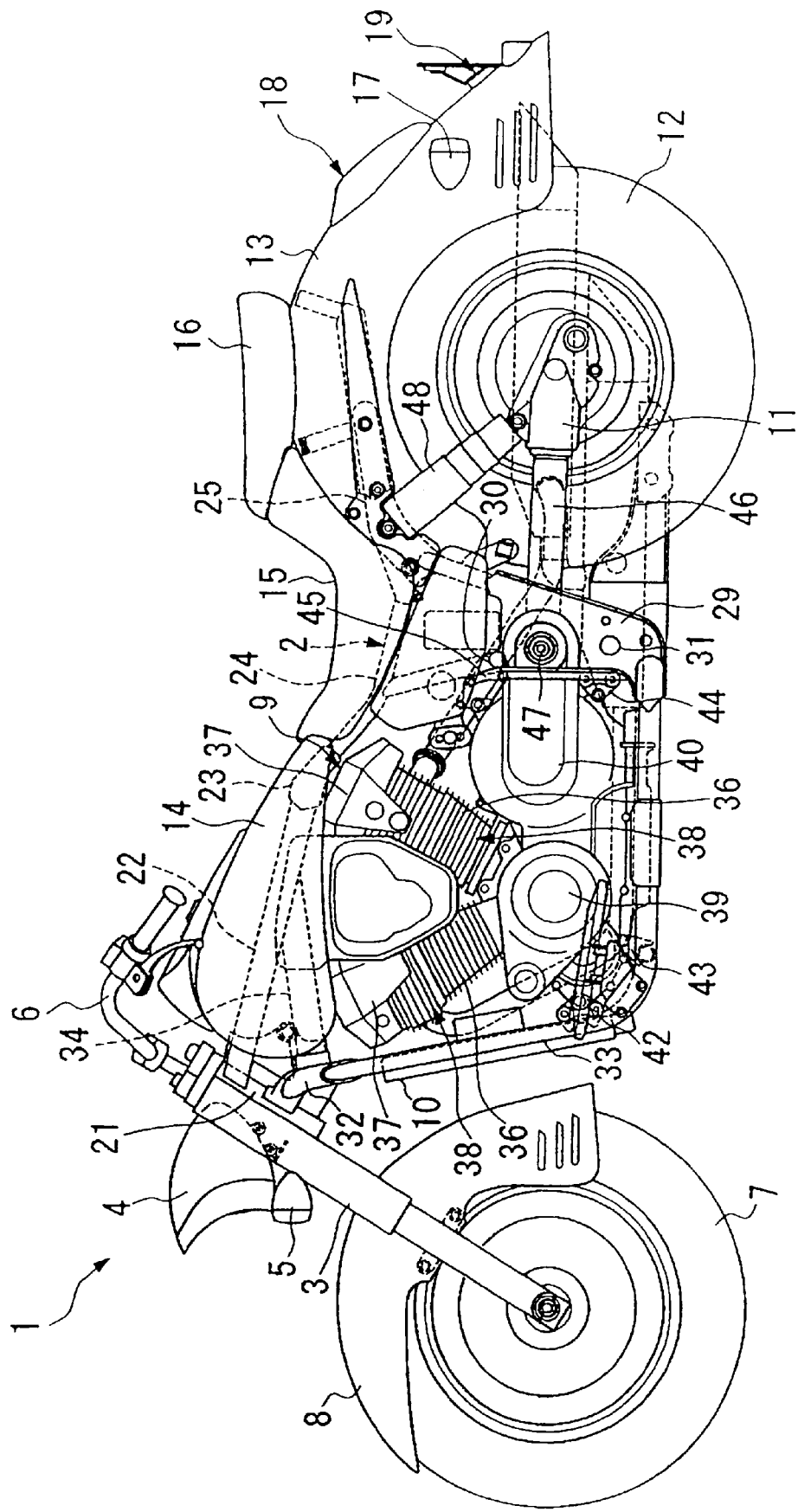
FIG. 1 is a side view showing a motorcycle to which one embodiment of the present invention is applied.

FIG. 1 is a side view showing an entire configuration of a motorcycle to which the present invention is applied.

A motorcycle 1, which is of a so-called American type, includes a body frame 2. A pair of left and right front fork portions 3 are turnably supported by a front end portion of the body frame 2. A headlamp 4 is provided on upper portions of these front forked portions 3. A pair of left and right front winkers 5 are provided on the front forked portions 3 at positions lower than the position of the headlamp 4. A steering handlebar 6 is mounted to upper end portions of the front forked portions 3 in such a manner as to be located over a front portion of the vehicular body.

A front wheel 7 is rotatably supported by the front forked portions 3 of the motorcycle 1. A front fender 8 for covering the upper side of the front wheel 7 is supported by the front forked portions 3. An engine 9 is supported by the body frame 2, and a radiator 10 is disposed in front of the engine 9. On a rear portion of the vehicular body, a rear swing arm portion 11 is supported by the body frame 2 in such a manner as to be swingable around its axial line extending in the lateral direction of the vehicular body. A rear wheel 12 is rotatably suspended from a rear end portion of the rear swing arm portion 11, which rear wheel is rotatable by a drive force supplied from the engine 9.

A tear-drop type fuel tank 14 is disposed on an upper portion of the body frame 2 of the motorcycle 1. A main seat 15 for a driver is disposed at the back of the fuel tank 14, and a pillion seat 16 for a passenger is provided on a rear fender 13 behind the main seat 15. A pair of left and right rear winkers 17 are provided on a rear portion of the rear fender 13. A brake lamp 18 is provided at a central portion of the rear portion of the rear fender 13. A license plate mounting portion 19 is provided at a rear end portion of the rear fender 13.

Figure 2:
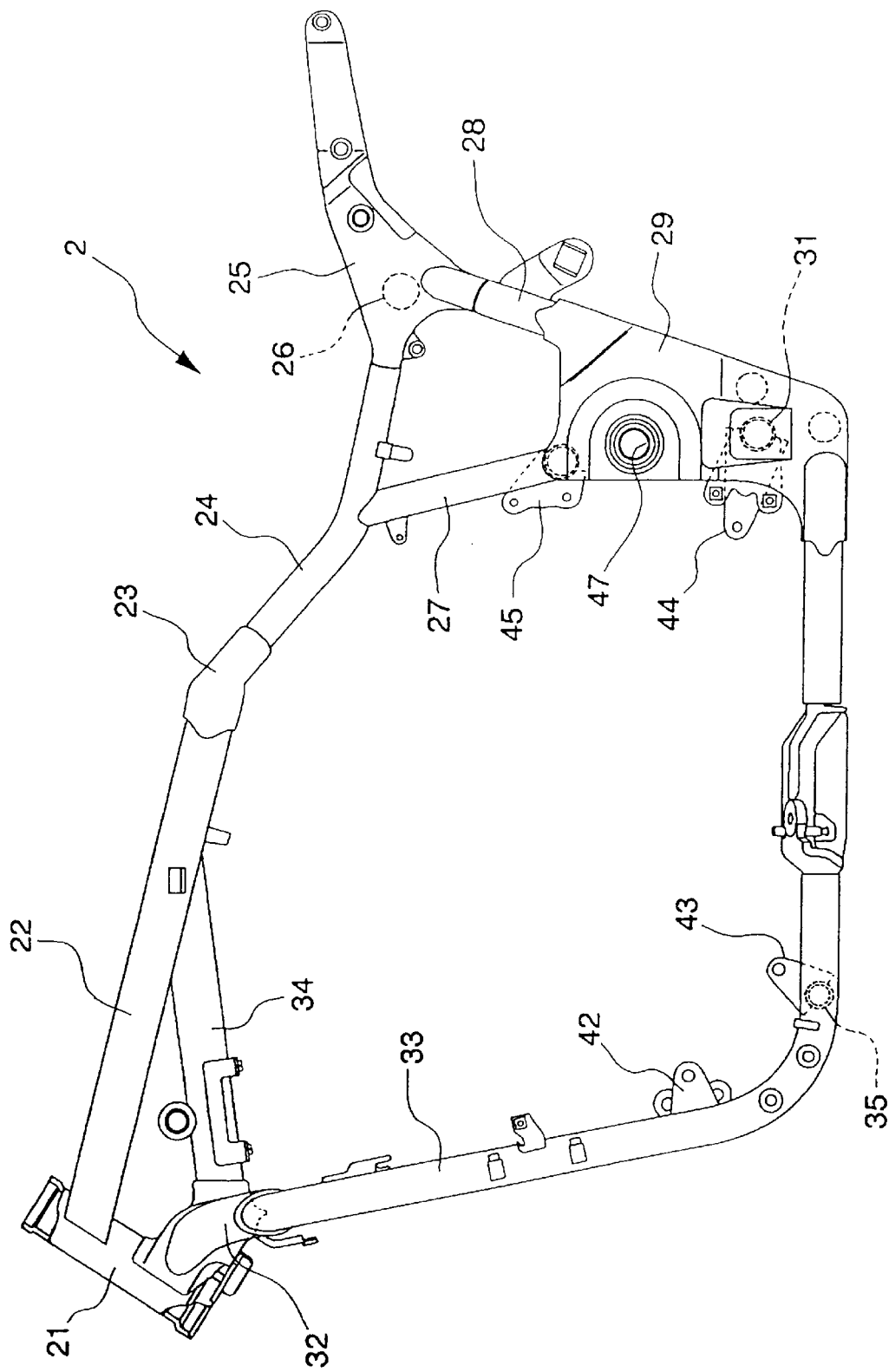
FIG. 2 is a side view showing a body frame of the motorcycle to which the embodiment of the present invention is applied.
Figure 3:
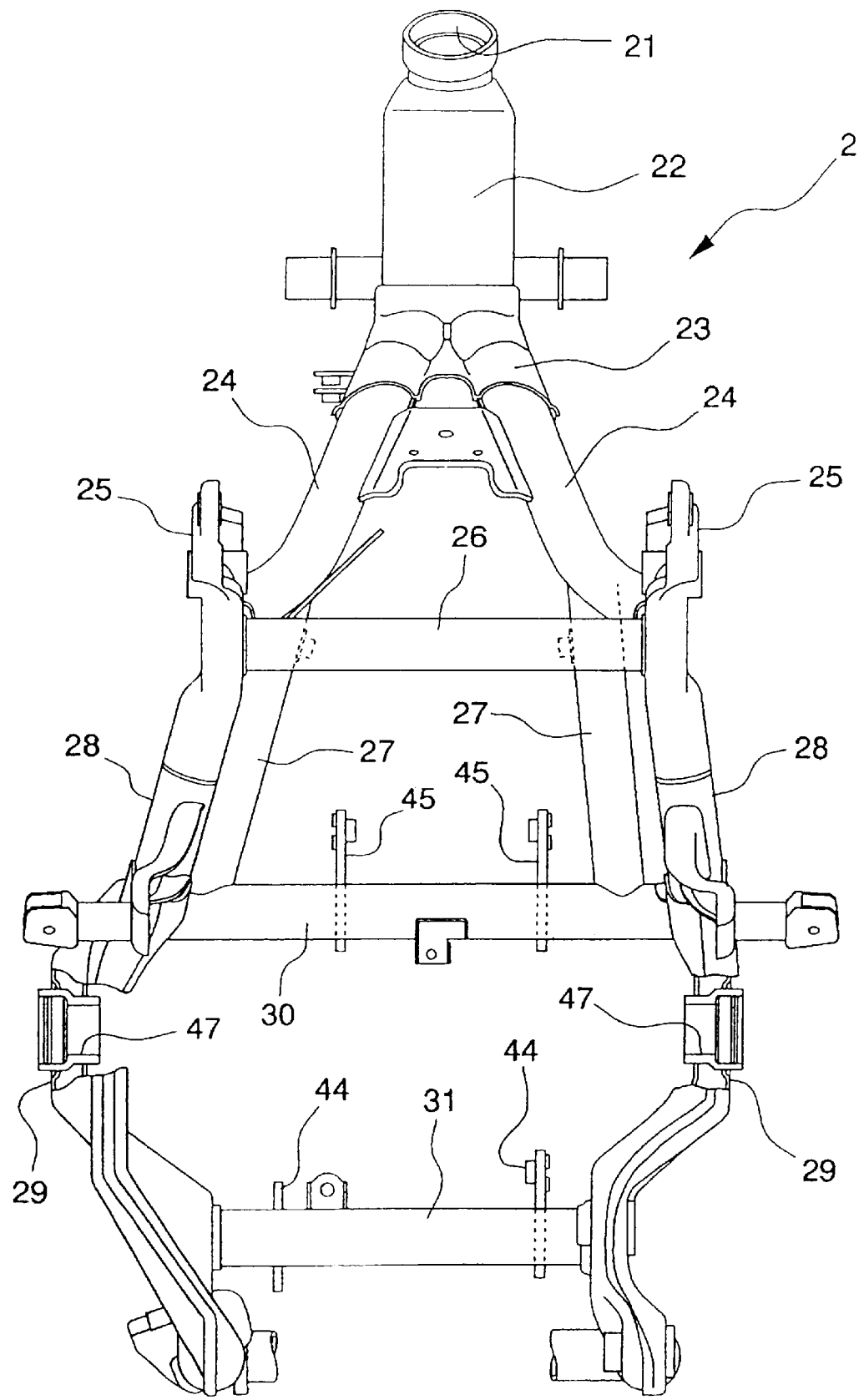
FIG. 3 is a back view showing the body frame of the motorcycle to which the embodiment of the present invention is applied.

As shown in FIGS. 2 and 3, the body frame 2 includes at its front end a head pipe 21, and a main pipe 22 extending rearwardly from an upper portion of the head pipe 21. An upper pipe joint 23 is welded to a rear portion of the main pipe 22. A pair of left and right center upper pipes 24 are branched leftwardly and rightwardly from the upper pipe joint 23 and extend rearwardly therefrom. A pair of left and right rear brackets 25 are connected to the pair of left and right center upper pipes 24, respectively. A rear cross pipe 26 is provided for connecting the pair of left and right rear brackets 25 to each other. A center pipe 27 extends downwardly from each of the center upper pipes 24. A rear pipe 28 extends downwardly from each of the rear brackets 25. A pair of left and right pivot plates 29 are provided such that the left pivot plate 29 is connected to the lower sides of the left center pipe 27 and the left rear pipe 28 and the right pivot plate 29 is connected to the lower sides of the right center pipe 27 and the right rear pipe 28. A cross pipe 30 is provided for connecting upper portions of the pair of left and right pivot plates 29 to each other. A cross pipe 31 is provided for connecting the lower portions of the left and right pivot plates 29 to each other. A gusset 32 is welded to a lower portion of the head pipe 21. A pair of left and right down pipes 33 are branched leftwardly and rightwardly from the gusset 32. Each of the down pipes 33 is composed of a curved pipe, which has a front portion extending downwardly, slightly obliquely rearwardly from the gusset 32, and a rear portion extending rearwardly from a lower end of the front portion substantially in the horizontal direction and being connected to the pivot plate 29. A sub-pipe 34 is provided for connecting the gusset 32 to the lower side of the main pipe 22. A front cross pipe 35 is provided for connecting the pair of left and right down pipes 33 to each other.

The engine 9 is a V-type two-cylinder/four-cycle engine having a pair of front and rear cylinder blocks 38 each having a cylinder head portion 37 and a cylinder portion 36, and a crankcase 39 provided under these cylinder blocks 38 in such a manner as to be continuous thereto. A transmission 40 is provided on the rear side of the crankcase 39 of the engine 9 in such a manner as to be continuous thereto. The engine 9 and the transmission 40 are supported by the body frame 2 in such a manner that a front portion of the crankcase 39 is connected to the down pipes 33 via brackets 42, an intermediate portion of the crankcase 39 is connected to the front cross pipe 35 via brackets 43, a rear side lower portion of the transmission 40 is connected to the cross pipe 31 via brackets 44, and a rear side upper portion of the transmission 40 is connected to the cross pipe 30 via brackets 45.

The rear swing arm portion 11 has at its front end a base from which a pair of left and right forked portions 46 extend rearwardly. The base of the rear swing arm portion 11 is pivotably supported by a pivot 47 provided in the left and right pivot plates 29, so that the rear swing arm portion 11 is vertically swingable around the pivot 47. A pair of rear cushion units 48 are interposed between the leading end sides of the rear swing arm portion 11 and the rear brackets 25 in order to absorb vibration given from a road surface to the rear wheel 12 and hence to reduce the vibration.

Figure 4:
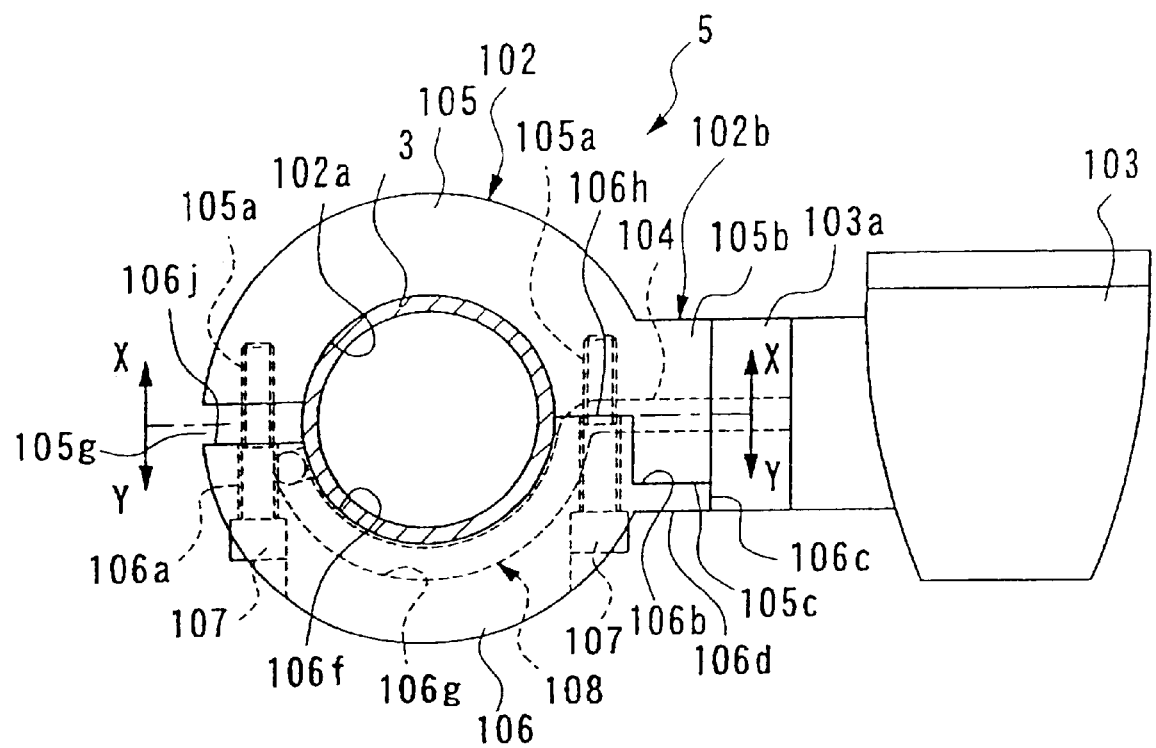
FIG. 4 is a plan view of a winker device of the motorcycle to which the embodiment of the present invention is applied.
Figure 5:
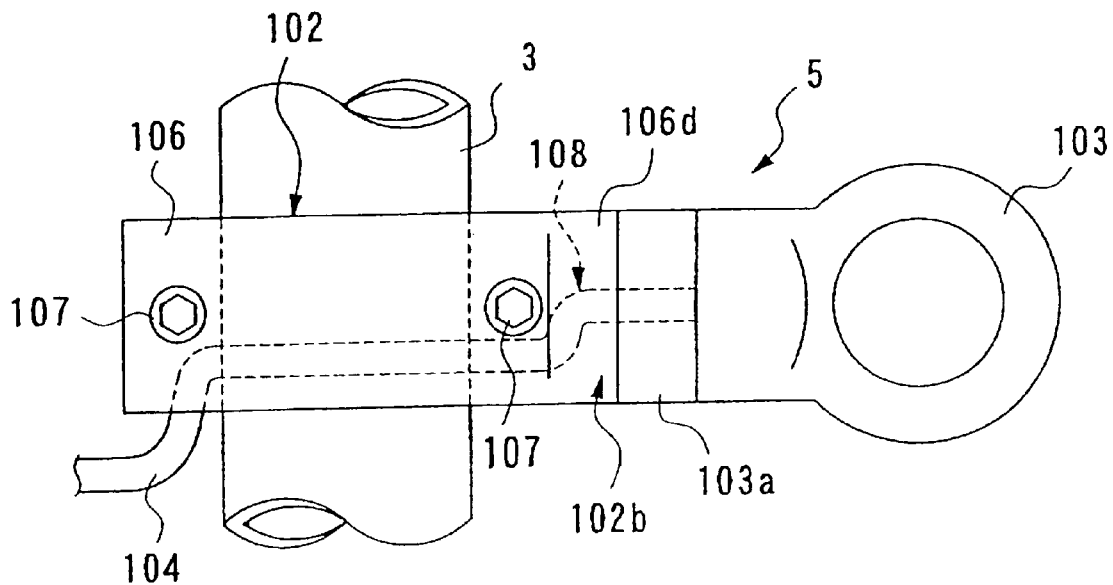
FIG. 5 is a side view of the winker device of the motorcycle to which the embodiment of the present invention is applied.

As shown in FIGS. 4 and 5, each of the front winkers (winker devices) 5 includes a winker holder 102 mounted to the front forked portion 3 of the motorcycle 1, a winker 103 supported by an outer side portion of the winker holder 102 via a winker supporting base 103a, and a winker cord 104 led outwardly from the winker 103 through the winker holder 102.

The winker holder 102 is configured as a member including a cylindrical body having a shaft hole 102a and a column-shaped projecting portion 102b projecting integrally from one side portion (outer side portion) of the cylindrical body. The shaft hole 102a has an inner diameter being approximately equal to an outer diameter of an outer peripheral portion of the front forked portion 3. Actually, the above member is substantially bisected, along a plane extending in the axial direction of the above cylindrical body, into a pair of holder members 105 and 106. One holder member 105 to be placed on the front side has, on both side end portions, threaded holes 105a, and the other holder member 106 to be located on the rear side has, on both side end portions, bolt holes 106a. The winker holder 102 is removably mounted to the front forked portion 3 by placing the holder members 105 and 106 on the front and rear sides of the front forked portion 3 with the front forked portion 3 held therebetween, and inserting two bolts 107 in the bolt holes 106a of the other holder member 106 and tightly screwing leading ends of the two bolts 107 in the threaded holes 105a of the one holder member 105.

The one holder member 105 has a projecting portion 105b (which is a major portion of the above projecting portion 102b) projecting from the outer side portion thereof. The projecting portion 105b is formed into an approximately column-shape with its portion, facing to the holder member 106, being cutaway along a cut plane 105c. The projecting portion 105b is removably connected to the winker supporting base 103a, which is adapted for supporting the winker 103, by appropriate means such as a screw, whereby the winker 103 is supported by the one holder member 105.

Figure 6:
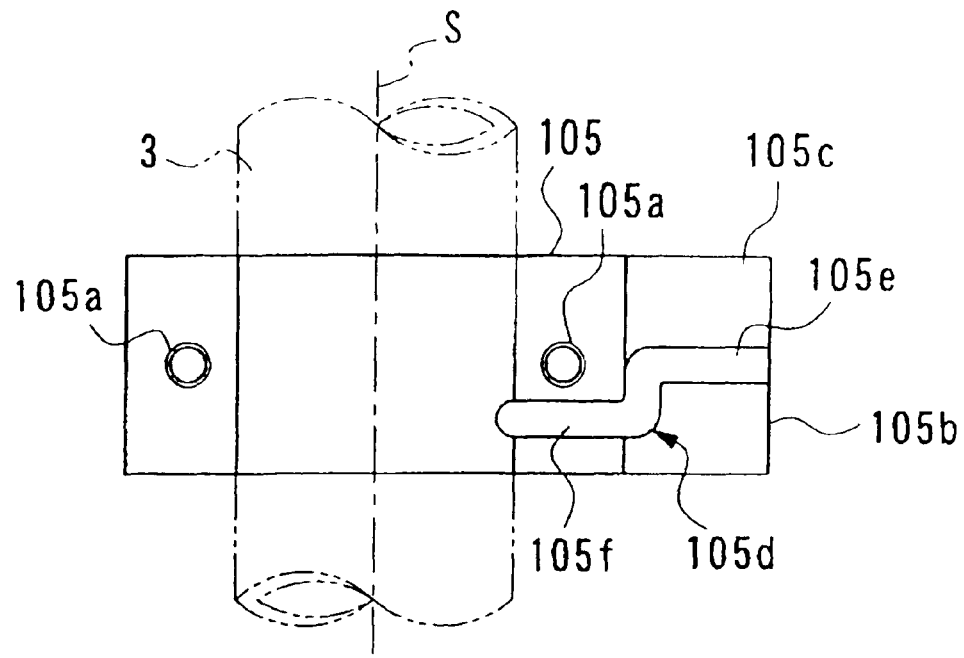
FIG. 6 is a view, seen along an arrow X–Y of FIG. 4, showing the winker device of the motorcycle to which the embodiment of the present invention is applied.

As shown in FIG. 6, the one holder member 105 has a groove 105d formed into a crank-shape in a side view. The groove 105d is opened to the outer end side (the winker supporting base 103a side) and is also opened to the other holder member 106 side. More specifically, the groove 105d extends along the axial direction of the projecting portion 105b (in a direction perpendicular to an axial direction S of the winker holder 102) to a portion near the threaded hole 105a, turns in the downward direction while bypassing the threaded hole 105a, and extends under the threaded hole 105a to an inner peripheral portion, being in contact with an outer peripheral surface of the front forked portion 3, of the holder member 105.

As illustrated in FIG. 6 a groove portion 105f extends under the threaded hole 105a, of the groove 105d. The groove portion 105f is formed into an approximately semicircular shape in transverse cross-section. As illustrated in FIG. 6 a groove portion 105e extends along the axial direction of the projecting portion 105b, of the groove 105d. The groove portion 105e may be replaced with a hole with the other holder member 106 side thereof closed. With respect to the size of the groove 105d, a width of the groove or a diameter of the hole (if replaced from the groove) is set to be slightly larger than a diameter of the winker cord 104.

Figure 7:
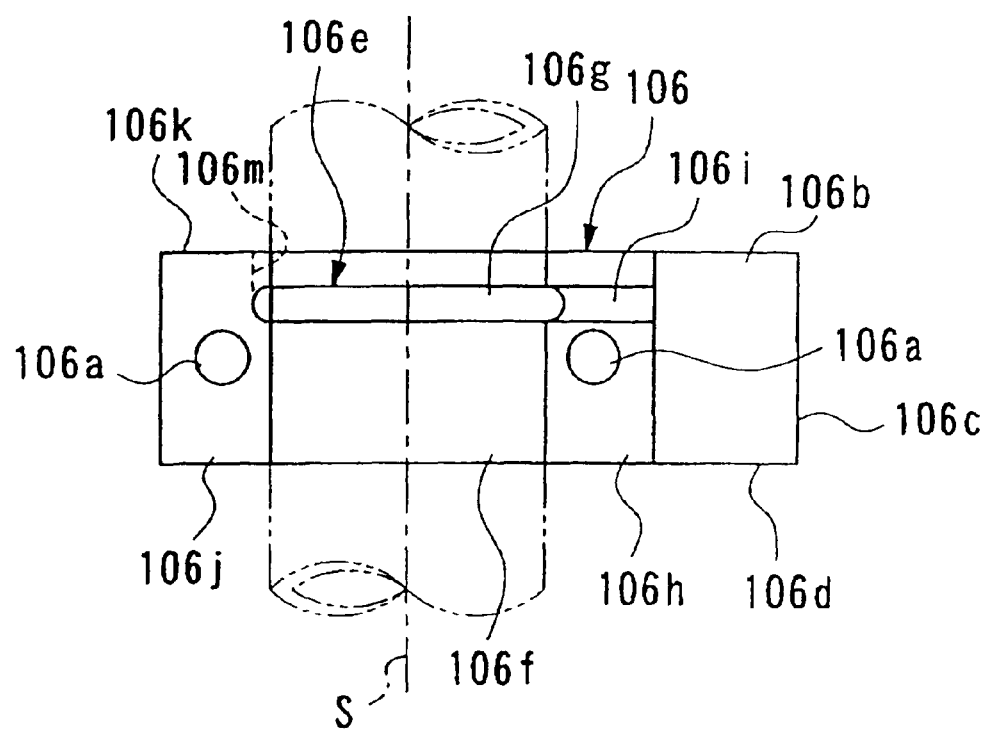
FIG. 7 is another view, seen along an arrow Y–X of FIG. 4, showing the winker device of the motorcycle to which the embodiment of the present invention is applied.

As shown in FIG. 7, the other holder member 106 has a projecting portion 106d (part of the above projecting portion 102b) projecting toward the outer end side (the winker supporting base 103a side). The projecting portion 106d has a connection plane 106b to be brought into contact with the cut plane 105c of the projecting portion 105b of the one holder member 105, and an outer end portion 106c to be brought into contact with the winker supporting base 103a. The other holder member 106b is connected to the one holder member 105b with the connection plane 106b being in contact with the cut plane 105c and the outer end portion 106c being in contact with the winker supporting base 103a, to form the column-shaped projecting portion 102b. The other holder member 106 internally has a groove 106e with its one end of the groove 106e in communication with the groove portion 105f of the one holder member 105. The groove 106e extends in a direction perpendicular to the axial direction S of the shaft hole 102a of the winker holder 102, and is opened downwardly on the other end side (opposite to the projecting portion 106d).

The configuration of the groove 106e will be more fully described below. The groove 106e has an annular groove 106g, a groove portion 106i, and a groove portion 106m. The annular groove 106g has a width and a depth each of which is slightly larger than the diameter of the winker cord 104, and extends along the circumferential direction of a circular-arc inner peripheral surface 106f, being in contact with the front forked portion 3, of the other holder member 106. The groove portion 106i is in communication with one end side (the projecting portion 106b side) of the annular groove 106g, and extends therefrom along a contact plane 106h of the other holder member 106 with the one holder member 105. The groove portion 106i has a semi-circular transverse cross-section having a diameter slightly larger than the diameter of the winker cord 104. The groove portion 106m is formed in the vicinity of an opposed plane 106j of the other holder member 106 opposed to the one holder member 105 with a gap 105g placed therebetween. An upper end (lower end in FIG. 7) of the groove portion 106m is in communication with the other end side (opposite to the projecting portion 106b) of the annular groove 106g, and a lower end (upper end in FIG. 7) of the groove portion 106m is opened in a lower end plane 106k (upper end plane in FIG. 7) of the other holder member 106. The groove portion 106m has a width and a depth each of which is slightly larger than the diameter of the winker cord 104.

The groove 105d formed in the one holder member 105 and the groove 106e formed in the other holder member 106 form a cord insertion hole 108 allowing the winker cord 104 to pass through the winker holder 102 via the cord insertion hole 108. The winker cord 104 is inserted from the winker supporting base 103a for supporting the winker 103 into an inlet of the cord insertion hole 108, that is, an inlet of the groove portion 105e of the projecting portion 105b. The winker cord 104 passes through the groove portion 105e, turns in the downward direction while bypassing the bolt hole 105a, and passes through the groove portions 105f and 106i. The winker cord 104 then passes through the annular groove 106g extending around a half of the outer peripheral portion of the front forked portion 3, and further, passes through the groove portion 106m. The winker cord 104, which has passed through the groove portion 106m, is led outwardly from the lower end of the other holder member 106, and is wired to a desired portion.

While not shown, a seal is provided between the projecting portion 102b (projecting portions 105b and 106b) of the winker holder 102 and a mounting portion of the winker supporting base 103a for supporting the winker 103 in order to prevent rain water from permeating in the winker 103 through the cord insertion hole 108.

Although the front winker 5 is shown as being mounted to the pipe on the right side (as viewed along the running direction of the motorcycle 1) of the front forked portion 3, the front winker (winker device) mounted on the left side of the front forked portion 3 has the same configuration as that of the front winker 5 on the right side except for the mounting position thereof.

A license light 110 and a license plate (number plate) 111 illuminated by the license light 110 are mounted to the license plate mounting portion 19.

Figure 8:
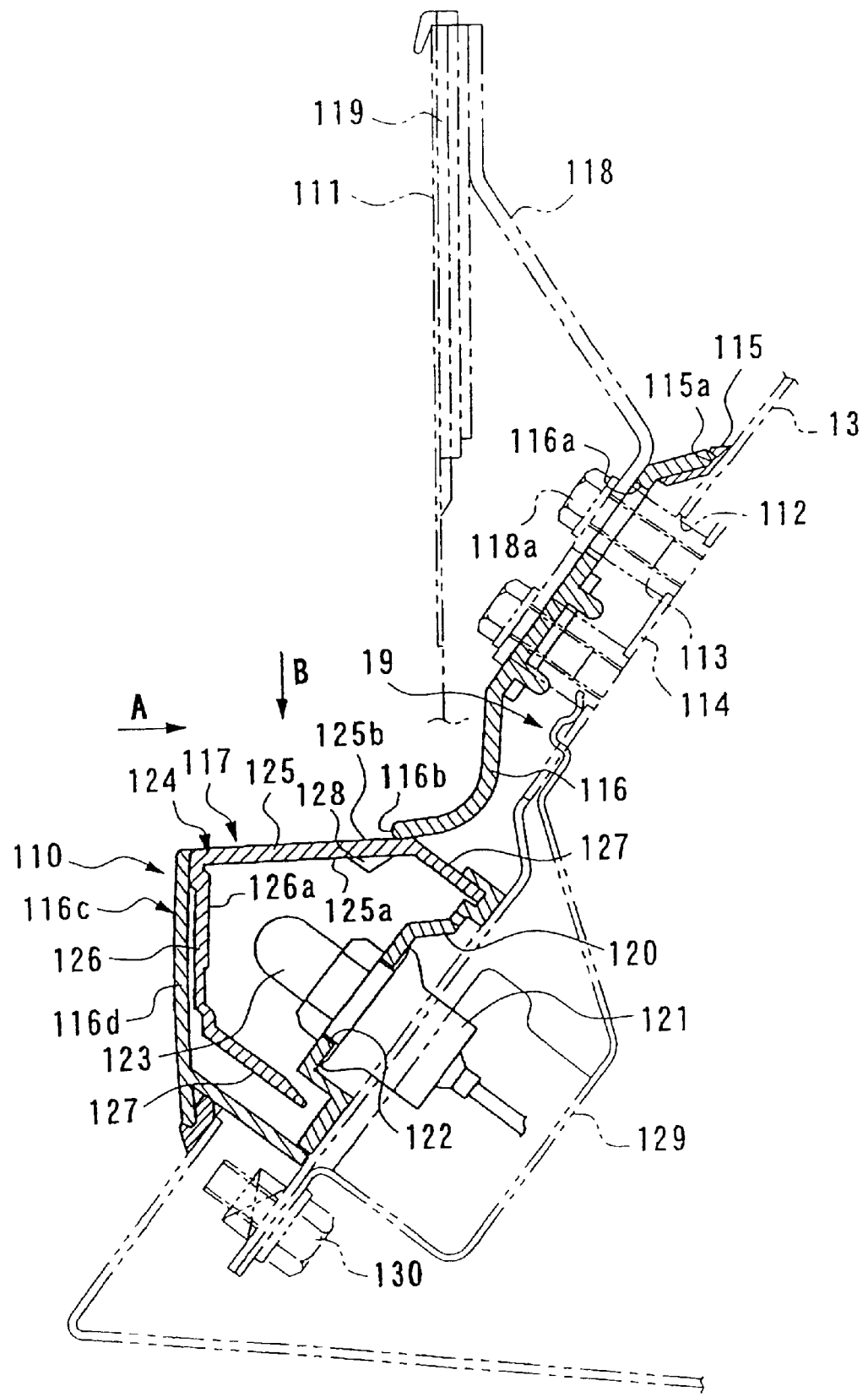
FIG. 8 is a vertical sectional view of a license light of the motorcycle to which the embodiment of the present invention is applied.
Figure 9:
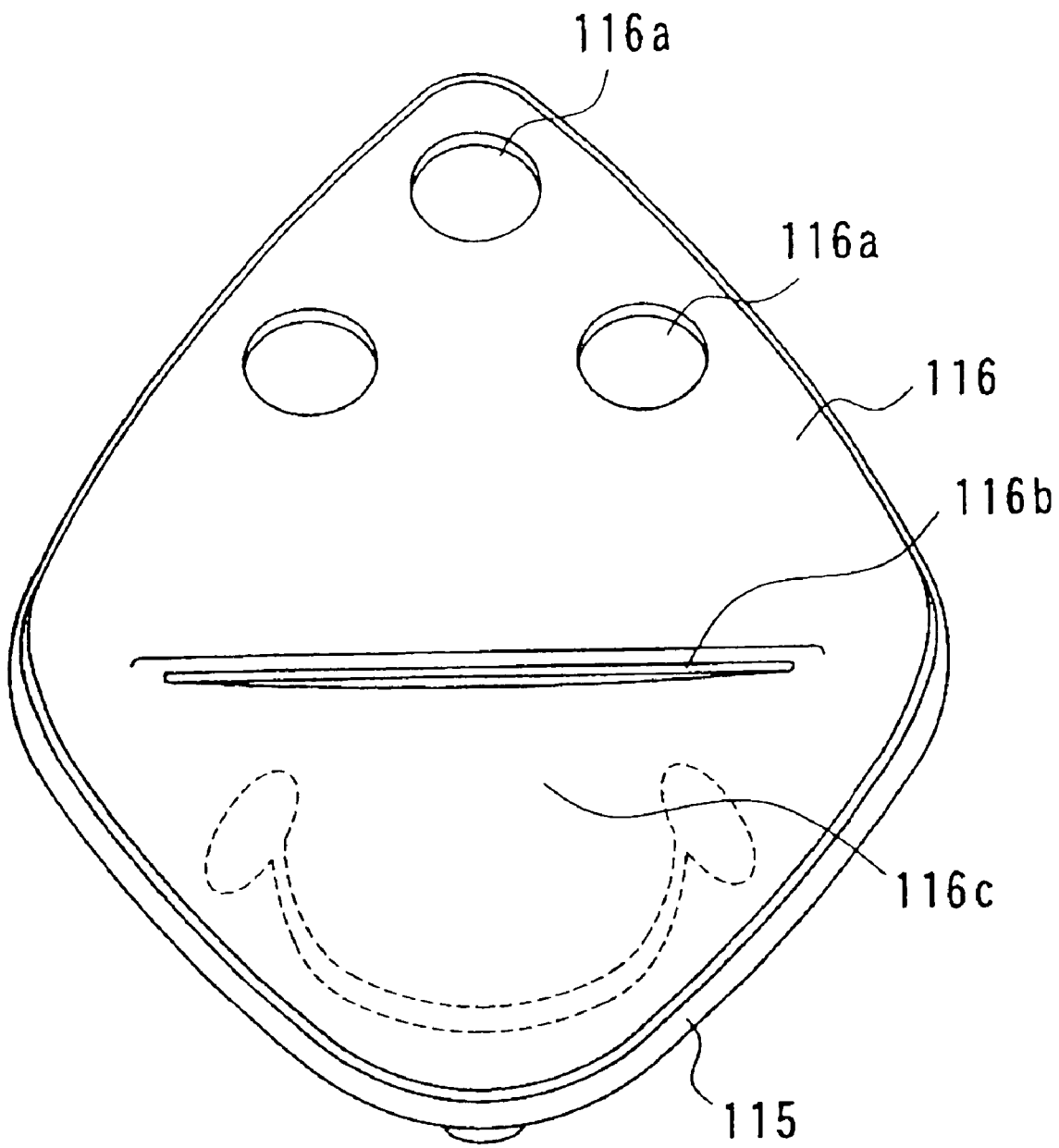
FIG. 9 is a view, seen along an arrow A of FIG. 8, showing the motorcycle to which the embodiment of the present invention is applied.

As shown in FIG. 8, a mounting board 114 is fixed to the back side of the rear end portion of the rear fender 13 at a position corresponding to that of an approximately rhombic opening 112. Three female screw members 113 are fixed to the mounting board 114 in such a manner as to project upwardly therefrom. A cushion rubber 115 formed into an approximately rhombic ring shape is fixed to the front side of the rear end portion of the rear fender 13 in such a manner as to surround a peripheral edge of the opening 112. A rounded light cover 116 (see FIG. 9) formed into an approximately rhombic shape, which is adapted to cover the license light 110, is provided in such a manner as to cover the opening portion 112 with a peripheral edge of the light cover 116 mounted in an annular groove 115a formed along the periphery of the cushion rubber 115.

The light cover 116 has three insertion holes 116a allowing the above female screw members 113 to pass from below therethrough. A light housing portion 116c is provided under the light cover 116. An upper portion of the light housing portion 116c has an opening 116b that is formed into an approximately circular-arc shape with its rear side (toward the rear end of the vehicular body) projecting as viewed from above or formed into a triangular shape with its projecting corner on the rear side being rounded. A lamp main body 117 of the license light 110 is mounted in the light housing portion 116c. A mounting plate 118 is fixed to the female screw members 113, which have been fixed to the mounting board 114 and inserted through the insertion holes 116a of the light cover 116, by means of bolts 118a. The number plate 111 is fixed to the mounting plate 118 via a supporting plate 119.

The lamp main body 117 includes a base 120, a lamp 123 screwed in a socket 121 and fixed to the base 120 through a bayonet type mounting hole 122 formed in the base 120, and a lens 124 fixed on the base 120 in such a manner as to surround the lamp 123. The lens 124 includes a horizontal upper surface portion 125, a vertical side surface portion 126, and a cylindrical barrel surface portion 127. The upper surface portion 125 is formed into an approximately circular-arc shape with its rear side (toward the rear end of the vehicular body) projecting as viewed from above or formed into a triangular shape with its projecting corner on the rear side being rounded. The side surface portion 126 is connected to the periphery of the upper surface portion 125 in such a manner as to extend downwardly therefrom. The barrel surface portion 127 is connected to the upper surface portion 125 and a base of the side surface portion 126. The lens 124 has an approximately pentagon shape with one side (tilted lower side) opened in cross-section along the center line of the vehicular body. A free end of the barrel surface portion 127 is partially joined by welding on the surface of the base 120, whereby the lens 124 is integrally joined to the base 120.

Figure 10:
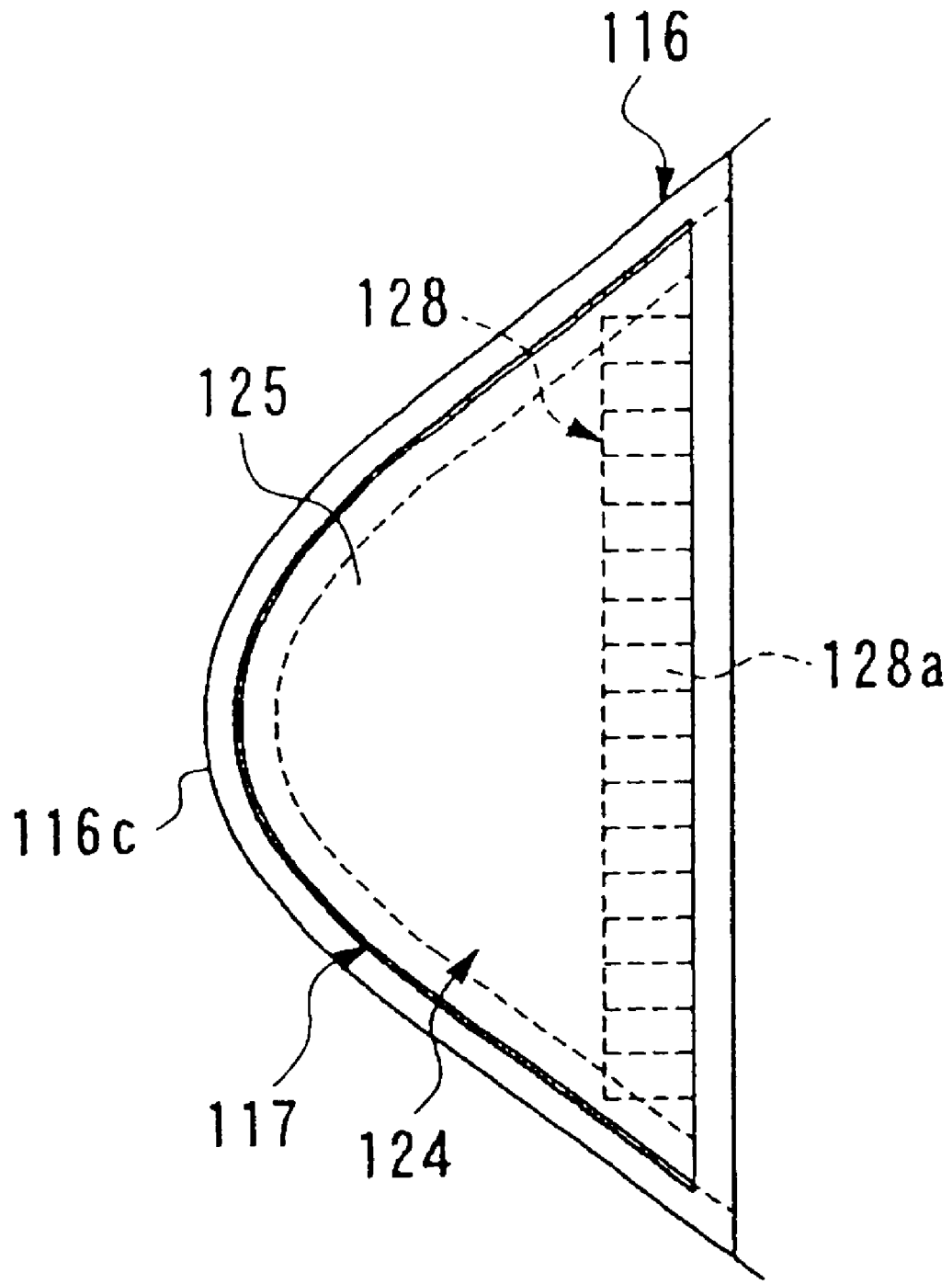
FIG. 10 is a view, seen along an arrow B of FIG. 8, showing the motorcycle to which the embodiment of the present invention is applied.

As shown in FIG. 10, the upper surface portion 125 of the lens 124 is formed into an approximately circular-arc shape with its rear side (toward the rear end of the vehicular body) projecting as viewed from above or formed into a triangular shape with its projecting corner on the rear side being rounded. The upper surface portion 125 has a lens plane 125a on the inner side close to the lamp 123. A prism 128 is provided on a portion, on the base side, of the inner lens plane 125a. The upper surface portion 125 also has a smooth lens plane 125b on the outer side apart from the lamp 123. The prism 128 is formed by arraying a plurality of prism elements 128a, each of which extends in parallel to the center line of the vehicular body, in the direction perpendicular to the center line of the vehicular body. Each of the prism elements 128a has a quadrangular pyramid shape, which extends longer in the longitudinal direction with apexes projecting toward the lamp 123 side. Such prism elements 128a are integrally provided on the lens plane 125a of the upper surface plane 125 to form a so-called fish-eye cut plane.

The side surface portion 126 is formed into a curved plane, which is nearly curved along the contour of the upper surface portion 125. A reflection plane 126a coarsened for reflecting light from the lamp 123 is provided on an upper side of a surface, on the inner side close to the lamp 123, of the side surface portion 126 in such a manner as to extend over a curved range reaching a portion near the prism 128.

The lamp main body 117 configured as described above is inserted in the light housing portion 116c of the light cover 116 with the projecting side of the lens 125 directed to the rear side of the vehicular body and the upper surface portion 125 directed upwardly. The upper surface portion 125 is exposed from the opening 116b. The side surface portion 126 is brought into contact with a back surface of the rear wall surface 116d, formed into a curved surface similar to that of the side surface portion 126 of the lens 124, of the light housing portion 116. In such a state, the side surface portion 126 is fixed to the back surface of the rear wall surface 116d by bolts (not shown). The lamp main body 117 is thus mounted in the light housing portion 116c. As illustrated in FIG. 8, a back surface cover 129 is provided for covering a portion, on the socket 122 side, of the lamp 123. The upper end side of the back surface cover is inserted and locked in an engagement hole formed in the mounting board 114, and the lower end side thereof is fixed to the mounting board 114 with a bolt 130.

Figure 11:
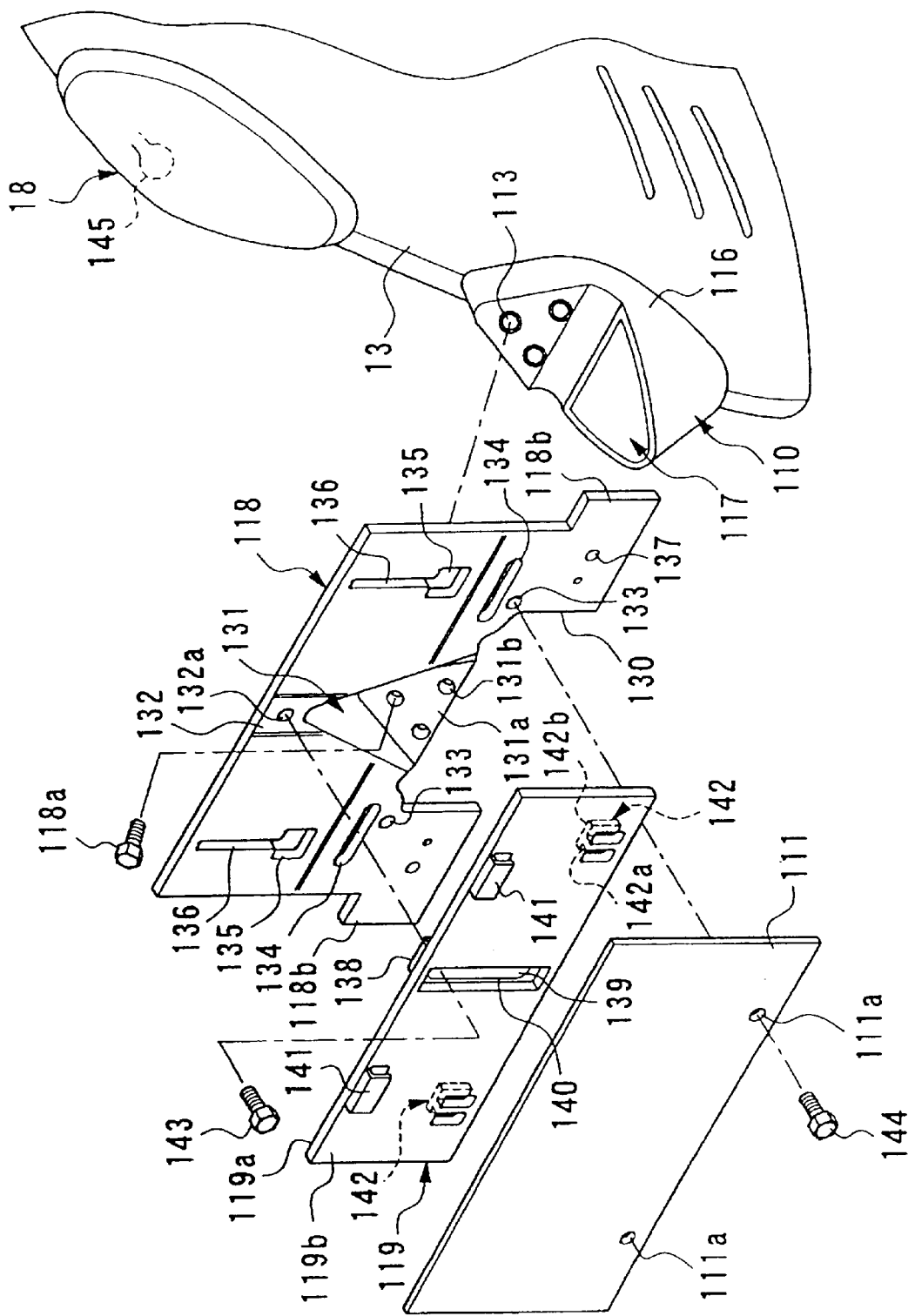
FIG. 11 is a perspective view showing a license plate mounting structure of the winker device of the motorcycle to which the embodiment of the present invention is applied.

The mounting plate 118 and the supporting plate 119 to be mounted to the license plate mounting portion 19 of the license plate 111 will be described with reference to FIG. 11.

The mounting plate 118 is formed by an approximately rectangular plate slightly horizontally elongated. Left and right projecting portions 118b project from a lower end portion of the mounting plate 118. An approximately rectangular cutout 130 is horizontally elongated, opens downwardly, and is provided in a central portion of the mounting plate 118. A triangular pyramid shaped recess 131 is provided in the mounting plate 118 at a position over the cutout 130. A flat recess 132 is provided in the mounting plate 118 in such a manner so as to be continuous upwardly to the recess 131. A bolt hole 132a is formed in the recess 132.

A triangular mounting plate portion 131a, which is equivalent to the bottom surface of the triangular pyramid shaped recess 131, is tilted upwardly toward the front side of the vehicular body. Three bolt holes 131b are formed in the mounting plate portion 131a at positions near the apexes of the triangular shape of the mounting plate portion 131a. The above-described bolts 118a, which have passed through the bolt holes 131b, are screwed in and fastened to the female screw members 113 fixed to the mounting board 114 of the license plate mounting portion 19 (see FIG. 8), whereby the mounting plate 118, located in front of and above the lamp main body 117, is mounted to the license plate mounting portion 19 in a state where the plate surface of the mounting plate 118 is perpendicular to the lamp main body 117 of the license light 110.

Two bolts holes 133 for mounting the license plate are symmetrically formed in the mounting plate 118 at positions near two upper corners of the cutout 130, and two slots 134 that are longer in the lateral direction are formed in the mounting plate 118 at positions slightly over the bolt holes 133. Two composite holes are formed in the mounting plate 118 at positions over the slots 134. Each of the composite holes is composed of a square hole 135, and a vertically elongated slide hole 136 continuous to the square hole 135 and extending upwardly to a portion near the upper end of the mounting plate 118. Two reflector mounting holes 137 are formed in the mounting plate 118 at positions under the bolt holes 133 on both the sides of the cutout 130.

The supporting plate 119 is formed by a horizontally elongated rectangular plate having the same width as that of an upper half of the mounting plate 118. A seat portion 138, which is to be brought into contact with the rear surface of the recess 132 of the mounting plate 118, projects from a central portion of a front surface 119a of the supporting plate 119. A vertically elongated bolt hole 139 is formed so as to pass through the seat portion 138. In the rear surface 119b of the supporting plate 119, a peripheral portion of the bolt hole 139 is recessed, to form a seat surface 140.

Two hook pieces 141 that are opened downwardly are symmetrically provided on both sides of an upper portion of the rear surface 119b of the supporting plate 119 in such a manner as to project rearwardly therefrom. Two engagement portions 142, each of which is formed into a T-shape in transverse cross-section, are symmetrically provided on both sides of a portion near a lower end of the rear surface 119b of the supporting plate 119 in such a manner as to project therefrom toward the front surface 119a side. Each of the engagement portions 142 is formed into a square shape in a front view, which has a size allowed to pass through the square hole 135 of the mounting plate 118. The T-shaped engagement portion 142 has a vertical side portion 142a to be inserted in the slide hole 136 of the mounting plate 118, and a horizontal side portion 142b to be engaged with the front surface of the mounting plate 118.

The supporting plate 119 is mounted to the mounting plate 118 as follows. The engagement portions 142 of the supporting plate 119 are inserted in the square holes 135 of the mounting plate 118 to bring the front surface of the supporting plate 119 into contact with the back surface of the mounting plate 118. In such a state, the supporting plate 119 is slid upwardly with respect to the mounting plate 118, so that the vertical side portions 142a of the engagement portions 142 of the supporting plate 119 are inserted in the slide holes 136 of the mounting plate 118 and are thereby engaged to the mounting plate 118. As a result, the supporting plate 119 is made immovable in the longitudinal direction relative to the mounting plate 118. In such a state, a height position of the supporting plate 119 to the mounting plate 118 is determined. After that, a mounting bolt 143 is inserted, from the rear surface side of the supporting plate 119, in the bolt hole 139 and the bolt hole 132a of the mounting plate 118, and a nut is screwed with and temporarily fastened to a leading end of the bolt 143 on the front surface side of the mounting plate 118. The supporting plate 119 is thus supported by the mounting plate 118.

The license plate 111 is mounted to the mounting plate 118 as follows. The license plate 111 is first brought into contact with the rear surface of the supporting plate 119 in such a manner that the upper edge thereof comes in contact with the inner sides of the hook pieces 141 of the supporting plate 119. Two bolt holes 111a, which are formed in the license plate 111 on both sides of a lower end portion thereof, are positioned to the bolt holes 133 or the slots 134 of the mounting plate 118. In such a state, two mounting bolts 144 are inserted, from the rear surface side of the license plate 111, in the bolt holes 111a and the bolt holes 133 or the slots 134, and nuts are screwed with and fastened to leading ends of the bolts on the front surface side of the mounting plate 118. The license plate 111 is thus fixed to the mounting plate 118.

In the case of positioning the bolt holes 111a of the license plate 111 to the bolt holes 133 or the slots 134 of the mounting plate 118, the supporting plate 119 is moved up and down to the mounting plate 118 via the engagement between the slid holes 136 and the engagement portions 142. When the bolt holes 111a are aligned to the bolt holes 133, the mounting bolt 143, which has been inserted in the bolt hole 139 of the supporting plate 119 and the bolt hole 132a of the mounting plate 118 and temporarily fastened, is firmly fastened, to thereby rigidly fix the supporting plate 119 to the mounting plate 118.

Each of the mounting plate 118 and the supporting plate 119 is made from a black material or made from a material coated with black paint, and therefore, it is black in color. A license plate mounting plane determined by a combination of the mounting plate 118 and the supporting plate 119 has a width and a height, each of which is large enough to be matched to the size of the license plate 111 whose specification differs depending on the service location of the motorcycle. Specifically, the size of the license plate mounting plane is designed such that the black surface of the license plate 111 is not directly illuminated with a tail light 145 in the brake lamp unit 18 mounted to the rear fender 13 in front of the mounting plate 118 and the supporting plate 119.

Figure 12:
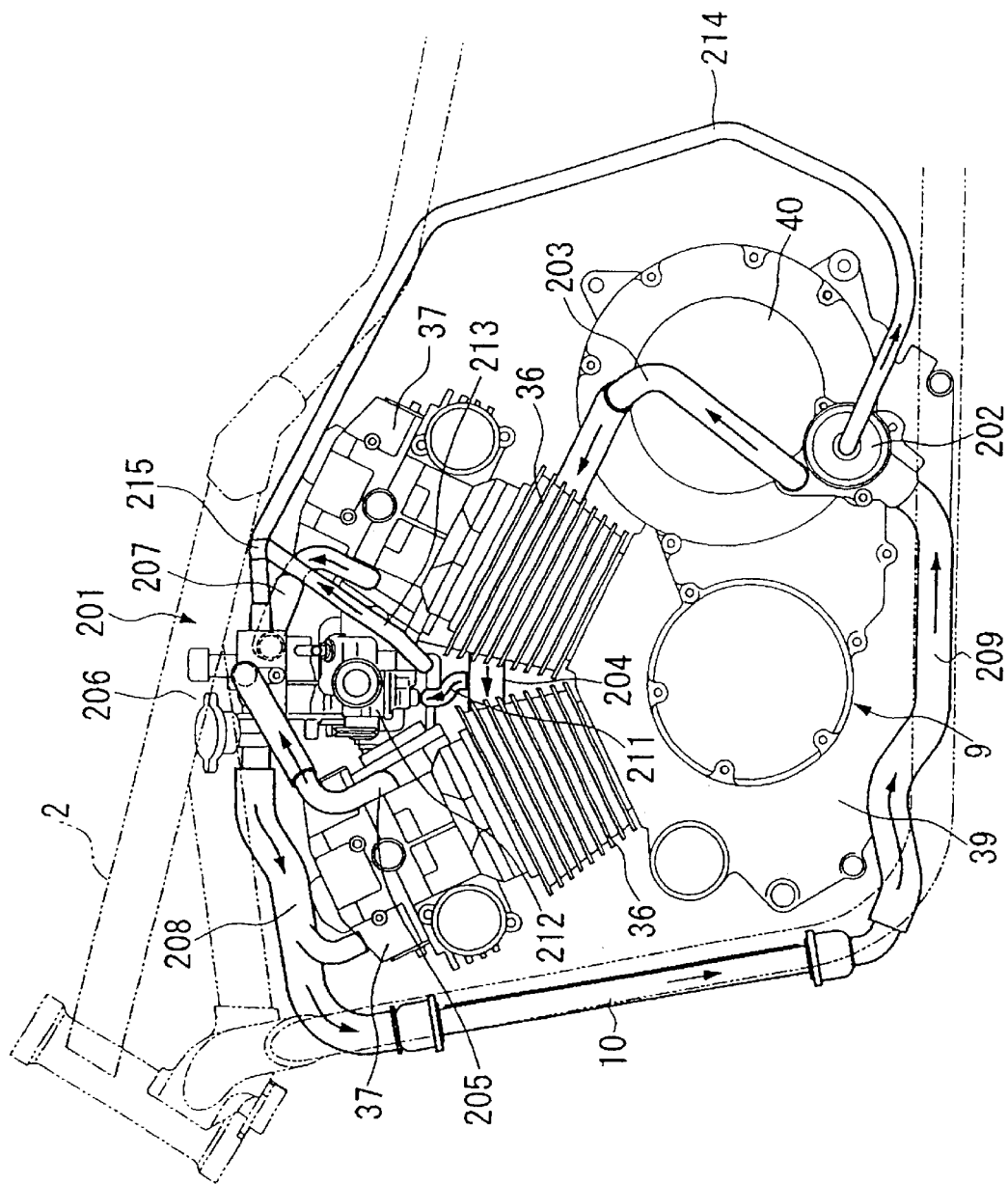
FIG. 12 is an enlarged side view showing a central portion, from which a side cover is removed, of the motorcycle to which the embodiment of the present invention is applied.

The cooling of the engine by using the radiator 10 and the function of a heating device 201 of a carburetor associated with the radiator will be described below. As shown in FIG. 12, a cooling water pump 202 is disposed on a side portion of the transmission 40 of the engine 9. A discharge port of the cooling water pump 202 is connected via an engine cooling water pipe line 203 to an engine cooling water inlet of the right side cylinder portion 36 of the engine 9 in FIG. 12. Engine cooling water, which flows in the right side cylinder portion 36, passes through a water jacket (not shown) formed in a wall portion of the cylinder portion 36, and is then branched into two streams. One of the two streams reaches an engine cooling water outlet formed in the cylinder portion 36 at a position opposed to that of the engine cooling water inlet, and the other of the two streams reaches an engine cooling water outlet formed in an upper surface portion of the right side cylinder head portion 37 located over the cylinder portion 36.

The engine cooling water outlet of the right side cylinder portion 36 is connected via an engine cooling water communication pipe 204 to an engine cooling water inlet of the left side cylinder portion 36. Engine cooling water, which flows in the left side cylinder portion 36, passes through a water jacket (not shown) formed in a wall portion of the cylinder portion 36, and reaches an engine cooling water outlet formed in an upper surface portion of the left side cylinder head portion 37. The engine cooling water outlet of the left side cylinder head portion 37 is connected via an engine cooling water pipe line 205 to an inlet of a valve case of a thermostat valve 206 disposed under the main pipe 22. Meanwhile, the engine cooling water outlet of the right side cylinder head portion 37 is connected via an engine cooling water pipe line 207 to an inlet of the valve case of the thermostat valve 206.

An outlet of the thermostat valve 206 is connected via an engine cooling water pipe line 208 to an upper inlet of the radiator 10. A lower outlet of the radiator 10 is connected via an engine cooling water pipe line 209 to a suction port of the cooling water pump 202.

A carburetor heating pipe line 211 is branched from the engine cooling water communication pipe 204 for connecting the left and right cylinder portions 36 to each other. The leading end of the carburetor heating pipe line 211 is connected to an engine cooling water inlet formed in a carburetor 212. A carburetor heating pipe line 213 extends from an engine cooling water outlet provided in the carburetor 212. The carburetor heating pipe line 213 on the downstream side is connected via a combined portion 215 to a bypass pipe line 214. The bypass pipe line 214 connects the outlet of the valve case of the thermostat valve 206 to the suction port of the cooling water pump 202.

The engine cooling water pipe line 203, the engine cooling water communication pipe 204, and the engine cooling water pipe lines 205, 207, 208 and 209 form a radiator pipe line as a circulation path for connecting the engine 9 to the radiator 10. An inner diameter of each of the engine cooling water pipe lines 208 and 209 of the radiator pipe line is set to be larger than an inner diameter of the bypass pipe line 214.

The thermostat valve 206 is opened/closed depending on the temperature of engine cooling water flowing in the thermostat valve 206. For example, when being in the "closed" state, the thermostat valve 206 does not allow communication of the engine cooling water pipe lines 205 and 207 with the engine cooling water pipe line 208 but allows communication of the engine cooling water pipe lines 205 and 207 with the bypass pipe line 214 only. On the other hand, when in the "opened" state, the thermostat valve 206 allows communication of the engine cooling water pipe lines 205 and 207 with both the engine cooling water pipe line 208 and the bypass pipe line 214.

The cooling water pump 202 is started up along with start up of the engine 9. In this case, if the temperature of engine cooling water does not reach a specific temperature, the thermostat valve 206 is left as closed. Accordingly, the engine cooling water is circulated in a path, which allows the engine cooling water to flow out of the cooling water pump 202, to pass through the engine cooling water pipe line 203, the left and right cylinder portions 36, the engine cooling water pipe lines 205 and 207, the valve case of the thermostat valve 206, and the bypass pipe line 214, and to return again to the cooling water pump 202.

In this case, when the engine cooling water is suitably heated after having passed through the right side cylinder portion 36 passes through the engine cooling water communication pipe 204, part of the cooling water is branched to be led in the carburetor 212 via the carburetor heating pipe line 211, thereby heating the carburetor 212. The engine cooling water, which has been used for heating the carburetor 212, is returned again to the cooling water pump 202 via the carburetor heating pipe line 213 and the bypass pipe line 214.

After that, when the temperature of the engine cooling water is increased over the specific temperature, the thermostat valve 206 is opened. At this time, a path extending from the engine cooling water pipe lines 205 and 207 to the radiator 10 via the engine cooling water pipe line 208 and further extending from the radiator 10 to the cooling water pump 202 via the engine cooling water pipe line 209 is opened. The engine cooling water is circulated even in this path. The cooling of the engine using the radiator 10 is thus started.

In this case, as is apparent from the relationship between flow resistances of the pipe lines, the flow rate of the engine cooling water flowing in the bypass pipe line 214 is reduced, and the flow rate of the engine cooling water flowing in the path (radiator pipe line) passing through the radiator 10 side is increased. As a result, the flow rate of the engine cooling water flowing in the carburetor 212 is necessarily reduced, so that it is possible to eliminate the need of excessively heating the carburetor 212.

Figure 13:
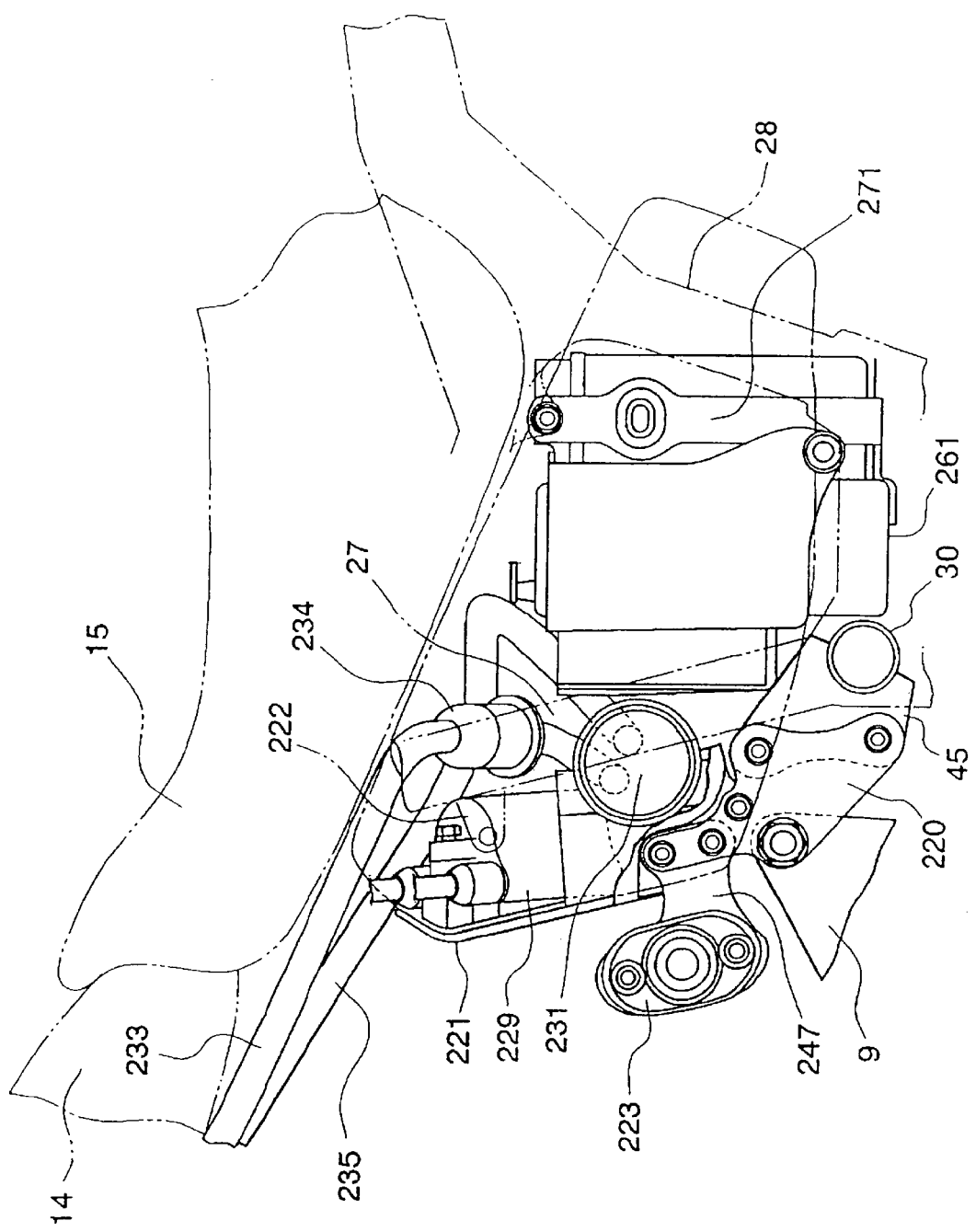
FIG. 13 is an enlarged side view showing a central portion, from which a side cover is removed, of the motorcycle to which the embodiment of the present invention is applied.

A structure for arranging engine auxiliaries at a central portion of the vehicular body and a structure for mounting an ignition switch will be described below. As shown in FIG. 13, engine hangers 220 for supporting the engine 9 are mounted to the brackets 45 mounted to the cross pipe 30 of the body frame 2 in such a manner so as to cross the pair of left and right pipes 24 and the pair of left and right pipes 27 of the body frame 2. In front of the left and right center pipes 30, a center cover 221 is mounted to and supported by brackets 222 mounted to the engine hangers 220 and the center pipes 27 (see FIG. 17).

The engine hangers 220 have not only the function of supporting the engine 9 and the center cover 221 but also a function of supporting an ignition switch 223. The latter function of the engine hangers 220 will be fully described later.

Figure 15:
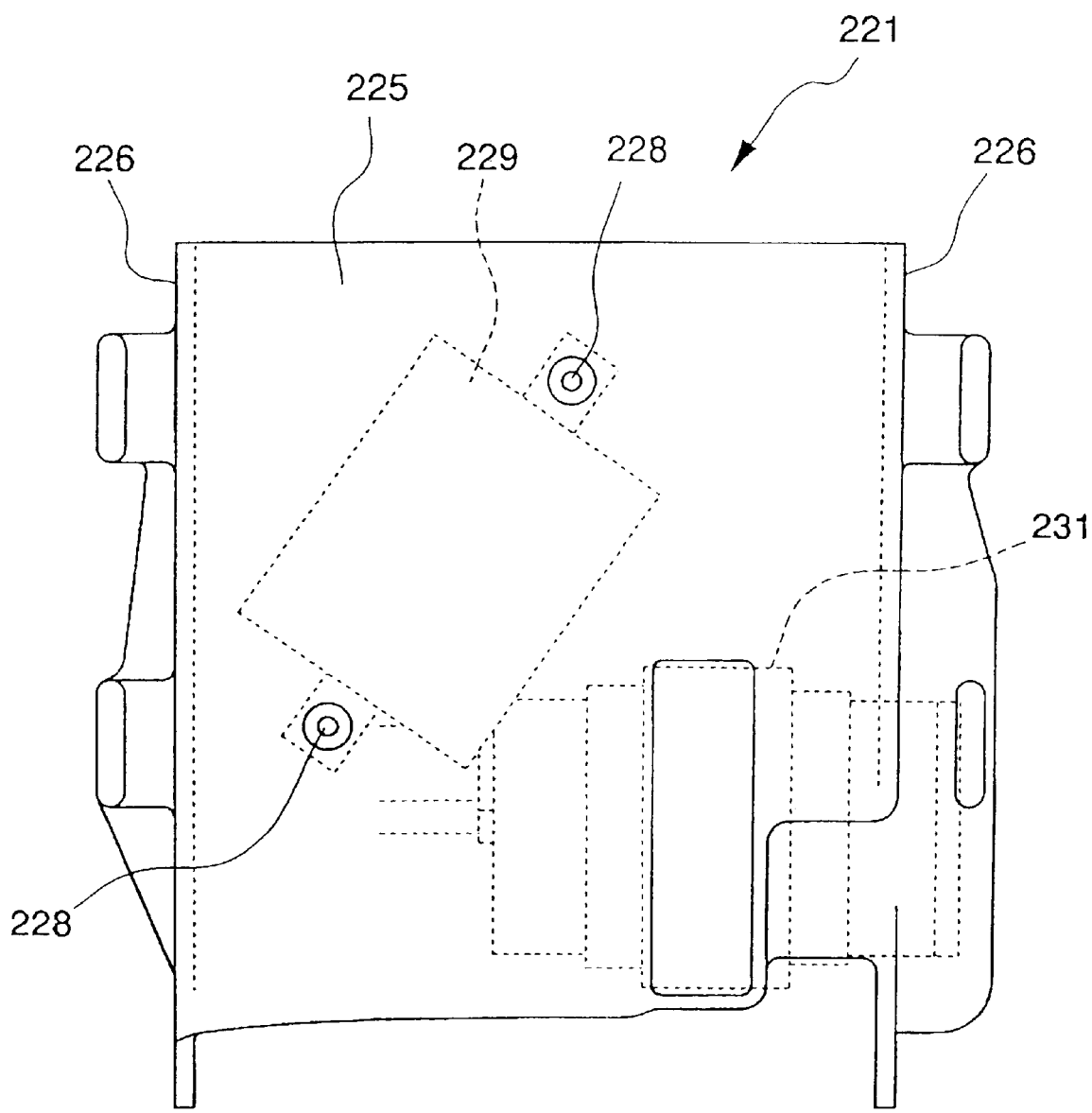
FIG. 15 is a front view of a center cover of the motorcycle to which the embodiment of the present invention is applied.
Figure 16:
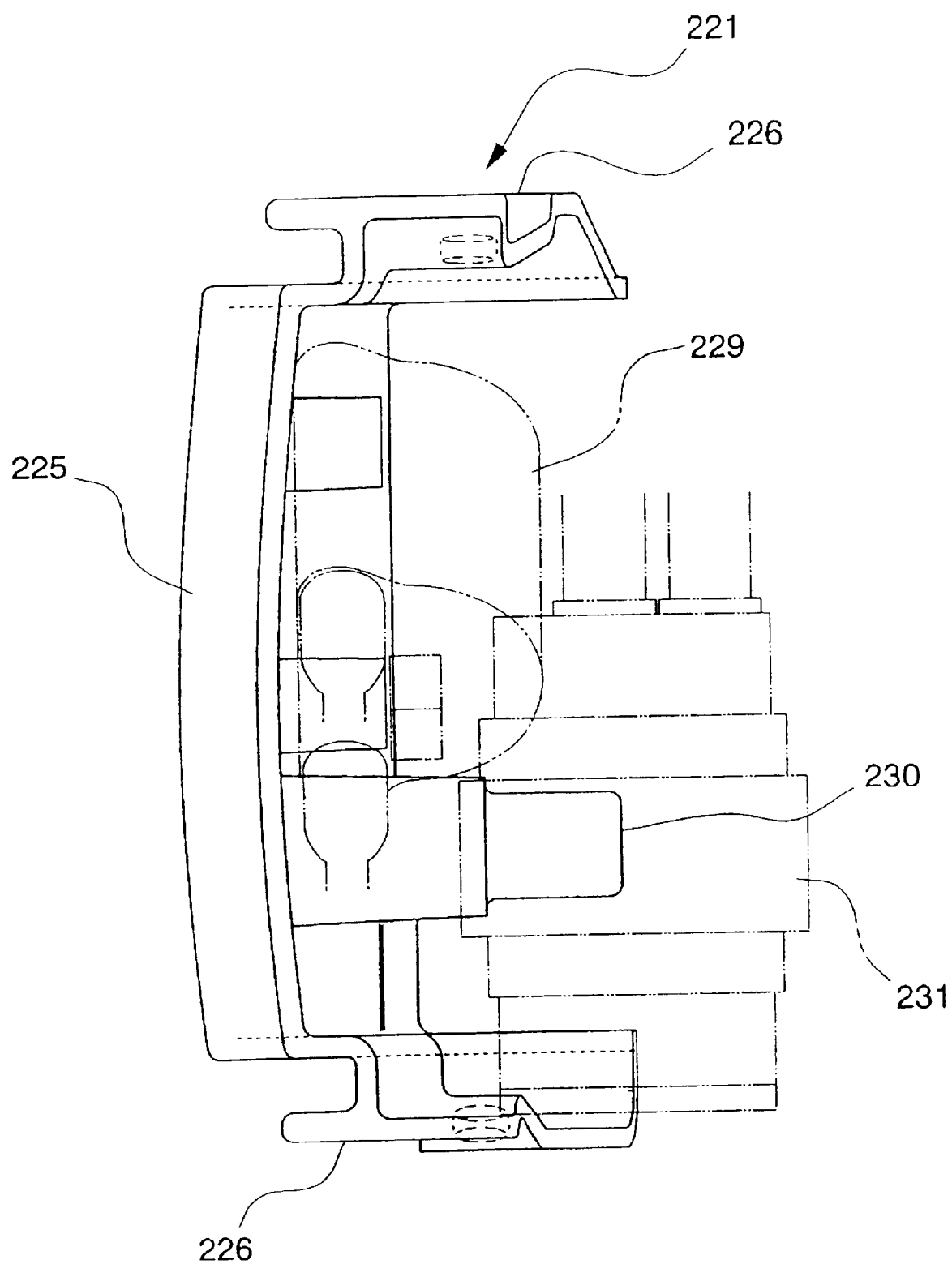
FIG. 16 is a plan view of the center cover of the motorcycle to which the embodiment of the present invention is applied.
Figure 17:
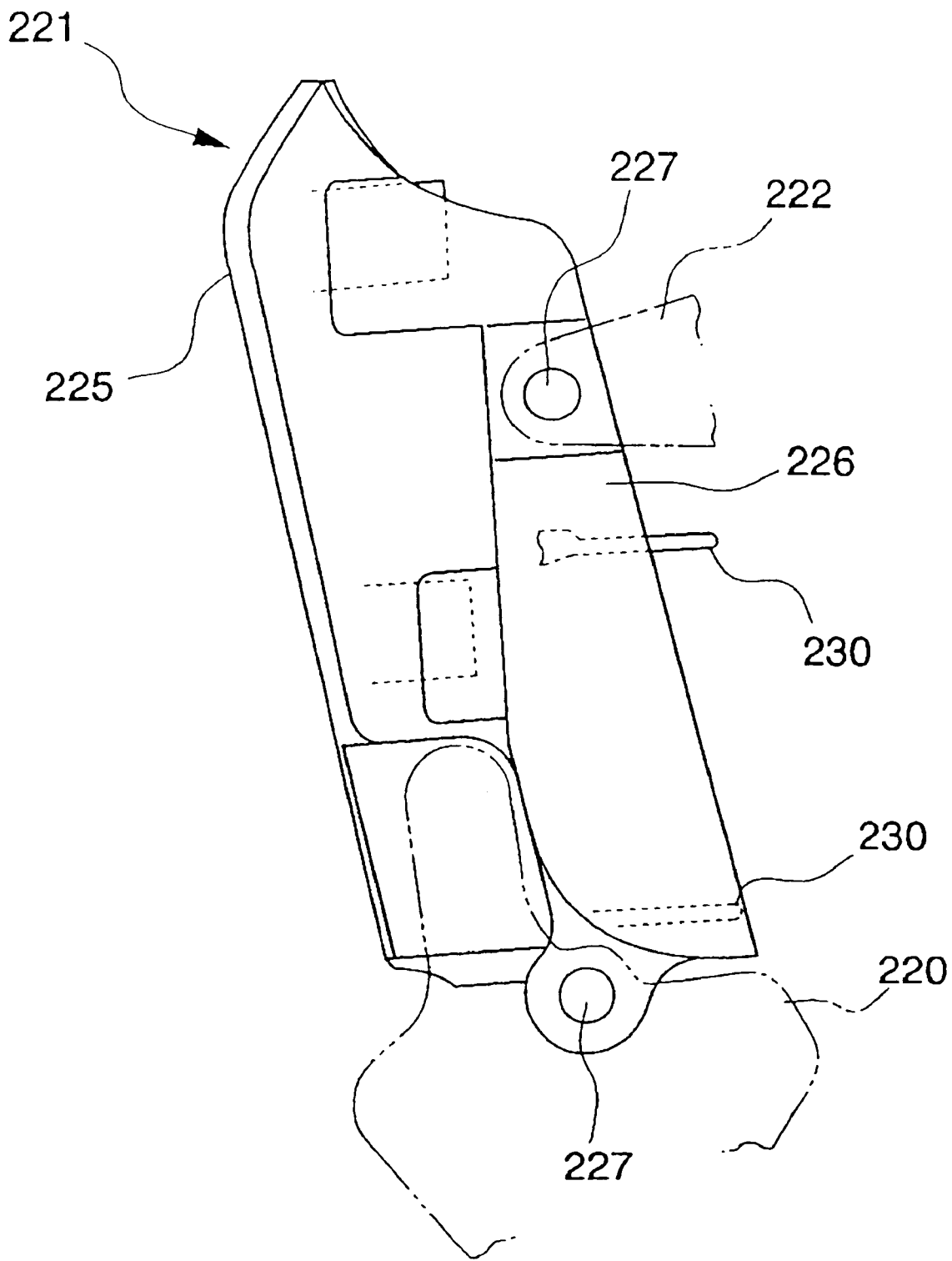
FIG. 17 is a side view of the center cover of the motorcycle to which the embodiment of the present invention is applied.

As shown in FIGS. 15 to 18, the center cover 221 made from a resin includes a plate-like portion 225 formed into an approximately square shape, and two stand portions 226 provided on left and right sides of the plate-like portion 225. When the center cover 221 is assembled to the body frame, the stand portions 226 extend rearwardly of the vehicular body. As shown in FIG. 17, each of the left and right stand portions 226 has upper and lower holes 227 to be engaged. The holes 227 to be engaged are fitted in engagement holes formed in the engine hangers 220 and the brackets 222 and are fixed thereto by suitable fixing means such as bolts, whereby the center cover 221 is fixed to the body frame 2.

The material for forming the center cover 221 is not limited to a resin but may be a metal such as an aluminum alloy.

Figure 18:
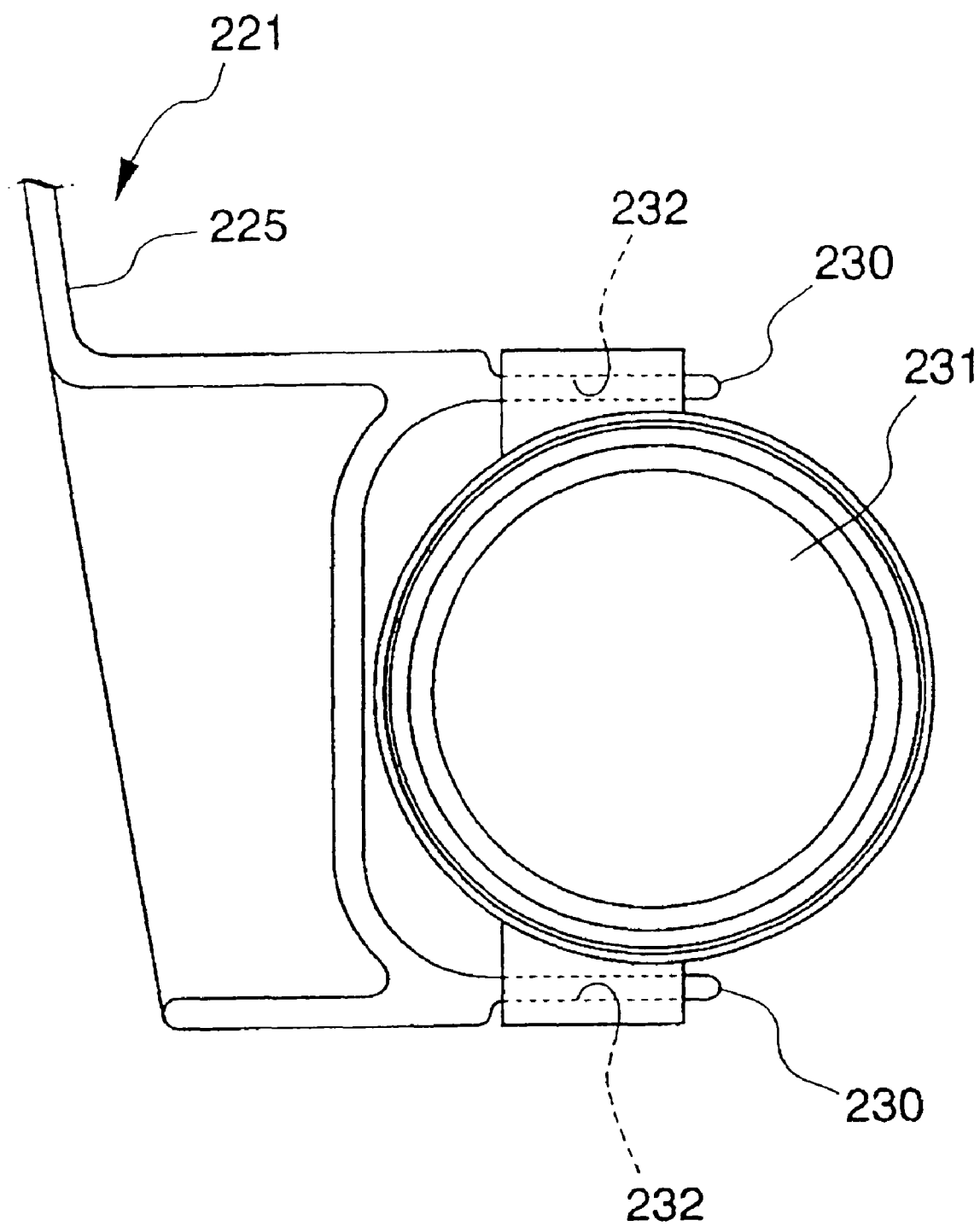
FIG. 18 is a side view showing a state wherein a fuel pump is mounted to the center cover of the motorcycle to which the embodiment of the present invention is applied.

As shown in FIG. 15, two part mounting holes 228 are provided on the upper side of the plate-like portion 225 of the center cover 221 in such a manner as to be separated from each other with a suitable gap put therebetween. An ignition coil 229 is mounted to the part mounting holes 228 via fixing means such as bolts. As shown in FIGS. 16 to 18, two tongue-shaped lock portions 230 extending rearwardly of the vehicular body are provided on the lower side of the plate-like portion 225 in such a manner so as to be separated from each other in the vertical direction with a suitable gap placed therebetween. The tongue-shaped lock portions 230 are inserted in and locked to engagement holes 232 formed in a side portion of a fuel pump 231, whereby the fuel pump 231 is horizontally mounted to the center cover 221.

In FIG. 13, a pipe 223 is provided for supplying fuel from the fuel tank 14 to the fuel pump 231 via a filter 234. A pipe 235 is provided for supplying fuel from the fuel pump 231 to the carburetor 212.

Figure 19:
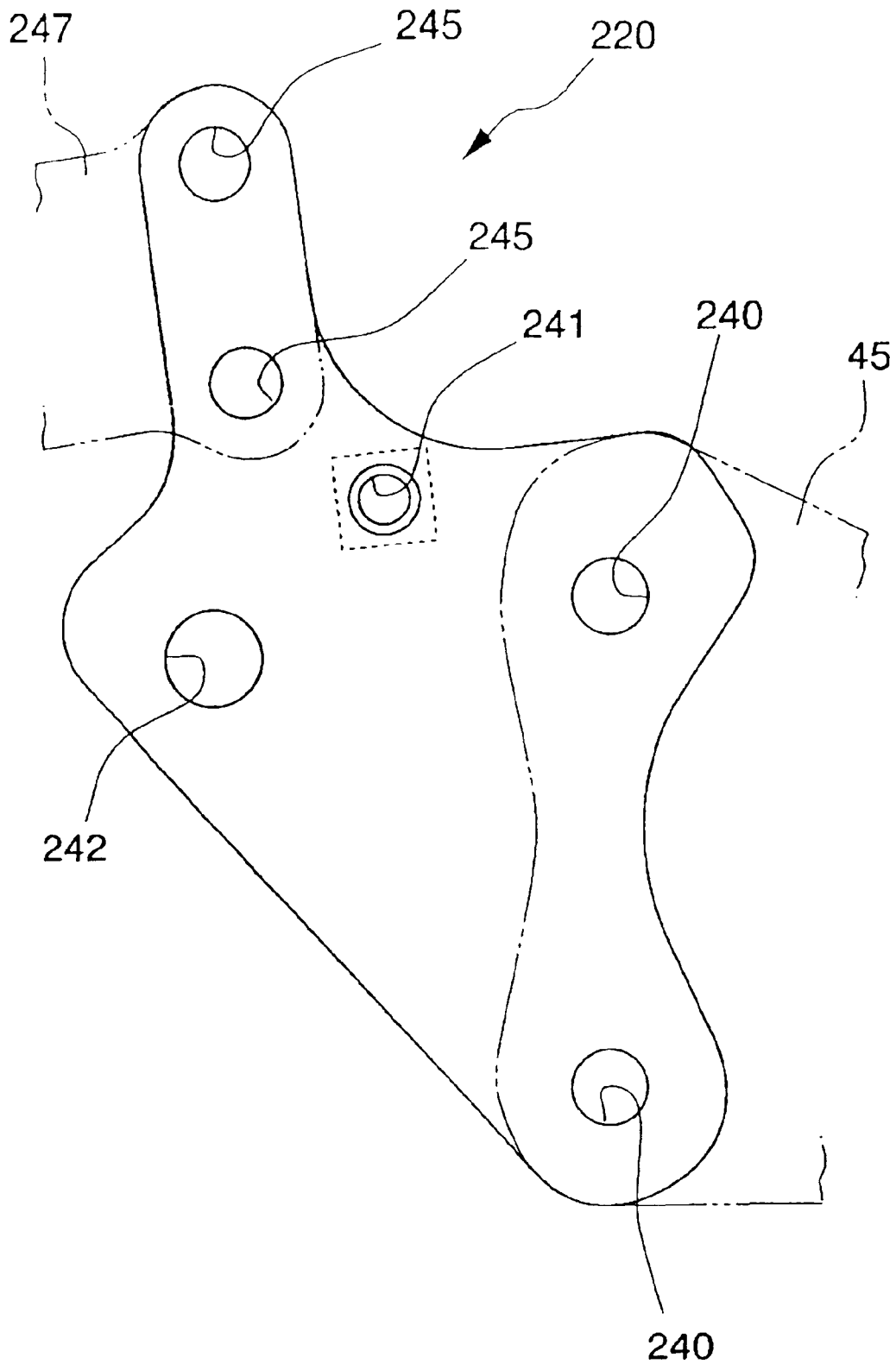
FIG. 19 is a front view of an engine hanger of the motorcycle to which the embodiment of the present invention is applied.

As shown in FIG. 19, the engine hanger 220 is formed into an approximately rhombic shape. Two holes 240 to be engaged are formed in the vicinity of an end portion, on the right side in the figure (rear side of the vehicular body upon assembly of the vehicular body), of the engine hanger 220 in such a manner so as to be separated from each other in the vertical direction with a specific gap placed therebetween. A lock hole 241 is formed in a central portion on the upper side of the engine hanger 220, and also a lock hole 242 is formed in the vicinity of a left end portion of the engine hanger 220. The holes 240 to be engaged are fitted in engagement holes formed in the brackets 45 mounted to the cross pipe 30 of the body frame 2 and fixed thereto by fixing means such as bolts. The lock hole 241 is used for locking a lower portion of the center cover 221 via suitable fixing means such as a bolt. The lock hole 242 is used for locking the engine 9 via fixing means such as a bolt.

An extension portion 244, which extends in a direction (depicted as the upward direction in FIG. 19) different from an engine suspension direction, is provided on the engine hanger 220. Two lock holes 245 are formed in the extension portion 244 in such a manner as to be separated from each other in the length direction with a gap put therebetween. An ignition switch 223 is mounted to the lock holes 245 via a stay 247 (see FIG. 13).

Figure 20A:
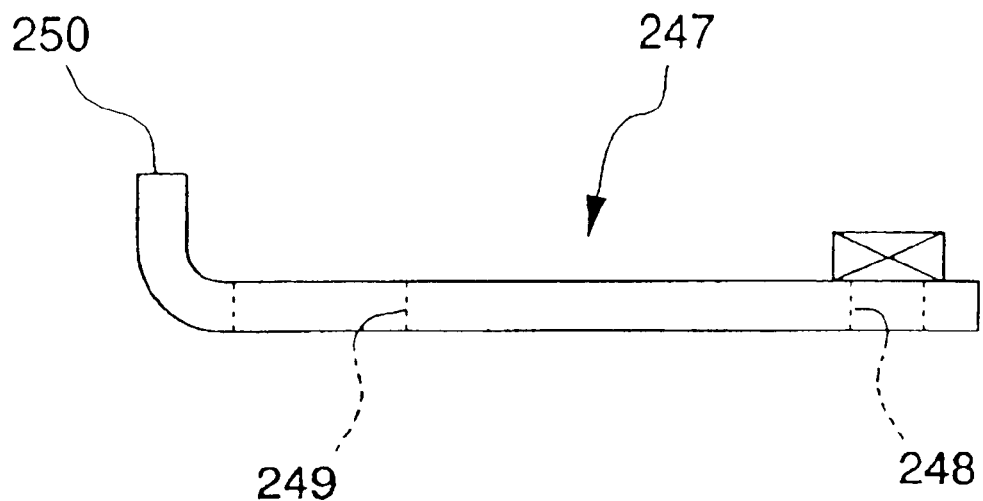
FIGS. 20(a) and 20(b) are a plan view and a side view of a stay for supporting an ignition switch of the motorcycle to which the embodiment of the present invention is applied, respectively.
Figure 20B:
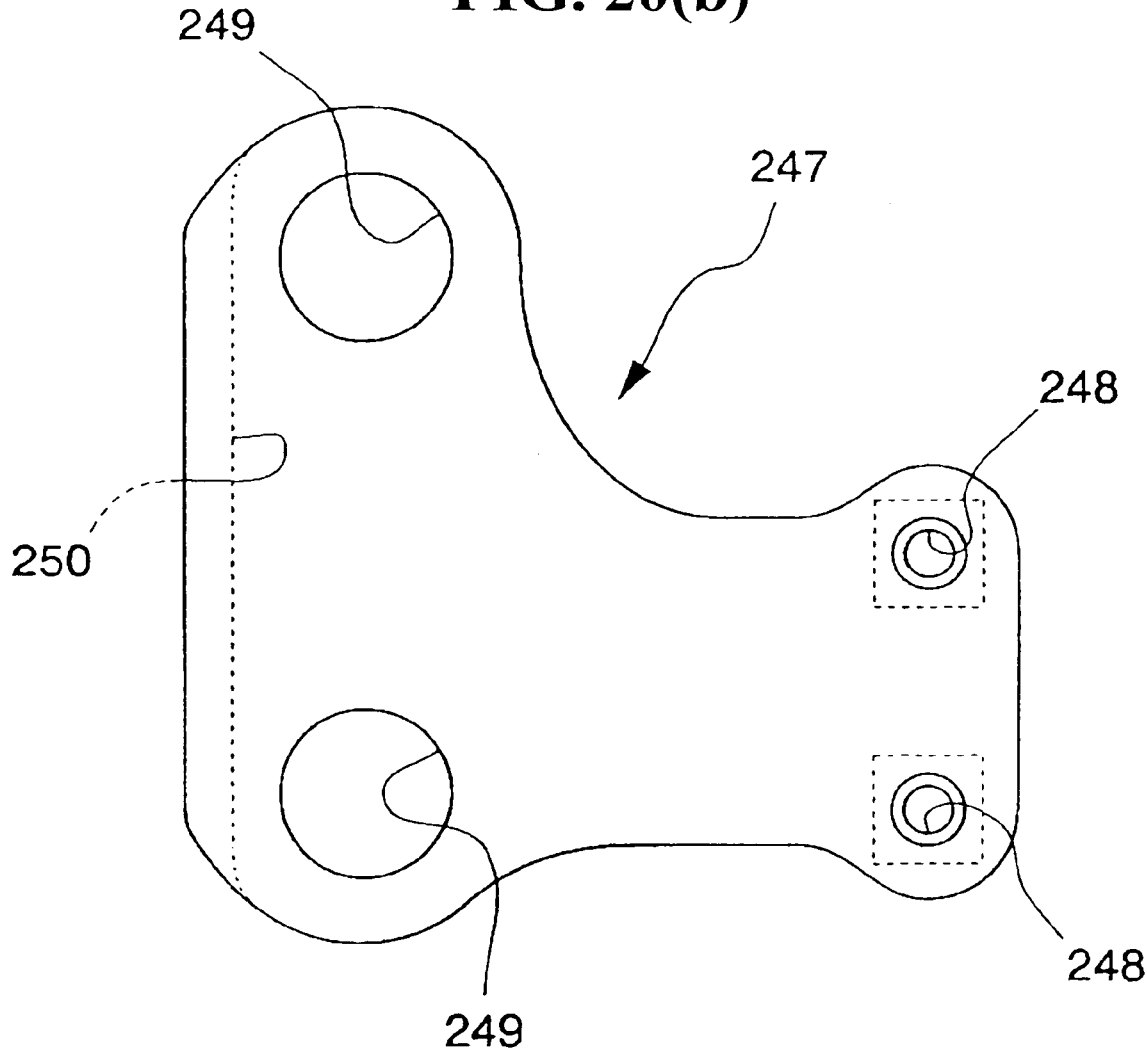

As shown in FIGS. 20(a) and 20(b), the stay 247 has two holes 248 to be locked, two lock holes 249, and a reinforcing portion 250. The two holes 248 to be locked, which are to be fixed to the engine hanger 220, are formed in the vicinity of the right side (rear side at the time of assembly) of the stay 247 in such a manner as to be separated from each other in the vertical direction with a gap placed therebetween. The lock holes 249 to be fitted in mounting holes of the ignition switch 229 are formed in the vicinity of a left side end of the stay 247. The reinforcing portion 250 is formed on a left side edge of the stay 247. The reinforcing portion 250 is curved so as to be raised inwardly at the time of assembly of the vehicular body.

It is to be noted that the holes 248 to be locked of the stay 247 correspond to the engagement holes 245 of the engine hanger 220.

Figure 14:
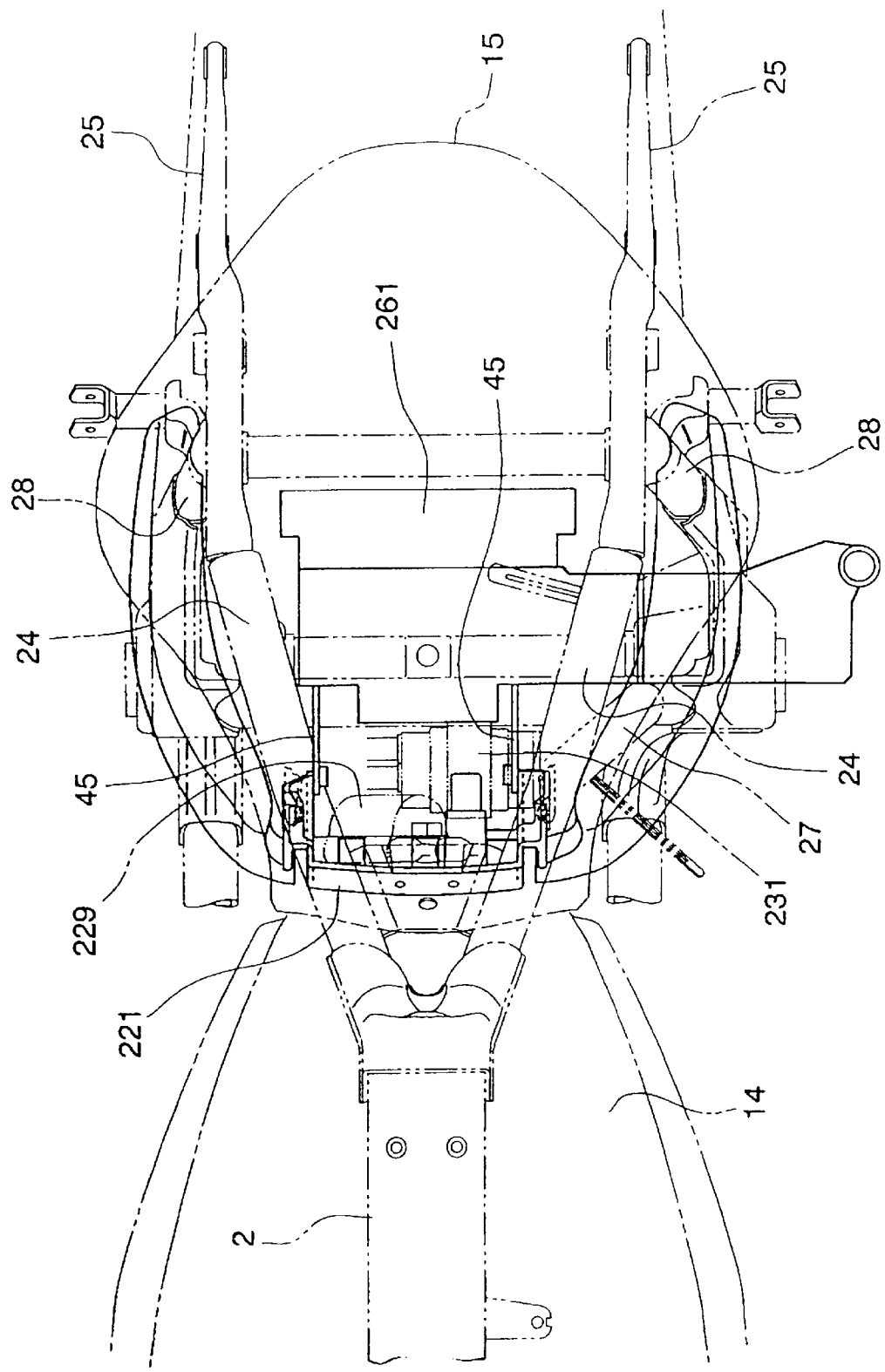
FIG. 14 is an enlarged plan view showing a central portion, from which a seat is removed, of the motorcycle to which the embodiment of the present invention is applied.

A housing device for housing documents and tools will be described below. As shown in FIGS. 13 and 14, a battery case 261 is disposed in a space at the back of the center cover 221, wherein the space is surrounded by the center pipes 27 and rear pipes 28 of the body frame 2, and the main seat 15.

As shown in FIGS. 21 to 24(c), the battery case 261 includes a battery housing portion 262 for housing a battery, and a document/tool housing portion 263 for housing documents and tools. The document/tool housing portion 263 is integrated with the battery housing portion 262. In the battery case 261 shown in FIGS. 21 and 22, the right side (rear side at the time of assembly of the vehicular body) is taken as the battery housing portion 262, and the front side is taken as the document/tool housing portion 263.

Figure 24A:
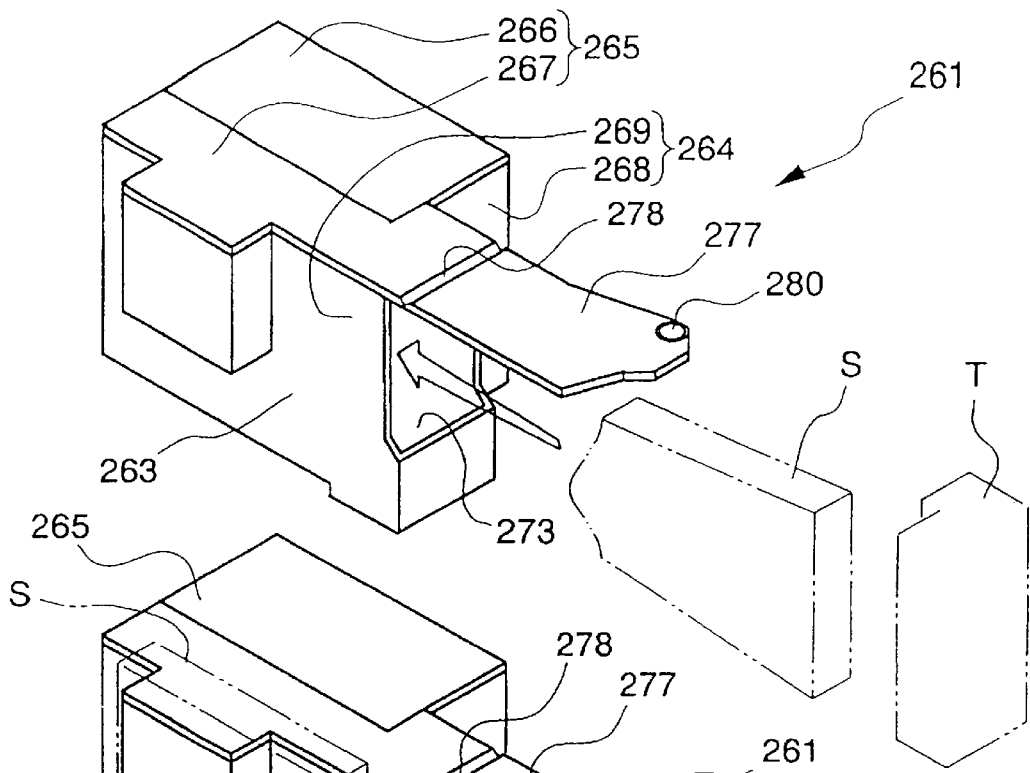
FIGS. 24(a) to 24(c) are perspective views illustrating a function of the battery case of the motorcycle to which the embodiment of the present invention is applied.
Figure 24B:
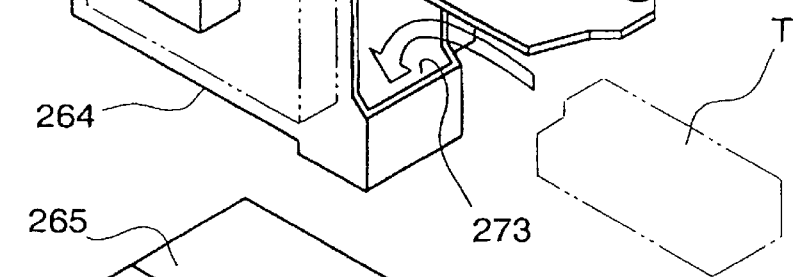
Figure 24C:
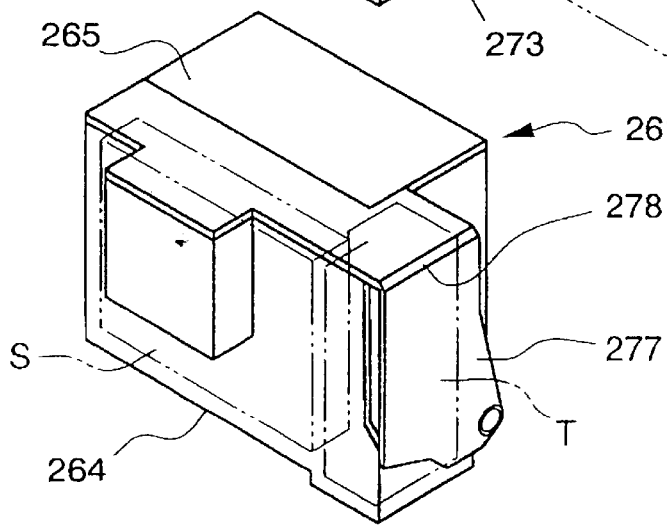

As shown in FIGS. 24(a) to 24(c), the battery case 261 includes a lower side case main body 264, and a lid 265 fixed to the case main body 264 by suitable fixing means in such a manner as to cover the opened upper side of the case main body 264. The lid 265 includes a first lid 266 for covering the upper side of the battery housing portion 262, and a second lid 267 for covering the upper side of the document/tool housing portion 263. Each of the case main body 264, the first lid 266, and the second lid 267 is formed by blow molding of resin.

Figure 21:
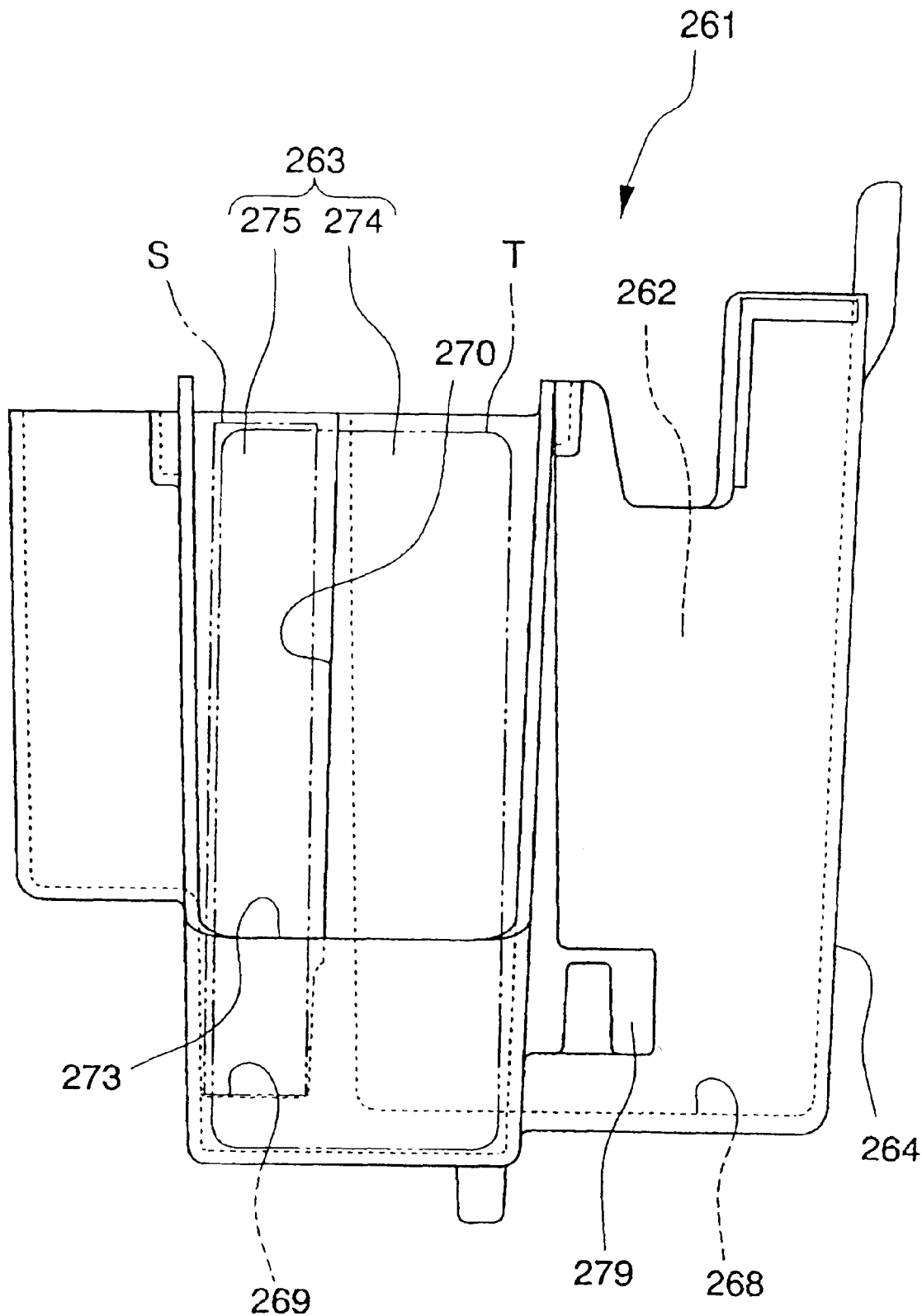
FIG. 21 is a front view showing a battery case of the motorcycle to which the embodiment of the present invention is applied.
Figure 22:
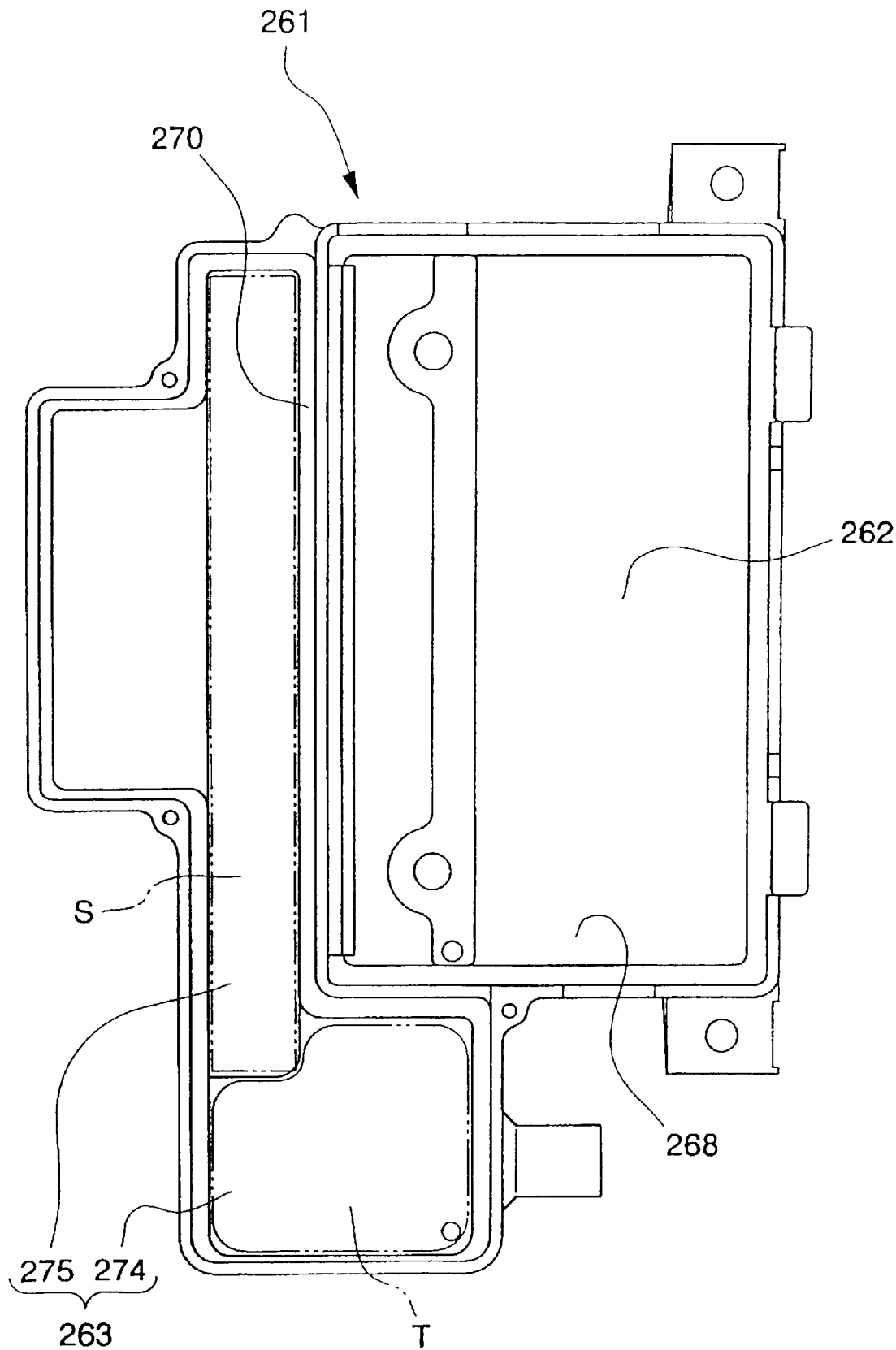
FIG. 22 is a plan view showing the battery case of the motorcycle to which the embodiment of the present invention is applied.
Figure 23:
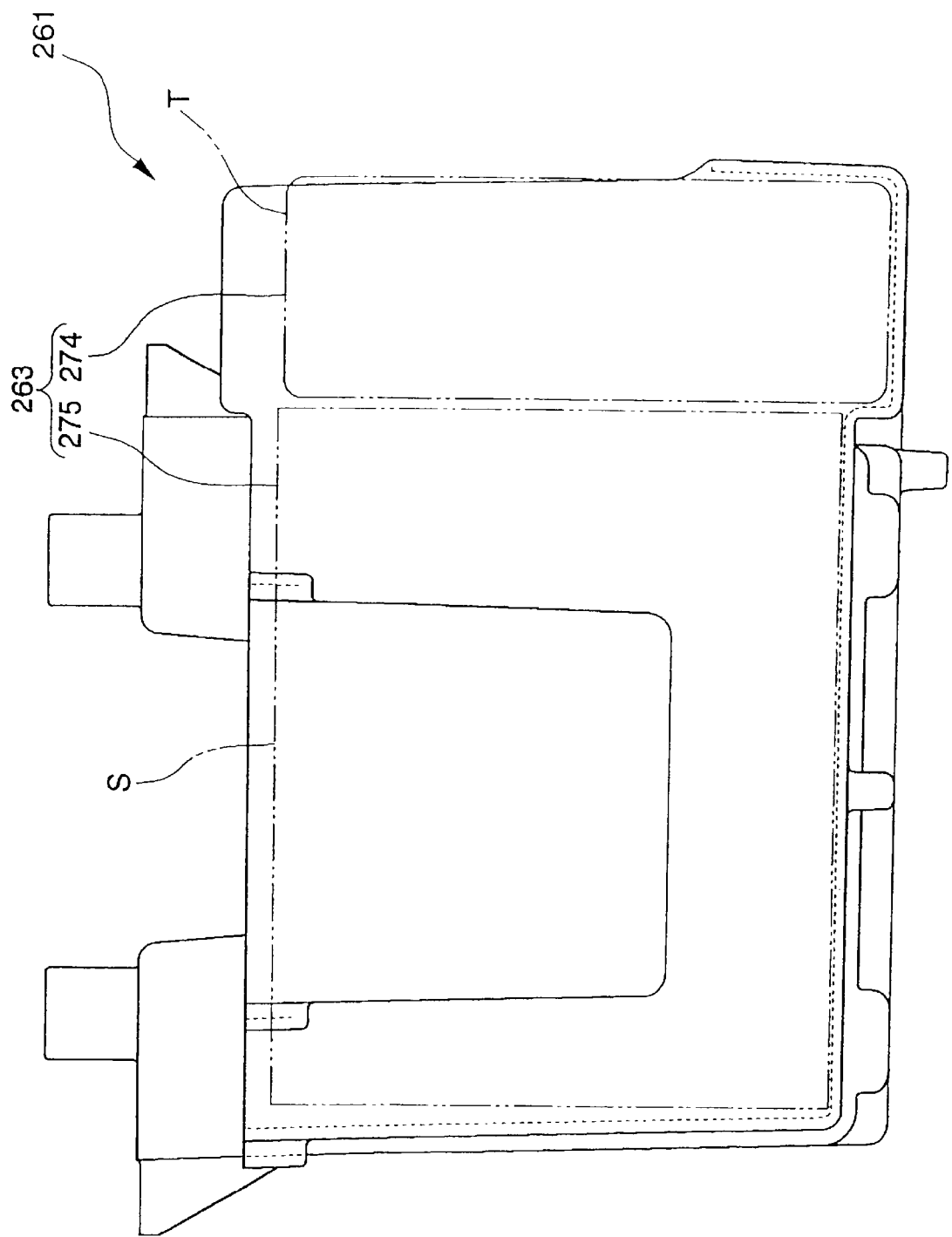
FIG. 23 is a side view showing the battery case of the motorcycle to which the embodiment of the present invention is applied.

The case main body 264 includes a first box-like portion 268 for defining the battery housing portion 262, and a second box-like portion 269, formed on the left side of the first box-like portion 268 in FIGS. 21 and 22, for defining the document/tool housing portion 263. A partition wall 270 is provided between the first box-like portion 268 and the second box-like portion 269 for partitioning them from each other. The case main body 264 is fixed to the body frame 2 side by means of a support stay 271 fixed to the outer side of the case main body 264 (see FIG. 13).

As shown in FIGS. 21 and 24(a) to 24(c), a side portion of the second box-like portion 269, which defines the document/tool housing portion 263, has an opening 273 through which a document S and a tool T are to be taken in or from the document/tool housing portion 263. The document/tool housing portion 263 is divided into an inlet side portion close to the opening 273, which is taken as a tool housing portion 274, and a depth side portion apart from the opening 273, which is taken as a document housing portion 275.

An opening/closing lid 277, which is used to close the above opening 273 formed in a lower side wall of the tool housing portion 274 as shown in FIGS. 24(a) to 24(c), is integrally formed on the second lid 267. The opening/closing lid 277 has a thin portion 278 at a position facing to a corner of an outer wall of the tool housing portion 263 when the opening/closing lid 277 is assembled in the case main body 264. The opening/closing lid 277 is bendable downwardly with the thin portion 278 taken as a bending center. The opening/closing lid 277 has a lock portion 280, and a portion 279 to be locked is provided on the case main body 264. The state of closing the opening 273 with the opening/closing lid 277 can be kept by locking the lock portion 280 with the portion 279 to be locked. A procedure of opening the opening 273 and housing the document S and the tool T in the document/tool housing portion 263 is shown in FIGS. 24(a) to 24(c).

The opening 273 through which the document and the like are to be taken in or out of the document/tool housing portion 263 is located such that when the battery case 261 is mounted to the body frame 2, the opening 273 is exposed from an opening portion among the center pipes 27 and the rear pipes 28.

Figure 25:
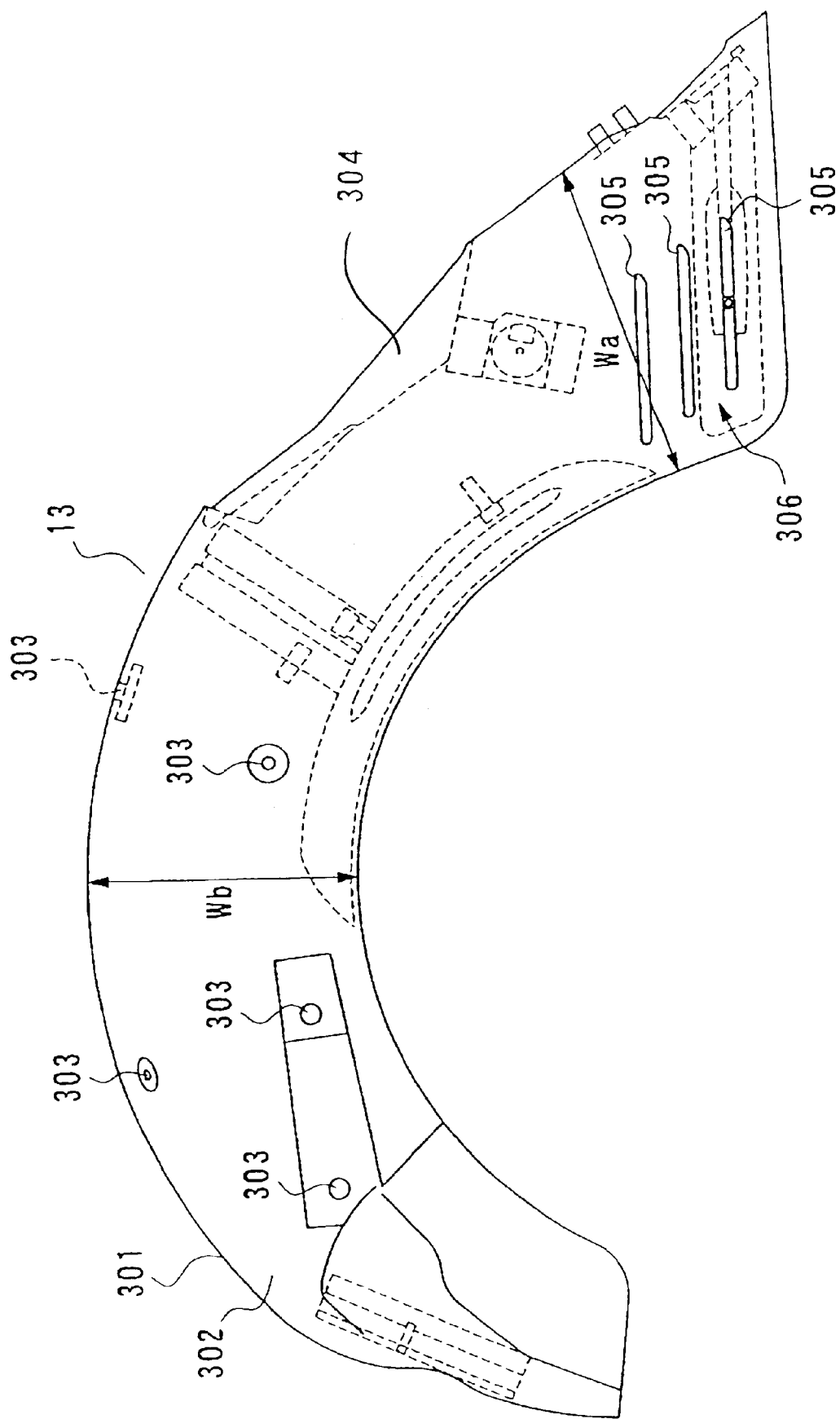
FIG. 25 is a side view of a rear fender of the motorcycle to which the embodiment of the present invention is applied.

The rear fender 13 will be described below. As shown in FIG. 25, the rear fender 13 is obtained by forming a thin plate member such as a steel plate into a U-shape in cross-section by pressing. The rear fender 13 includes a circular-arc plane portion 301 and left and right side plane portions 302. The circular-arc plane portion 301 has circular-arc planes, which are provided along the outer peripheral surface of the rear wheel 12 in such a manner as to be spaced from each other at suitable intervals. The side plane portion 302, which is formed into an approximately fan shape, extends from each of the left and right edges of the circular-arc plane portion 301 toward the center of the rear wheel 12.

A plurality of lock holes 303 for mounting the rear fender 13 are provided in the circular-arc plane portion 301 and the left and right side plane portions 302. The rear fender 13 is mounted to the body frame 2 by fastening bolts, which have passed through the lock holes 303, with nuts. As shown in FIG. 25, the lock holes 303 are located in an approximately central area in the longitudinal direction of the rear fender.

A rear end portion, separated from the area in which the lock holes 303 are located, of the side plane portion 302 of the rear fender 13 is taken as a wide width portion 304. The wide width portion 304 has a width Wa larger than a width Wb of the other portion of the side plane portion 302. The wide width portion 304 has three recessed stripes 305. The recessed stripes 305 extend in the longitudinal direction of the vehicular body in such a manner as to be spaced from each other at intervals. A reinforcing portion 306 composed of the recessed stripes 305 is located at a position offset inwardly (toward the open edge side of the side plane portion 302) from the central portion in the width direction of the side plane portion 302.

The recessed stripes 305 are formed in the rear fender 13 by pressing simultaneously with the pressing work for forming the rear fender 13.

Figure 26:
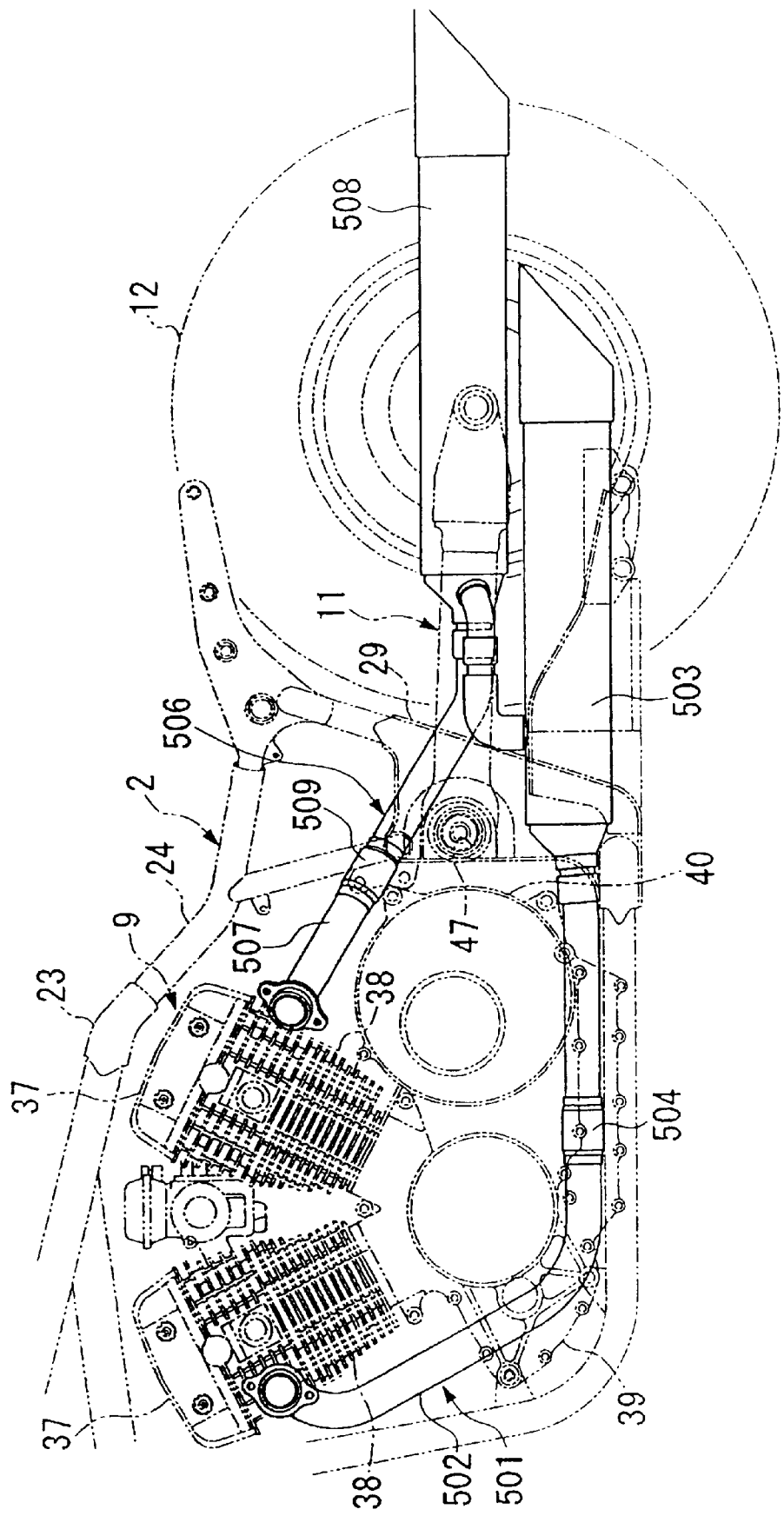
FIG. 26 is a side view of a muffler arrangement structure of the motorcycle to which the embodiment of the present invention is applied.
Figure 27:
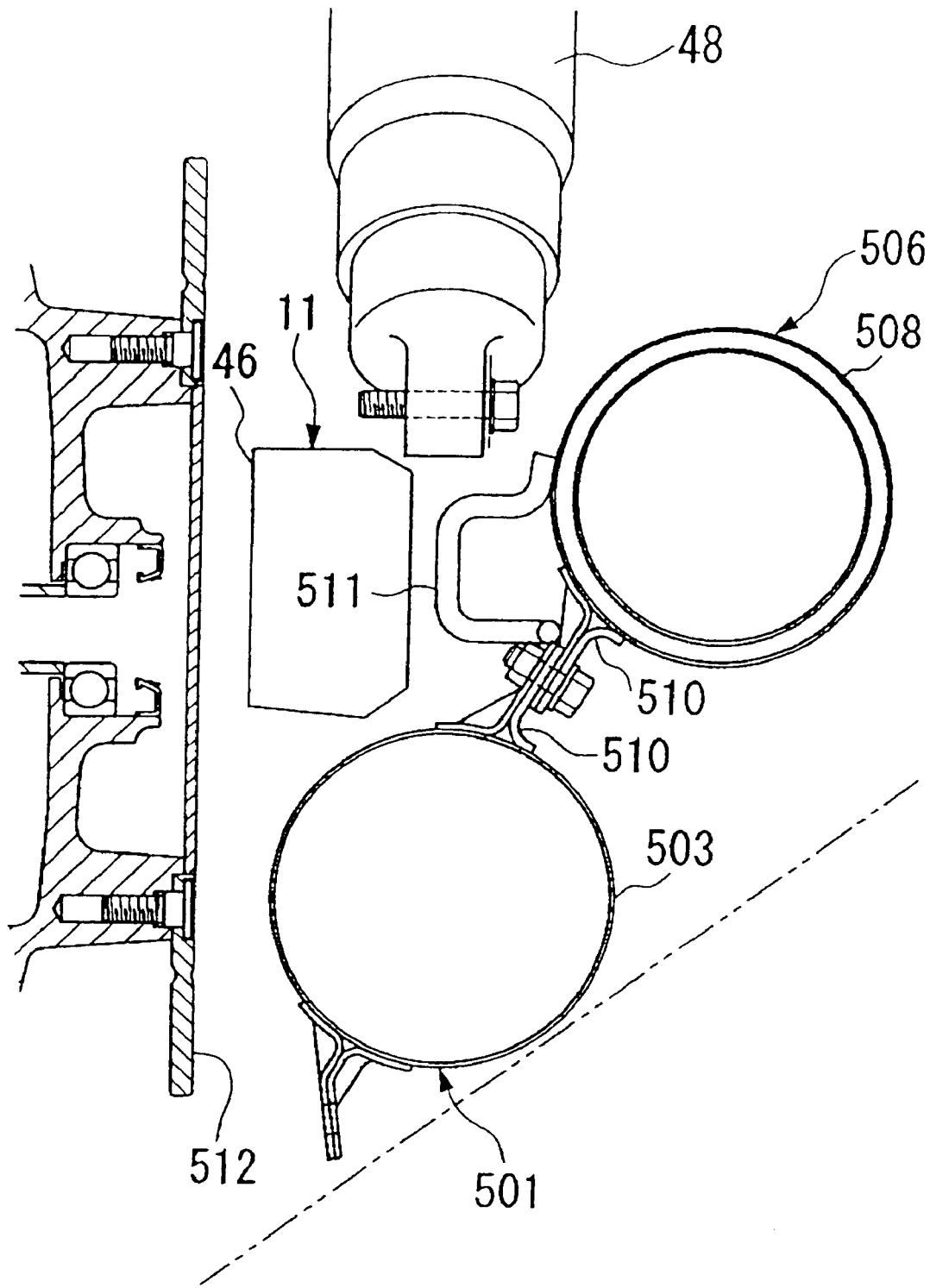
FIG. 27 is a back view of the muffler arrangement structure of the motorcycle to which the embodiment of the present invention is applied.

As shown in FIGS. 26 and 27, a muffler for reducing exhaust noise generated by the engine 9 is connected to the cylinder head portion 37 of each of the cylinder blocks 38. A muffler 501 connected to the cylinder head portion 37 of the front side cylinder block 38 has an exhaust pipe portion 502 connected to the cylinder head portion 37 and a silencer portion 503 for reducing exhaust noise. The silencer portion 503 has a diameter larger than that of the exhaust pipe portion 502. The exhaust pipe portion 502 extends downwardly from a connection end connected to the cylinder block 38, being curved at a position under the engine 9, and extends horizontally along the underside of the crankcase 39 and the transmission 40. The exhaust pipe portion 502 is then connected, on the rear side of the transmission 40, to the silencer portion 503. The silencer portion 503 is disposed on the right side of the vehicular body. A catalyst supporting portion 504 prepared separately from the exhaust pipe portion 502 is assembled in an intermediate portion of the exhaust pipe portion 502. A three way catalytic converter (not shown) is disposed in the catalyst supporting portion 504 for improving a catalytic performance of a starting time by shortening a time required for activation.

A muffler 506 connected to the cylinder head portion 37 of the rear side cylinder block 38 has an exhaust pipe portion 507 connected to the cylinder head portion 37 and a silencer portion 508 for reducing exhaust noise. The silencer portion 508 has a diameter larger than that of the exhaust pipe portion 507. The exhaust pipe portion 507 extends rearwardly from a connection end connected to the cylinder block 38, and extends rearwardly, obliquely downwardly along an upper portion of the transmission 40 and also extends rearwardly in the horizontal direction. The exhaust pipe portion 507 thus extending rearwardly is connected to the silencer portion 508. The silencer portion 508 is disposed on the right side of the vehicular body, which side is the same as that on which the silencer portion 503 is disposed. A catalyst supporting portion 509 prepared separately from the exhaust pipe portion 507 is assembled in an intermediate portion of the exhaust pipe portion 507. A three way catalytic converter (not shown) is disposed in the catalyst supporting portion 509 for improving a catalytic performance of a starting time by shortening a time required for activation.

The silencer portion 503 of the muffler 501 and the silencer portion 508 of the muffler 506 are disposed in the horizontal direction in such a manner as to be separated from each other in the vertical direction. The lower side silencer portion 503 extends in the horizontal direction up to a position at which the rear end thereof becomes closer to the axial line of the rear wheel 12, and the upper side silencer portion 508 extends rearwardly in the horizontal direction more than the silencer portion 503.

As shown in FIG. 27, the silencer portion 503 of the lower side muffler 501 is disposed directly under the right side forked portion 46 of the rear swing arm portion 11. Specifically, the silencer portion 503 is offset downwardly from the right side forked portion 46 of the rear swing arm portion 11 in the vertical direction, and is partially overlapped to the right side forked portion 46 of the rear swing arm portion 11 in the lateral direction.

The silencer portion 508 of the upper side muffler 506 is located outside the lower side silencer portion 503 in the lateral direction, and is located outside the right side forked portion 46 of the rear swing arm portion 11 in the rightward direction. Specifically, the silencer portion 508 is partially overlapped to the right side forked portion 46 of the rear swing arm 11 in the vertical direction, and is offset outwardly from the right side forked portion 46 of the rear swing arm portion 11 in the lateral direction.

The lower side silencer portion 503 and the upper side silencer portion 508 are connected to each other by bolting connecting members 510, which are fixed to both the silencer portions 503 and 508, to each other.

A stopper member 511 is fixed to a portion, on the rear swing arm portion 11 side, of the upper side silencer portion 508. When the motorcycle is turned over, the upper and lower mufflers 501 and 506 are deformed on the vehicular body side in the lateral direction. At this time, the stopper member 511 comes in contact with the rear swing arm portion 11, to restrict more deformation of the upper side muffler 506 on the vehicular body side in the lateral direction, thereby restricting more deformation of the lower side muffler 501 connected to the upper side muffler 506 on the vehicular body side in the lateral direction. As a result, it is possible to prevent the silencer portion 503 of the lower side muffler 501 from being brought into contact with a disk 512 of the disk brake of the rear wheel 12.

Figure 28:
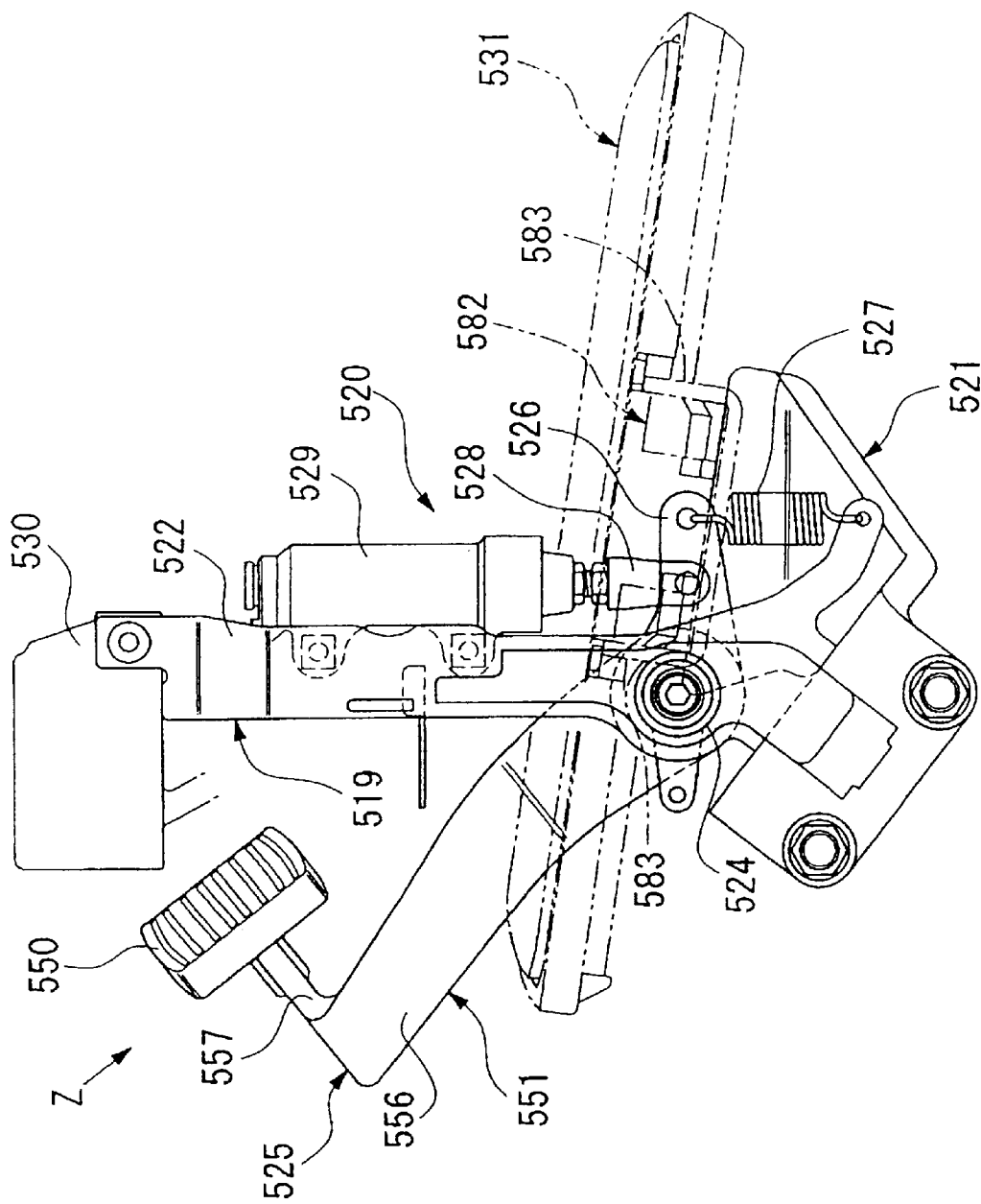
FIG. 28 is a side view of a brake input device of the motorcycle to which the embodiment of the present invention is applied.
Figure 29:
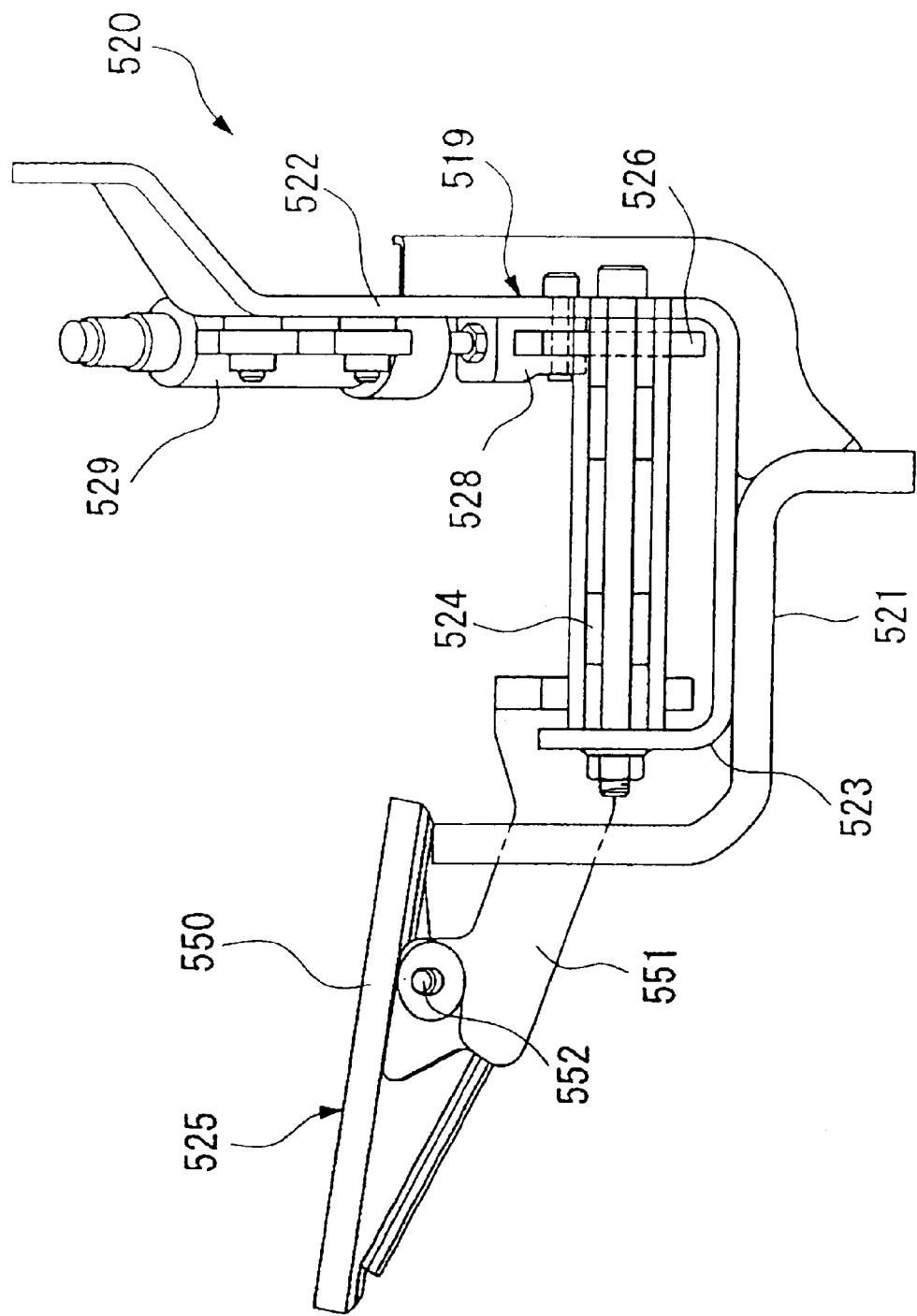
FIG. 29 is a view, seen along an arrow Z of FIG. 28, showing the brake input device of the motorcycle to which the embodiment of the present invention is applied.
Figure 30:
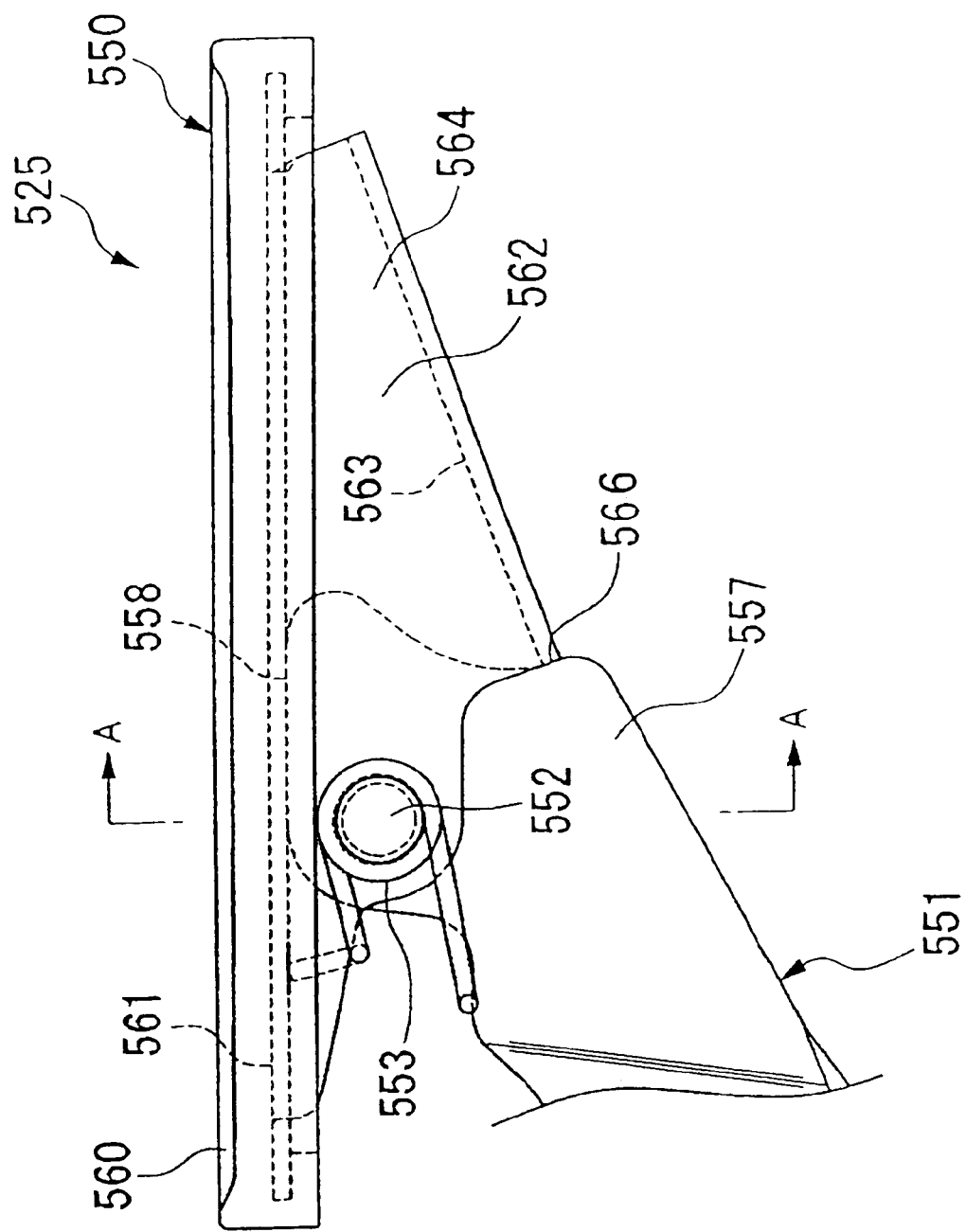
FIG. 30 is a front view of a brake pedal of the motorcycle to which the embodiment of the present invention is applied.
Figure 31:
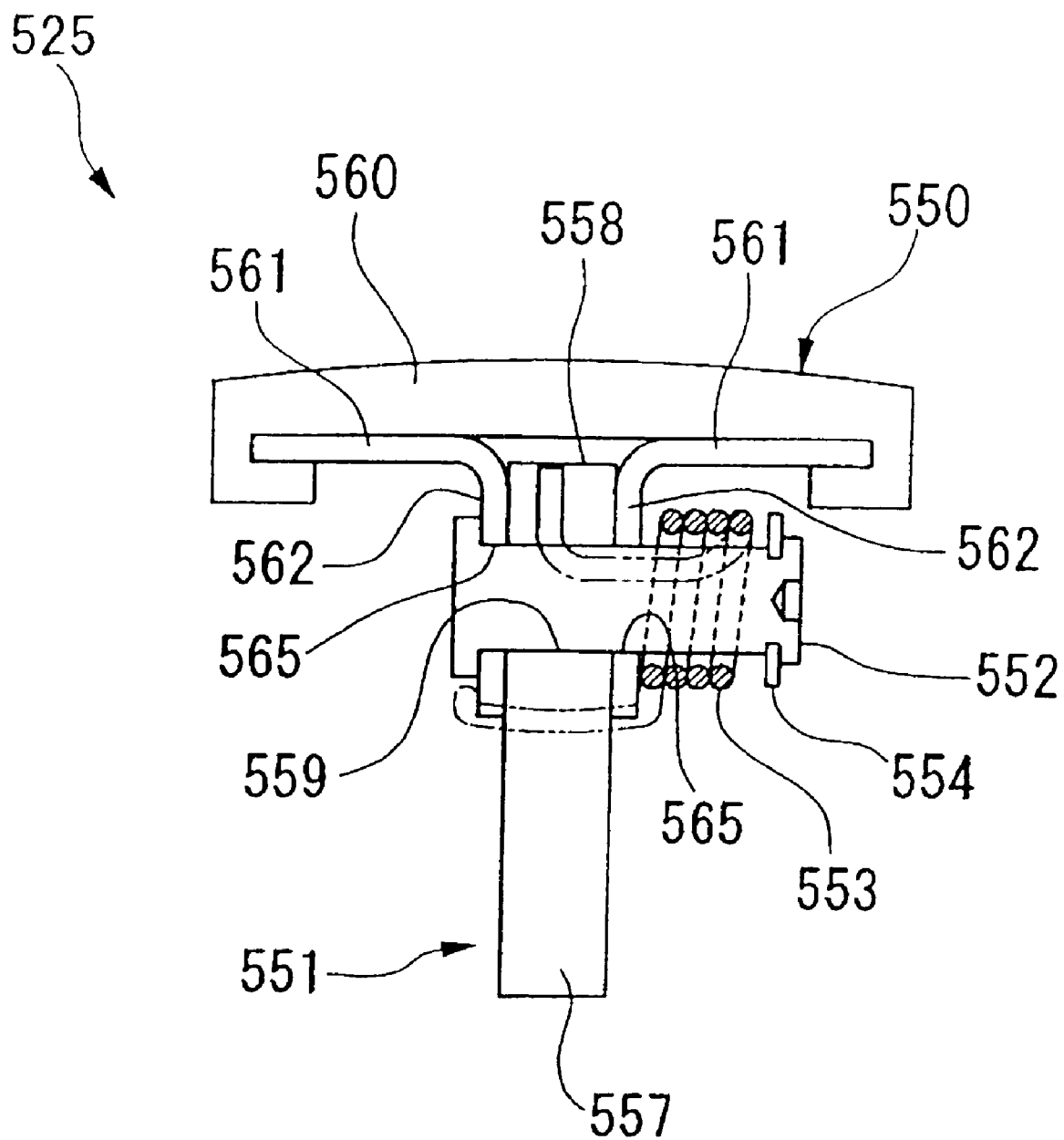
FIG. 31 is a sectional view taken along line A—A of FIG. 30 showing the brake pedal of the motorcycle to which the embodiment of the present invention is applied.
Figure 32:
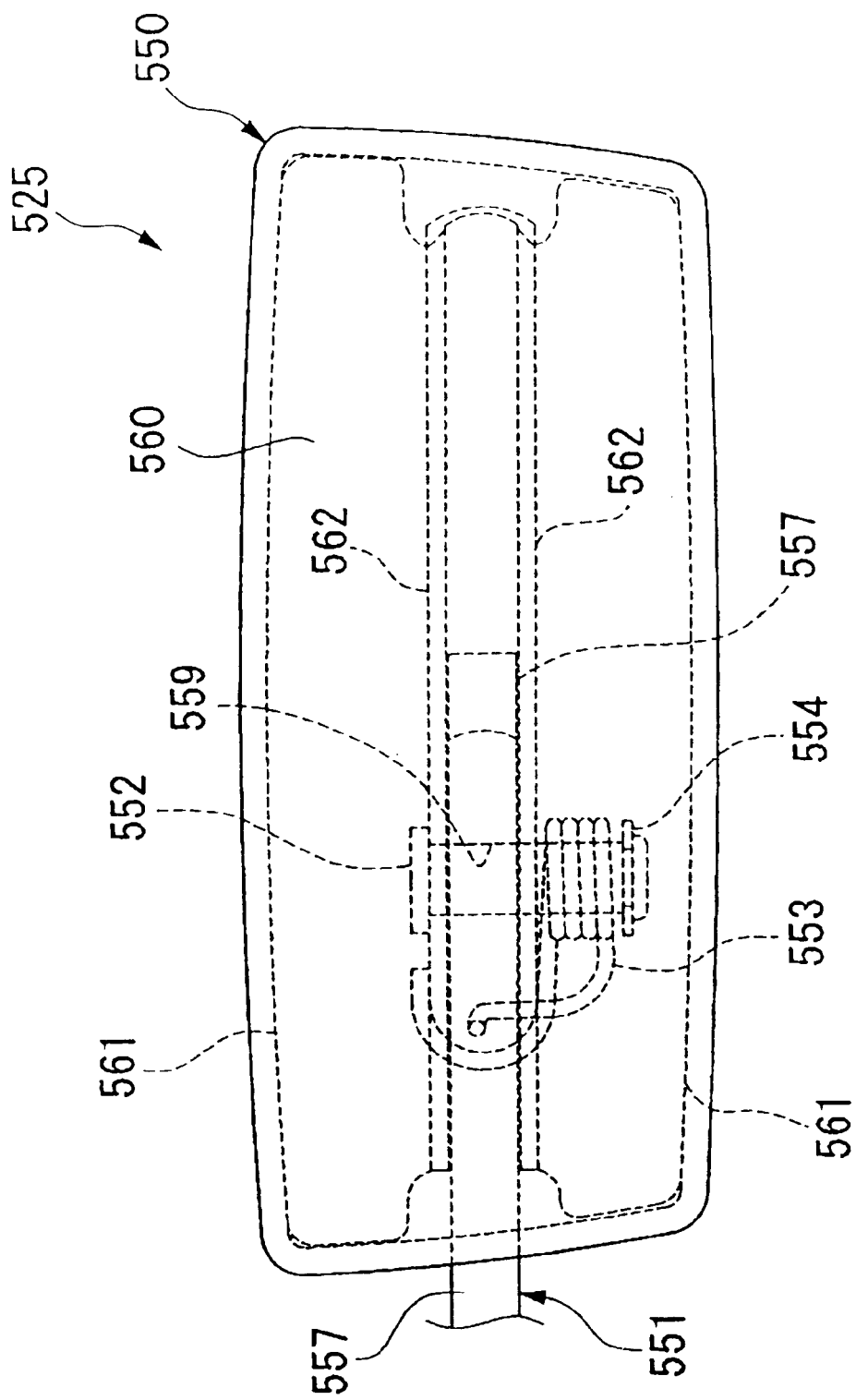
FIG. 32 is a plan view of the brake pedal of the motorcycle to which the embodiment of the present invention is applied.

As shown in FIGS. 28 and 29, a brake input device 520 is mounted to a front end of a lower portion of the right side down pipe 33 of the body frame 2.

The brake input device 520 has a step bracket 521 bolted to the down pipe 33, and an integral stay 519 welded to the step bracket 521. The integral stay 519 has a master cylinder stay portion 522 extending upwardly and a brake pivot holder portion 523.

The brake input device 520 includes a brake pivot shaft (supporting shaft) 524, a brake pedal 525, and a brake arm (operating member) 526. Both the ends of the brake pivot shaft 524 are rotatably supported by the brake pivot holder portion 523 in such a manner as to extend in the lateral direction. The brake pedal 525 is fixed to one end portion, on the right side of the vehicular body, of the brake pivot shaft 524. The brake arm 526 is swingably connected to the other end, on the vehicular body side, of the brake pivot shaft 524. With this arrangement, the brake pedal 525 is located at a position separated rightwardly from the vehicular body by a relatively large distance.

The brake pedal 525 includes a pedal pad portion 550 to which a leg-power is to be applied by a driver, and a pedal lever portion 551 having a base end turnably supported by the vehicular body side and a leading end by means of which the pedal pad portion 550 is swingably supported. A portion, between the base end and the leading end, of the pedal lever portion 551 extends forwardly, obliquely upwardly. The pedal lever portion 551 has a pin 552 for supporting the pedal pad portion 550.

The brake input device 520 has a return spring 527, a master cylinder (operating portion) 529, and a reserve tank 530. The return spring 527 is interposed between the brake arm 526 and the integral stay 519. The master cylinder 529 is mounted on the rear side of the master cylinder stay portion 522, which cylinder has an input portion 528 connected to the brake arm 526. The reserve tank 530 is mounted to an upper end portion of the master cylinder stay portion 522. Brake liquid is supplied from the reserve tank 530 to a master cylinder 529 and is returned from the master cylinder 529 to the reserve tank 530. While not shown, the master cylinder 529 is disposed at a position offset inwardly (toward the inner side of the vehicular body) from the outer end of the down pipe 33 of the body frame 2 in the lateral direction.

A step plate (step member) 531 on which the driver's right foot is to be placed is located in the vicinity of the brake pedal 525 and is supported by the step bracket 521. Meanwhile, on the left side of the vehicular body, on which no brake input device 520 is provided, another step bracket 521 is provided for supporting another step plate 531 on which the driver's left foot is to be placed.

The brake input device 520 configured as described above is operated as follows. When the brake pedal 525 is depressed by the driver, the brake pedal 525 is turned integrally with the brake pivot shaft 524 connected at its one end to the brake pedal 525, whereby the brake arm 526 connected to the other end, apart from the brake pedal 525, of the brake pivot shaft 524 is turned integrally with the brake pivot shaft 524. As a result, the brake arm 526 thus turned pushes upwardly the input portion 528 of the master cylinder 529, thereby causing the master cylinder 529 to generate braking liquid pressure.

As shown in FIGS. 28 to 32, the brake pedal 525 includes the pedal pad portion 550 to which a leg-power is to be applied by a driver, and the pedal lever portion 551 having the base end turnably supported by the vehicular body side and the leading end by means of which the pedal pad portion 550 is swingably supported. The portion, between the base end and the leading end, of the pedal lever portion 551 extends forwardly, obliquely upwardly. The pedal lever portion 551 has the pin 552 for supporting the pedal pad portion 550. The brake pedal 525 also includes a spring 553 biasing the pin 552 inwardly and also biasing the pedal pad portion 550 to one end in the swinging direction, and a washer 554 for preventing slip-off of the pin 552.

The base end of the pedal lever portion 551 is fixed to an end portion, on the outer side of the vehicular body, of the brake pivot shaft 524 disposed along the lateral direction. The portion, extending from the base end fixed to the brake pivot shaft 524, of the pedal lever portion 551 is taken as an extending portion 556. The extending portion 556 is thus turnably supported by the vehicular body side. The extending portion 556 formed into a plate-like shape extends forwardly, obliquely upwardly from the base end side connected to the brake pivot shaft 524, with its thickness direction directed along the lateral direction of the vehicular body.

The pedal lever portion 551 has, at its leading end of the extending portion 556, a supporting portion 557 for swingably supporting the pedal pad portion 550. The supporting portion 557 extends in a direction where it crosses the extending portion 556. The supporting portion 557 formed into a plate-like shape extends rightwardly from the leading end of the extending portion 556, with its thickness direction directed along the length direction of the extending portion 556, and has on its leading end side a projecting portion 558 projecting upwardly. The extending portion 556 and the supporting portion 557 are integrally formed by bending one plate-like member.

The upwardly projecting portion 558, on the leading end side of the supporting portion 557, has a hole portion 559 passing through the projecting portion 558 in the thickness direction.

The pedal pad portion 550 has a pair of planar shaped tread portions 561, a pair of mounting portions 562, and a connection portion 563. The surface side of the tread portions 561 is covered with a cover 560 made from rubber or the like, which cover is to be depressed by the driver. The mounting portions 562, which extend from the tread portions 561 in a direction opposed to the cover 560, are swingably mounted to the supporting portion 557 of the pedal lever portion 551 in a state being mounted to both the sides of the supporting portion 557. The connection portion 563 is provided for connecting the mounting portions 562 to each other on the opposed side to the tread portions 561.

The pair of the tread portions 561 have rectangular shapes extending from the edges, opposite to the connection portion 563, of the mounting portions 562 in the directions reversed to each other in such a manner as to form the same plane. It is to be noted that each of the pair of tread portions 561 extends with its width direction directed along the extending direction.

The mounting portion 562 has a tilt portion 564 tilting with the extended amount from the tread portion 561 becoming small toward one end of the tread portion 561 in the length direction. The connection portion 563 is connected to only the tilt portions 564 of the mounting portions 562, and a hole portion 565 passing through the mounting portion 562 is formed in a portion, to which the connection portion 563 is not connected, of the mounting portion 562.

The pair of tread portions 561, the pair of mounting portions 562, and the connection portion 563 are integrally formed by bending one plate-like member.

In a state that the pair of mounting portions 562 of the pedal pad portion 550 are disposed on both the sides of the supporting portion 557 of the pedal lever portion 551, the pin 552 is inserted in both the hole portions 565 of the mounting portions 562 and the hole portion 559 of the supporting portion 557. The spring 553 is then provided in such a manner so as to bias inwardly the pin 552, and further the washer 554 is engaged in the pin 552. The pedal pad portion 550 is thus supported by the pedal lever portion 551.

At this time, one limit position of a swing motion of the pedal pad portion 550 with respect to the pedal lever portion 551 is determined by the contact of the connection portion 563 of the pedal pad portion 550 to a contact portion 566, opposite to the extending portion 556, of the supporting portion 557 of the pedal lever portion 551. Further, the pedal pad portion 550 is biased, by a biasing force of the spring 553, in the direction where the connection portion 563 is in contact with the contact portion 566. That is to say, the pedal pad portion 550 is usually located at the limit position of swing motion, and in such a usual state, it extends in the lateral direction of the vehicular body. If an external force is applied, from below, to the pedal pad portion 550, the pedal pad portion 550 is turned with its right end side moved upwardly.

Figure 33:
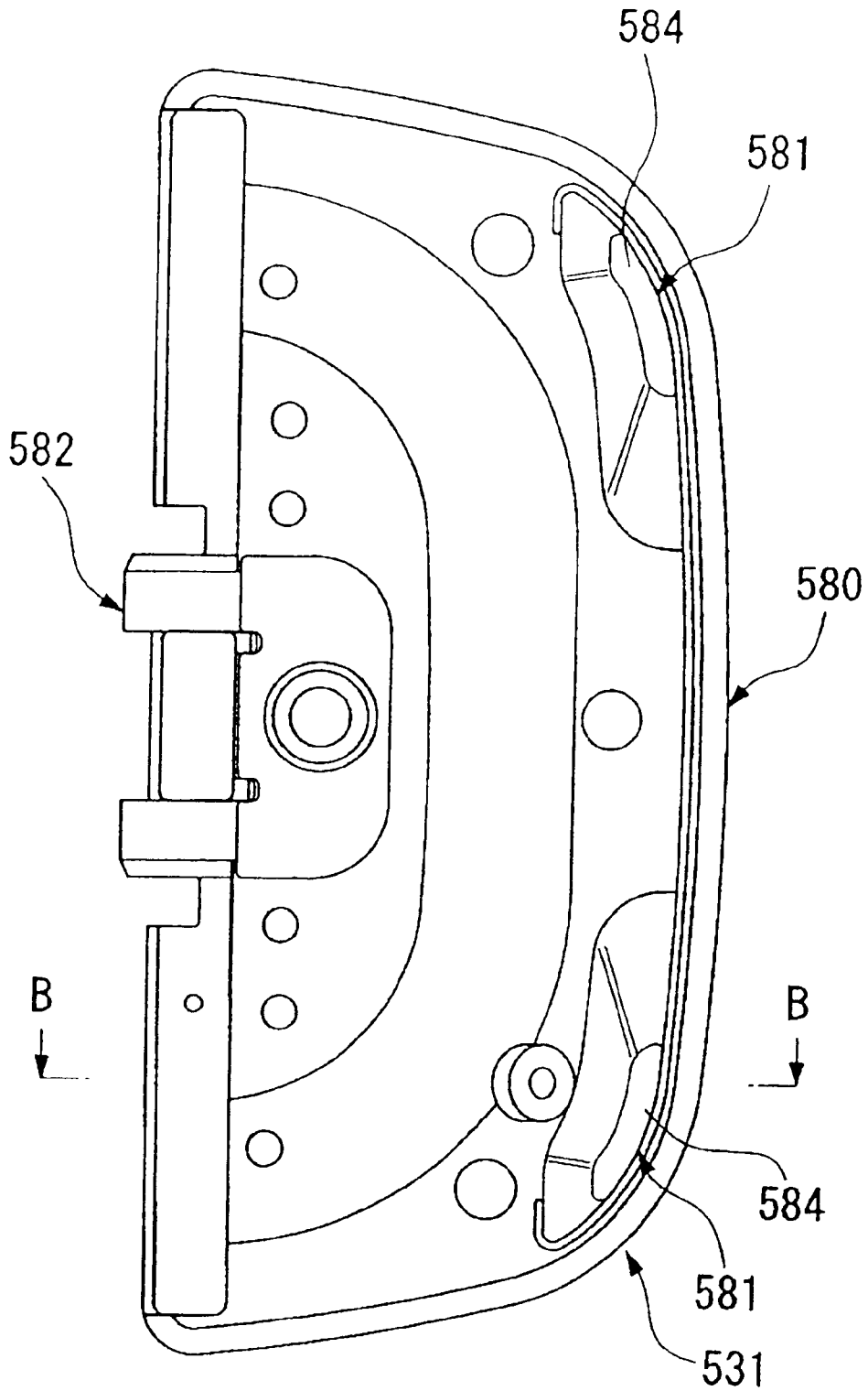
FIG. 33 is a back view of a step plate of the motorcycle to which the embodiment of the present invention is applied.
Figure 34:
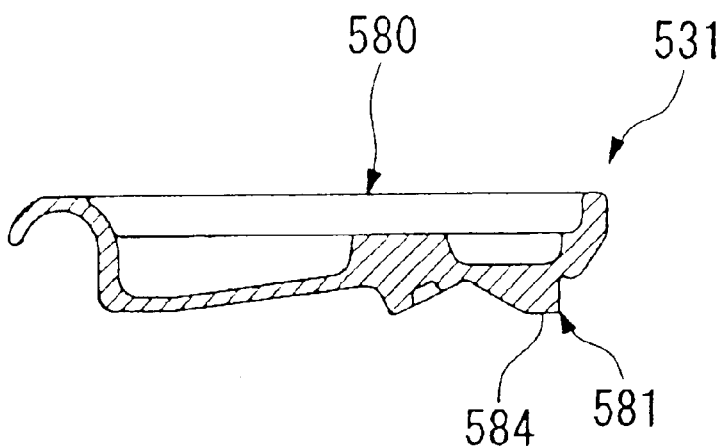
FIG. 34 is a sectional view taken on line B—B of FIG. 33 showing the step plate of the motorcycle to which the embodiment of the present invention is applied.

As shown in FIGS. 33 and 34, the step plate (step device) 531 for allowing the driver's foot to be placed thereon has a foot placing portion 580 on which the driver's foot is to be placed, and two bank sensors 581 projecting downwardly from the foot placing portion 580. The bank sensors 581 are grounded when the vehicular body is tiled.

The foot placing portion 580 is formed into an approximately flat-plate shape. Both corners of one of two long sides, extending in the longitudinal direction, of the foot placing portion 580, are curved. Two mounting portions 582 turnably supported by the step bracket 521 are formed on the other of the two long sides of the foot placing portion 580. As shown in FIG. 28, a pair of forward and rear supporting portions 583 are formed on the step bracket 521 in such a manner so as to extend substantially in the vertical direction. The mounting portions 582 of the step plate 531 are turnably mounted to the supporting portions 583. The step plate 531 in the state being mounted to the step bracket 521 projects outwardly from the vehicular body in the lateral direction, with the longitudinal direction thereof directed along the longitudinal direction of the vehicular body. In such a state, the step plate 531 is swingable with its projecting end directed upwardly.

On the lower surface side of the foot placing portion 580, that is, on the opposed to the mounting portions 582, the bank sensors 581 are formed in such a manner so as to project downwardly from the foot placing portion 580. Each of the bank sensors 581 is longer in the longitudinal direction of the vehicular body and is slightly curved along the corresponding corner of the foot placing portion 580. Both the bank sensors 581 have a mirror symmetry relationship. The bank sensor 581 has, at the bottom surface, an approximately flat ground surface portion 584 that is grounded when the vehicular body is tilted.

The foot placing portion 580 and the two bank sensors 581 are integrally formed on the step plate 531 when the step plate 531 is made from, for example, aluminum alloy by die-casting.

The structures of the supporting portions 583 of the left and right step brackets 521 are identical to each other, and therefore, the step plates 531 having the same shape are mounted to the left and right step brackets 521.

Figure 35:
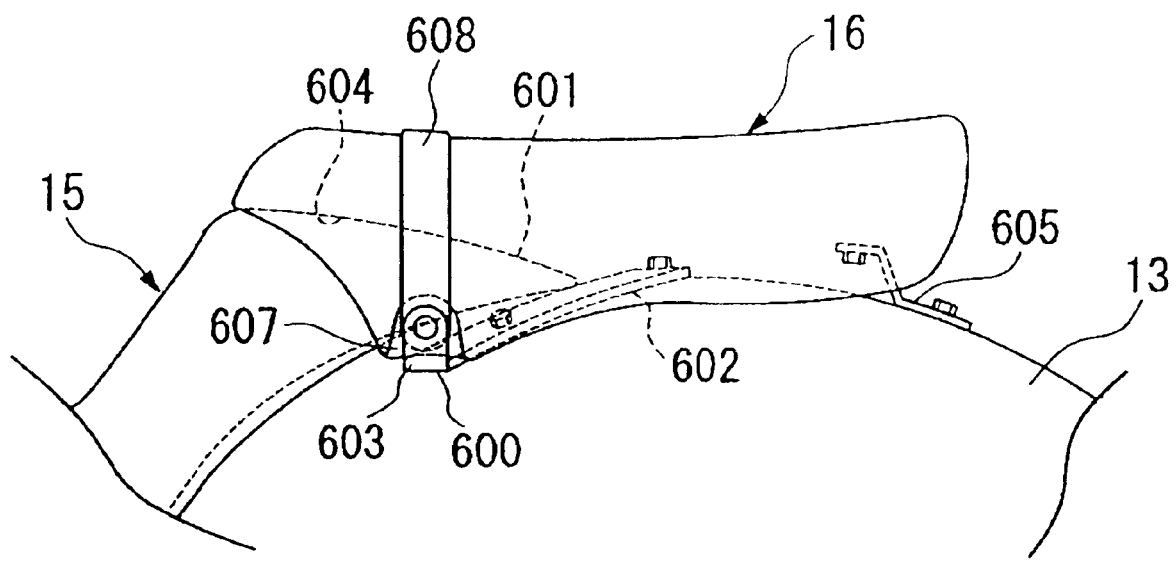
FIG. 35 is a side view of a seat mounting structure of the motorcycle to which the embodiment of the present invention is applied.
Figure 36:
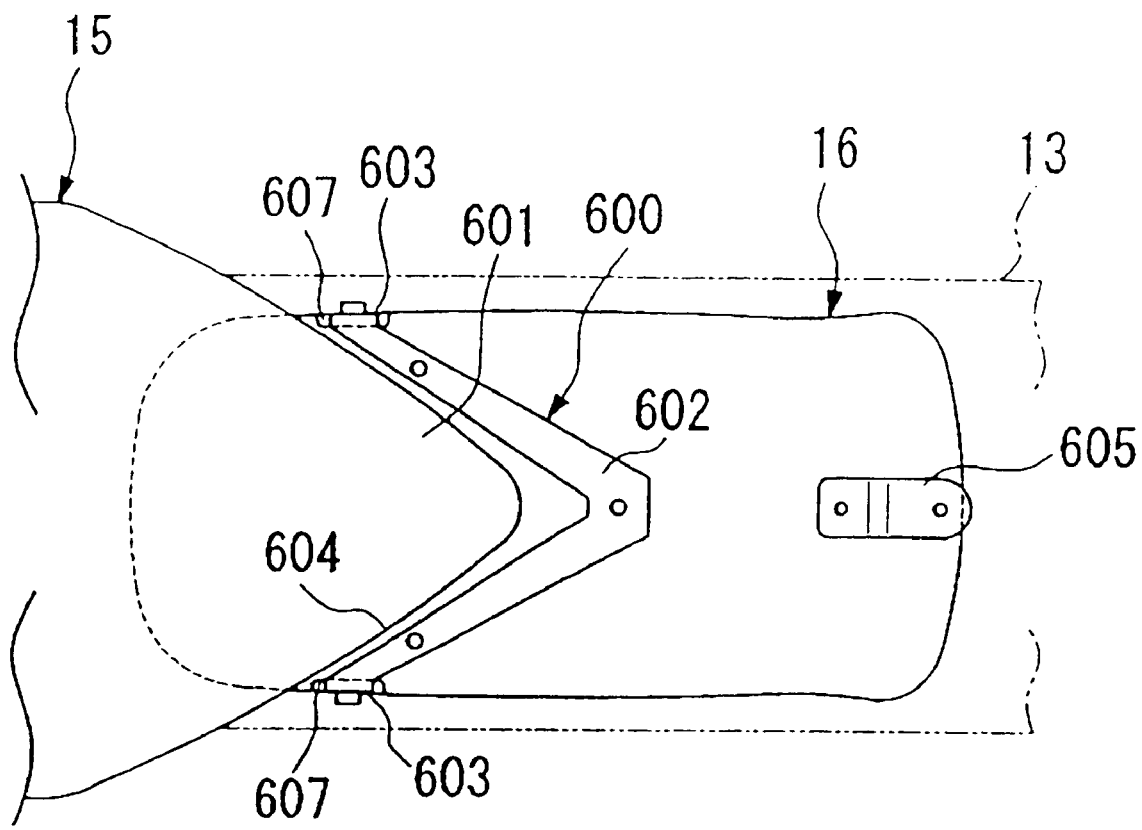
FIG. 36 is a bottom view of the seat mounting structure of the motorcycle to which the embodiment of the present invention is applied.

The rear side of the main sheet 15 is mounted on the rear fender 13, and the pillion seat 16 is also mounted on the rear fender 13 at a position behind the main seat 15. As shown in FIGS. 35 and 36, a front portion of the pillion seat 16 is mounted to the rear fender 13 by mounting a mounting stay 600 to the rear fender 13 and supporting left and right side portions of the pillion seat 16 by the mounting stay 600.

The rear portion of the main seat 15 is formed into a so-called gunfighter type projecting shape. To be more specific, a projecting portion 601 formed into a V-shape in both a plan view and a side view is provided on the rear portion of the main seat 15. The front portion of the main seat 15 is mounted on the body frame 2 and the rear portion of the main seat 15 is mounted on the rear fender 13. In such a state, while not shown, the front portion of the main seat 15 is bolted to a portion, in the vicinity of the fuel tank 14, of the body frame 2, and the rear portion of the main seat 15 is bolted to a stay or the like mounted to the body frame 2.

The mounting stay 600 for mounting the pillion seat 16 has an intermediate portion 602, and two supporting portions 603. The intermediate portion 602 is formed into a V-shape in a plan view, which shape is matched to the shape in a plan view of the projecting portion 601 of the main seat 15. The supporting portions 603 are bent from both the ends of the intermediate portion 602 in the same direction. The mounting stay 600 is mounted to the rear fender 13 by bolting the intermediate portion 602 to the rear fender 13 in a state that the intermediate portion 602 is disposed along the outer side of the projecting portion 601 of the main seat 15, that is, the supporting portions 603 are disposed in front of the intermediate portion 602. At this time, the supporting portions 603 of the mounting stay 600 project from the rear fender 13 in the upwardly vertical direction, with its thickness direction directed to the lateral direction of the vehicular body, and further, the supporting portions 603 are overlapped to the projecting portion 601 of the main seat 15 in the longitudinal direction.

The pillion seat 16 has at its front portion a recess 604 for covering the projecting portion 601 of the main seat 15 fixed to the rear fender 13. A rear mounting stay 605 is mounted to the back surface of a rear portion of the pillion seat 16. Mounting portions 607 are provided on both the sides of the front portion of the pillion seat 16. The pillion seat 16 is placed on the rear fender 13 in such a manner that the projecting portion 601 of the main seat 15 is fitted in the recess 604. In such a state, the left and right mounting portions 607 of the pillion seat 16 are screwed with the left and right supporting portions 603 of the mounting stay 600, and the rear mounting stay 605 on the rear portion of the pillion seat 16 is screwed with the rear fender 13. In the case of mounting the left and right mounting portions 607 of the pillion seat 16 to the left and right supporting portions 603 of the mounting stay 600, both the ends of a seat belt 608 wound around the surface of the pillion seat 16 are co-fastened, together with the mounting portions 607, to the supporting portions 603. In this way, the mounting stay 600 supports even the seat belt 608. Since the recess 604 is formed in the front portion of the pillion seat 16, the wall thickness of the front portion of the pillion seat 16 becomes thin; however, since the projecting portion 601 of the main seat 15 is fitted in the recess 604, the thickness of the front portion of the pillion seat 16 is substantially equivalent to the total of the wall thickness of the front portion of the pillion seat 16 and the thickness of the projecting portion 601.

Figure 37:
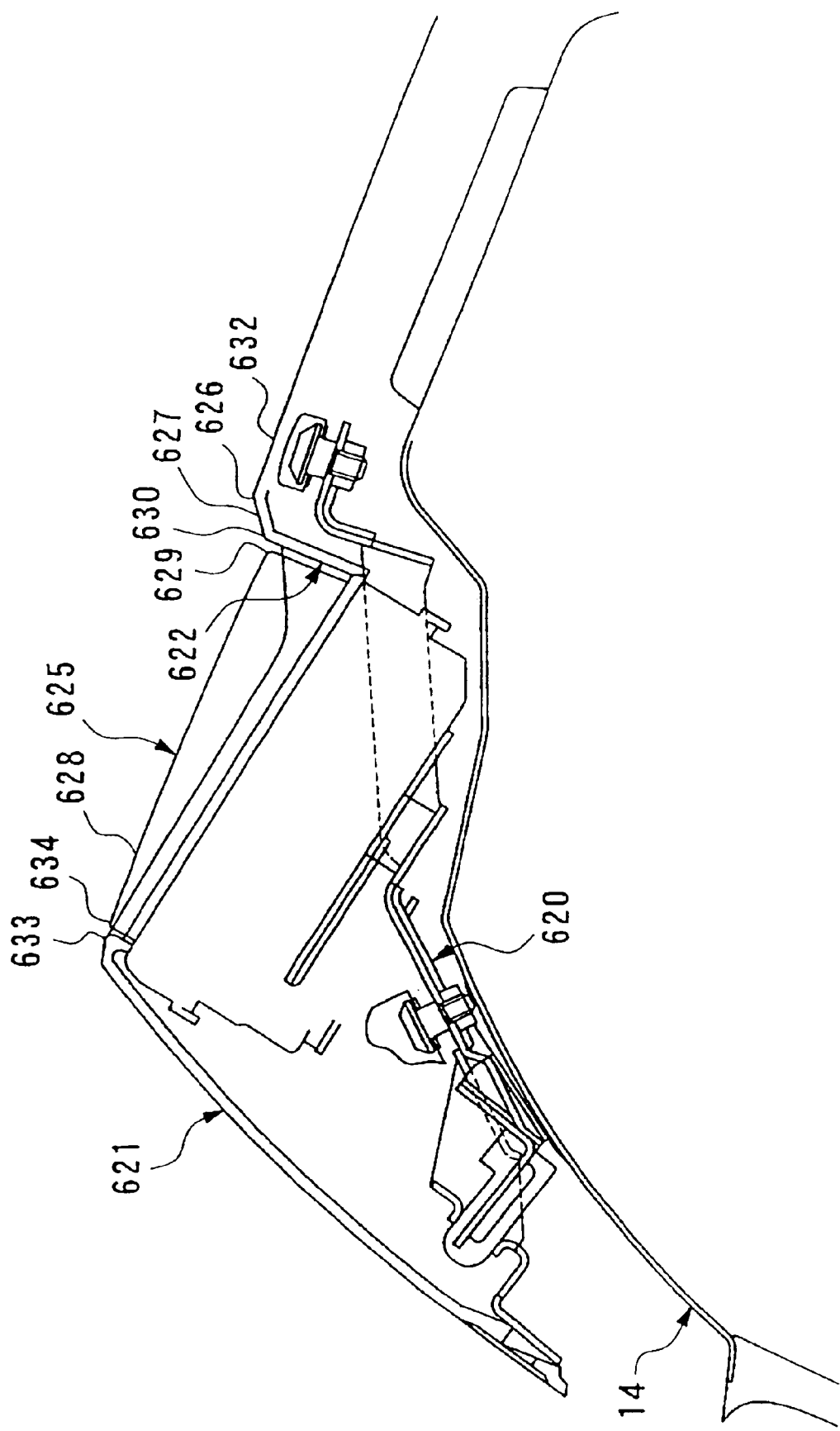
FIG. 37 is a side sectional view of a meter cover of the motorcycle to which the embodiment of the present invention is applied.
Figure 38:
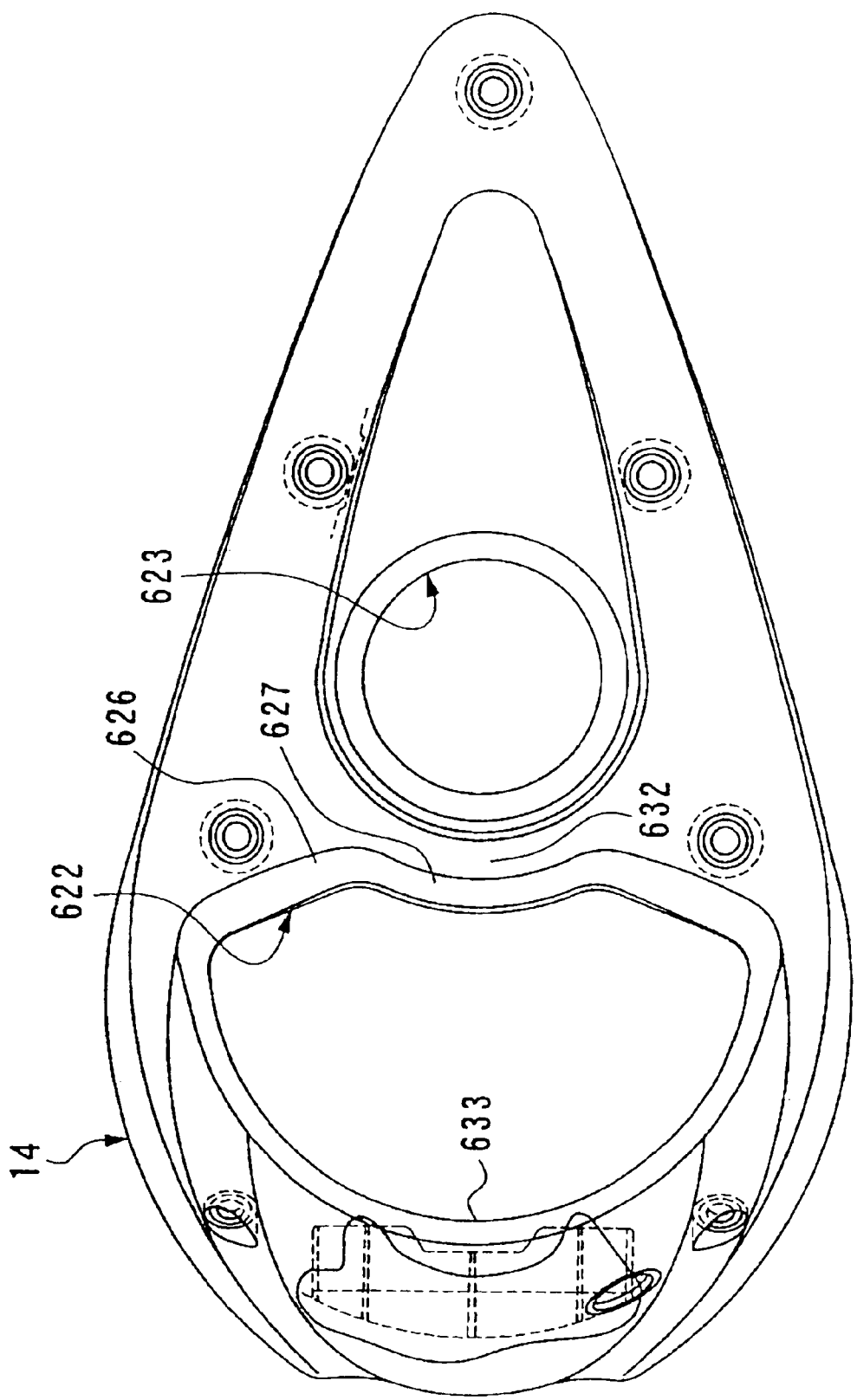
FIG. 38 is a plan view of the meter cover of the motorcycle to which the embodiment of the present invention is applied.

As shown in FIG. 37, a supporting member 620 is mounted on the upper surface side of the fuel tank 14. A meter cover 621, on the surface of which a plating layer is formed, is mounted on the fuel tank 14 via the supporting member 620 and the like. As shown in FIG. 38, a front side opening 622 and a rear side opening 623 are formed in the meter cover 621. The rear side opening 623 is formed into a circular shape, and the front side opening 622 is formed into a fan shape. The center side of the fan-shaped peripheral edge of the opening 622 is slightly recessed into a fan-shape. Meters are disposed inside these openings 622 and 623. Only a meter 625 disposed in the front side opening 622 is depicted in FIG. 37.

A chamfer portion 627 is formed at an edge 626 of the rear side of the front side opening 622 of the meter cover 621. The chamfer portion 627 has a linear cross-section (extending in the longitudinal direction and the vertical direction) tilted downwardly toward the front side. The meter 625 disposed in the opening 622 is set such that the height of a rear side edge 629 of an upper surface portion 628 of the meter 625 is equal to or lower than the height of a lower end 630 of the chamfer portion 627.

A front side edge 633 of the opening portion 622 is disposed on the forward extension of the upper surface portion 632 continuous to a rear portion of the chamfer portion 627 of the meter cover 621. The height of a front side edge 634 of the upper surface portion 628 of the meter 625 is nearly equal to the height of the front side edge 633 of the opening 622.

With this configuration, the tilting angle of the upper surface portion 628 of the meter 625 with respect to the chamfer portion 627 of the meter cover 621 is different from the tilting angle of the upper surface portion 628 of the meter 625 with respect to the upper surface 632 continuous to the rear portion of the chamfer portion 627. To be more specific, the upper surface portion 632 continuous to the rear portion of the chamfer portion 627 is tilted at a specific angle with its front side extending upwardly; the chamfer portion 627 is tilted at a specific angle with its front side extending downwardly; and the upper surface portion 628 of the meter 625 is tilted at a specific angle larger than the tilting angle of the upper surface portion 632 continuous to the rear portion of the chamfer portion 627, with its front side extending upwardly.

Figure 39:
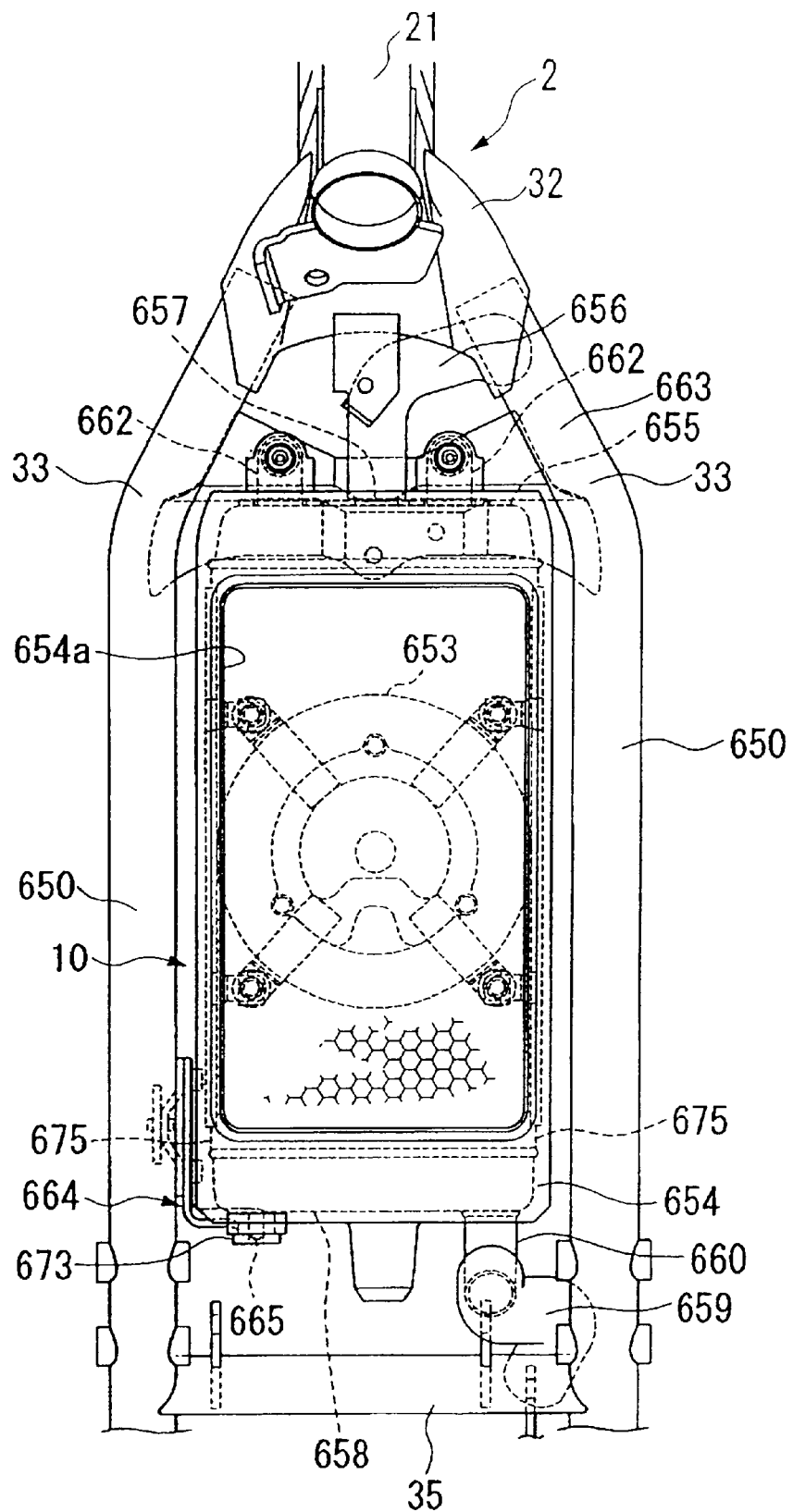
FIG. 39 is a front view of a radiator supporting structure of the motorcycle to which the embodiment of the present invention is applied.
Figure 40:
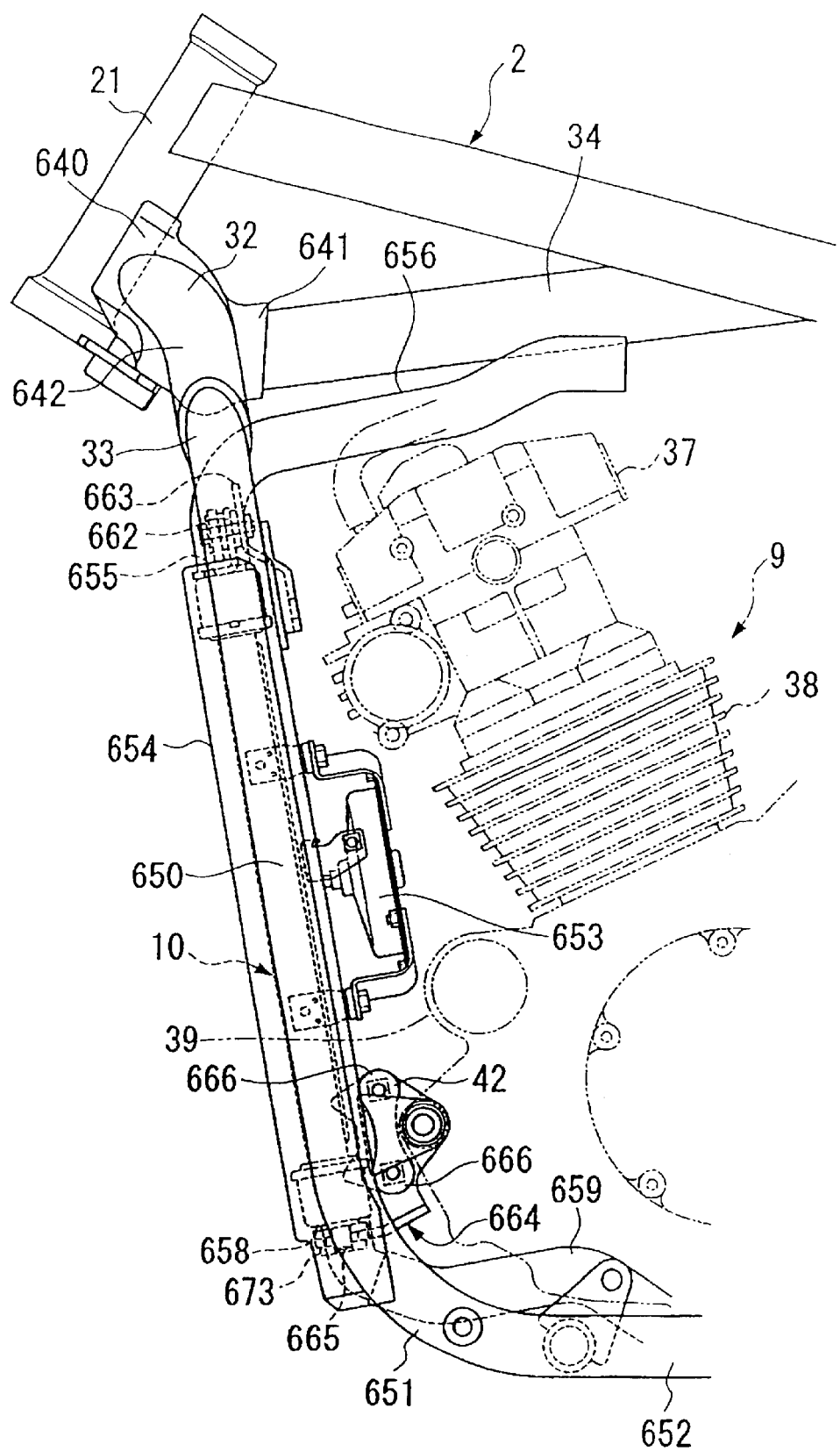
FIG. 40 is a side view of the radiator supporting structure of the motorcycle to which the embodiment of the present invention is applied.
Figure 41:
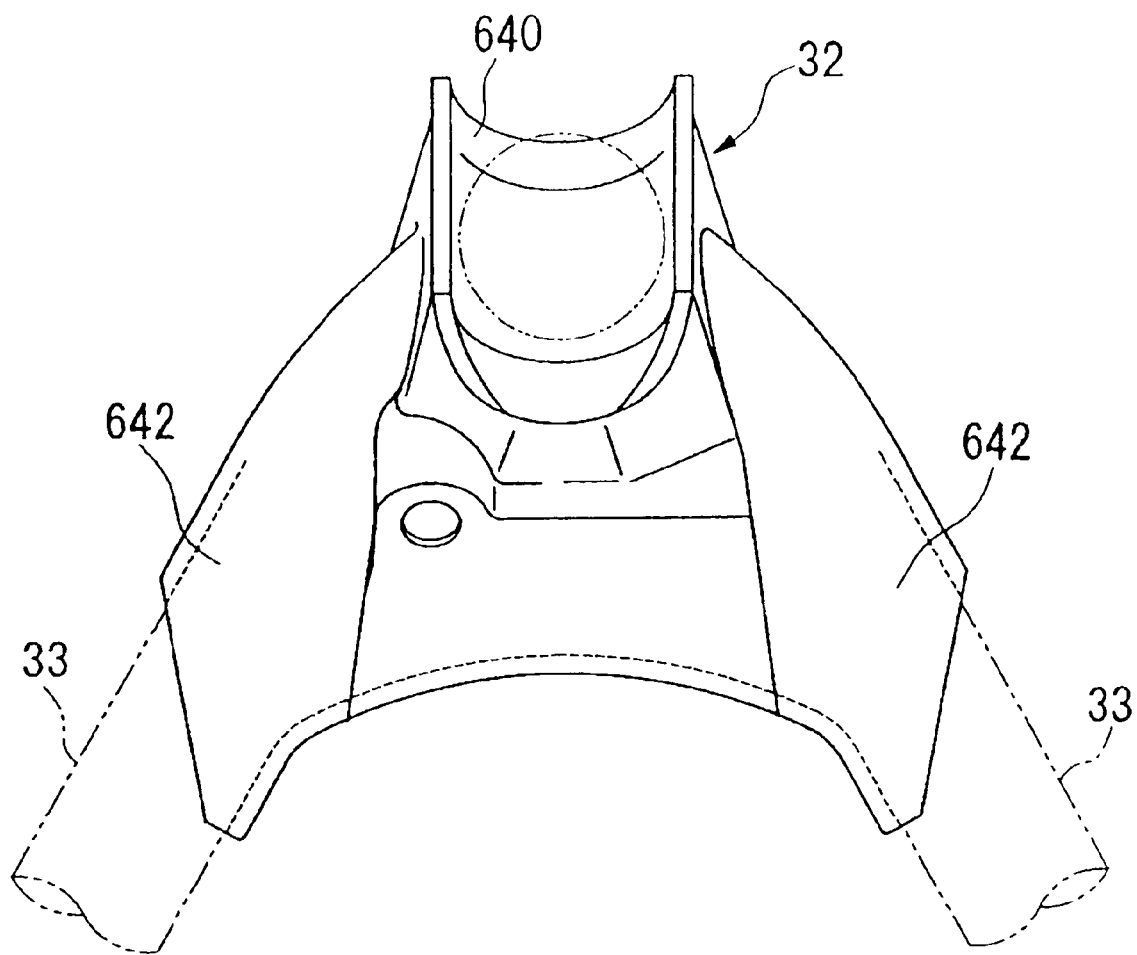
FIG. 41 is a view showing a gusset of the motorcycle to which the embodiment of the present invention is applied.

As shown in FIGS. 39 to 41, the gusset 32 is welded to the head pipes 21 of the body frame 2 for supporting the front forked portions 3. The gusset 32 has a mounting portion 640, a rear fitting portion 641, and a pair of cylindrical lower fitting portions 642. The mounting portion 640 has a shape obtained by cutting a cylinder along a direction parallel to the axial line of the cylinder, which portion is provided on one side of the gusset 32. The rear fitting portion 641 extends in the direction opposed to the mounting portion 640. The lower fitting portions 642 having a mirror symmetry relationship extend between the mounting portion 640 and the rear fitting portion 641. The gusset 32 is formed from white heart malleable cast iron into a relatively free shape by casting using a core. The welding strength of white heat malleable cast iron can be sufficiently improved by decarbonizing it.

The mounting portion 640 of the gusset 32 is brought into contact with the head pipe 21, and all of the periphery of the mounting portion 640 is welded to the head pipe 21, whereby the gusset 32 is fixed to the head pipe 21. A square shaped sub-pipe 34 is fitted in the square pipe shaped rear fitting portion 641 of the gusset 32, and all of the periphery of the sub-pipe 34 is welded thereto, whereby the sub-pipe 34 is fixed to the gusset 32. The cylindrical down pipe 33 is fitted in each of the cylindrical lower fitting portions 642 of the gusset 32, and all of the periphery of the down pipe 33 is welded thereto, whereby both the down pipes 33 are fixed to the gusset 32. Since the gusset 32 is formed from white heat malleable cast iron by casting and each of the sub-pipe 34 and the down pipe 33 is inserted in the corresponding member of the gusset 32 and welded thereto, the sub-pipe 34 and the down pipes 33 can be welded to the gusset 32 without any positioning to the gusset 32. Although the gusset 32 is disposed at a conspicuous portion between the fuel tank 14 and the front forked portions 3, since the gusset 32 is joined to the sub-pipe 34 and the down pipes 33, it is possible to enhance the external appearance of the gusset 32.

The pair of down pipes 33, which are branched leftwardly and rightwardly, via the gusset 32, from the head pipe 21 of the body frame 2 for supporting the front forked portions 3, extend downwardly therefrom. Each of the down pipes 33 includes a lower extending portion 650 extending downwardly from the head pipe 21, a bent portion 651 bent rearwardly from the lower end of the lower extending portion 650, and a rear extending portion 652 extending rearwardly from the lower end of the bent portion 651. The radiator 10 is supported in a state being housed in a space surrounded by the pair of left and right lower extending portions 650.

The radiator 10 having an approximately rectangular shape is supported by the lower extending portions 650 of the down pipes 33 with its longitudinal center line extending along the lower extending portions 650. At this time, the edges of the two longer sides of the rectangular radiator 10 are overlapped to the lower extending portions 650 over the whole length of the radiator 10.

A fan 653 is provided at the back of the radiator 10, that is, on the engine 9 side. A separate cover 654 having an opening 654a is mounted on the front side of the radiator 10. A cooling water inlet 657, to which a cooling water pipe 656 is mounted, is provided in a central portion of an upper surface portion 655 of the radiator 10 in the lateral direction in such a manner as to project upwardly therefrom. A cooling water outlet 660, to which a cooling water pipe 659 is mounted, is provided in one side portion of a lower surface portion 658 of the radiator 10 in the lateral direction in such a manner as to project downwardly therefrom. Cooling water in a state before it is used for cooling is led from the engine 9 side to the cooling water inlet 657 via the cooling water pipe 656, and the cooling water in a state after it is used for cooling is led from the cooling water outlet 660 to the engine 9 side via the cooling water pipe 659.

A pair of left and right upper supporting portions 662 are provided on the upper surface portion 655, which is directed upwardly, of the radiator 10 in such a manner as to project upwardly therefrom. Meanwhile, an upper mounting member 663 is supported by the left and right lower extending portions 650 in such a manner as to connect the lower extending portions 650 to each other and is provided on the upper side of the radiator 10. The pair of left and right upper supporting portions 662 of the radiator 10 are bolted to the upper mounting member 663. The upper portion of the radiator 10 is thus fixed to the lower extending portions 650.

A downwardly directed lower surface portion 658 is provided on a lower portion of the radiator 10. A lower supporting portion 665 is provided on one side of the vehicular body in the lateral direction, concretely, on the right side of the lower surface portion 658 of the radiator 10 in such a manner as to project downwardly therefrom. The lower supporting portion 665 is supported by an engine hanger (supporting member) 664 adapted for supporting the engine 9 to the bracket 42 of the down pipe 33.

Figure 42:
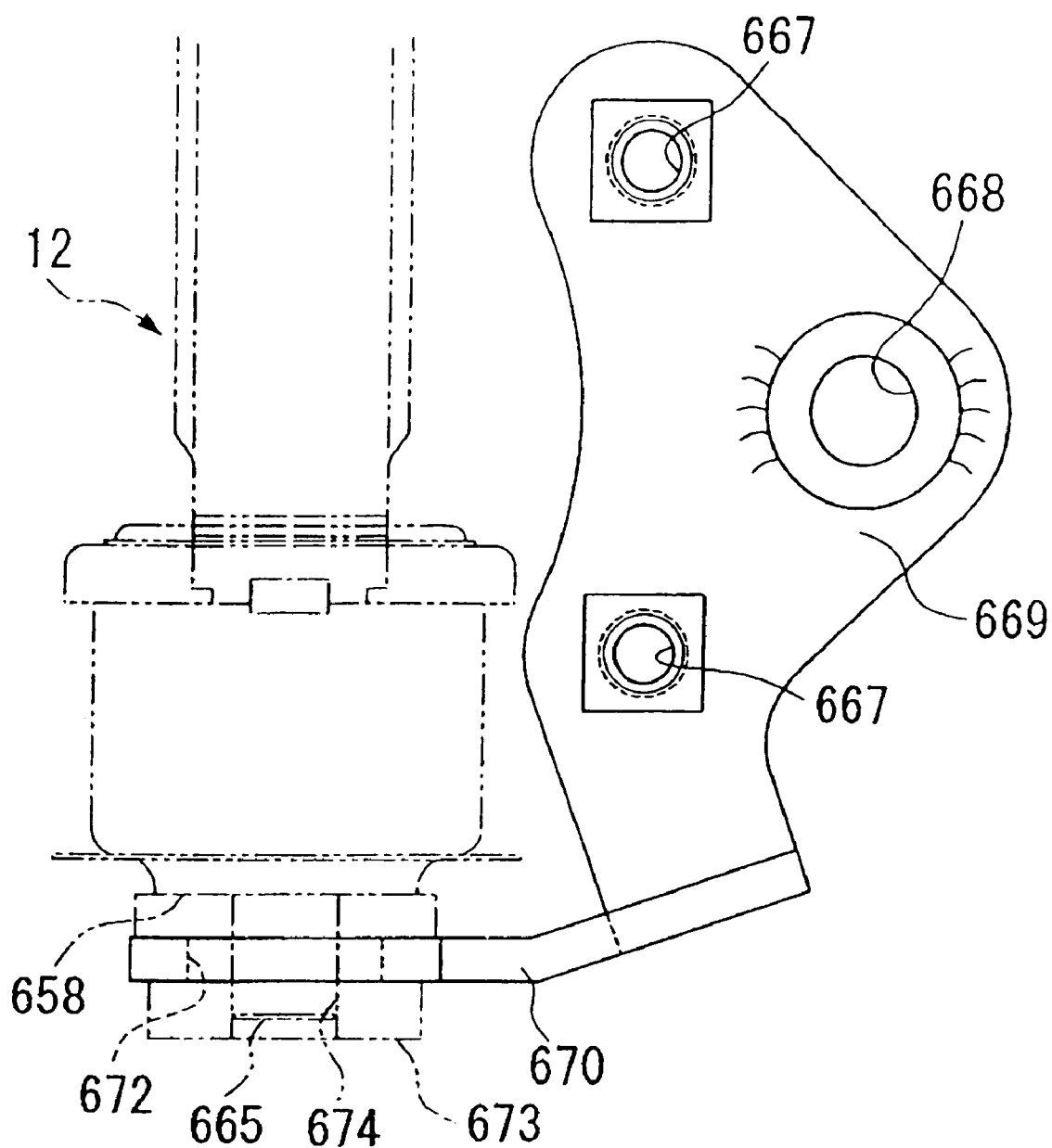
FIG. 42 is a side view of an engine hanger of the motorcycle to which the embodiment of the present invention is applied.

The engine hanger 664 for supporting the engine 9 to the down pipe 33 has a shape shown in FIG. 42. The engine hanger 664 includes a main plate portion 669 and a supporting plate portion 670. The main plate portion 669 has two mounting holes 667 and a supporting hole 668. The mounting holes 667 are used such that bolts having passed through the mounting holes 667 are fastened to upper and lower fixing portions 666 of the bracket 42 welded to the rear side of the lower extending portion 650 shown in FIG. 40. The supporting hole 668 is located at the back of the mounting holes 667 in a state that the engine hanger 664 is fixed to the bracket 42 of the down pipe 33 with the bolts having passed through the mounting holes 667. The supporting hole 668 is used such that a bolt having passed through the supporting hole 668 is fastened to a front end portion of the crankcase 39 of the engine 9. The supporting plate portion 670, which projects forwardly from the main plate portion 669, is used for supporting the radiator 10.

A supporting hole 672 is formed on the front end side of the supporting plate portion 670. A grommet 673 is mounted in the supporting hole 672. The lower supporting portion 665 of the radiator 10 is inserted in an inner fitting hole 674 of the grommet 673. The lower portion of the radiator 10 is thus supported by the lower extending portions 650.

As described above, in the state where the upper supporting portions 662 are bolted to the upper mounting member 663 supported by the lower extending portions 650 and the lower supporting portion 665 is inserted in the grommet 673 of the engine hanger 664 mounted to the right side down pipe 33, the radiator 10 is supported between the left and right supporting portions 650 with its longitudinal center line extending along the lower extending portions 650, wherein the edges of the longer sides of the radiator 10 are overlapped to the lower extending portions 650 over the whole length of the radiator 10. The radiator 10 itself is supported by the down pipes 33 only via the upper supporting portions 662 and the lower supporting portion 665.

Accordingly, in the supporting state of the radiator 10, any other supporting members for connecting the left and right surface portions 675 of the radiator 10 to both the lower extending portions 650 of the down pipes 33 are not provided therebetween. Specifically, in the state being bolted to the fixing members 666 of the down pipe 33, the main plate portion 669 of the engine hanger 664 is positioned behind the lower extending portions 650 as a whole, and therefore, the engine hanger 664 is not positioned between the radiator 10 and the lower extending portions 650.

The above-described front winker (light emitting device) 5 and the rear winker (light emitting device) 17 may be configured as follows.

Figure 43:
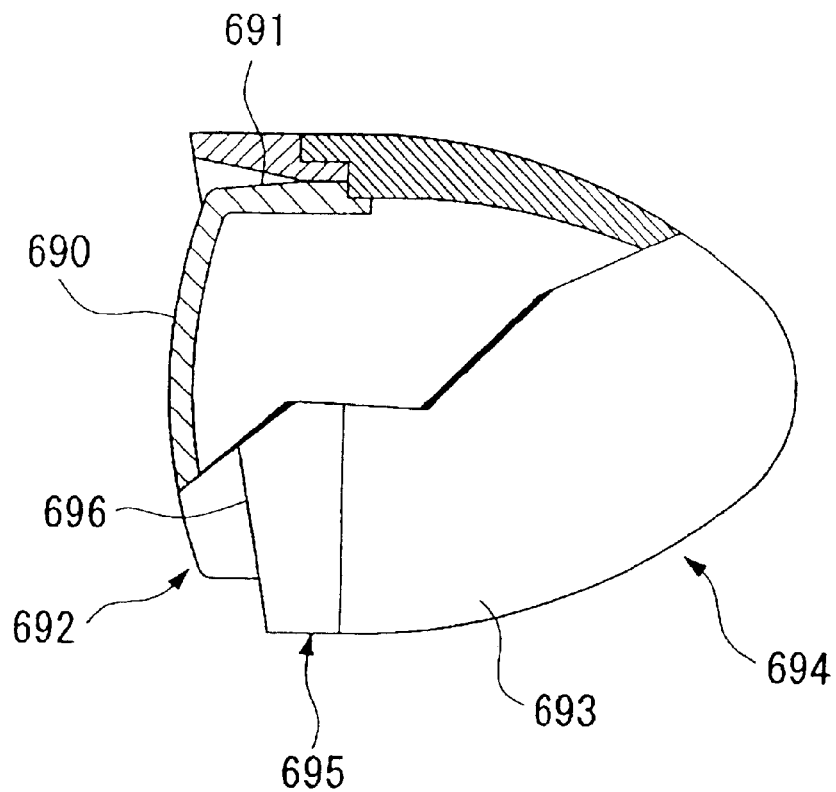
FIG. 43 is a side sectional view of a light emitting device of the motorcycle to which the embodiment of the present invention is applied.
Figure 44:
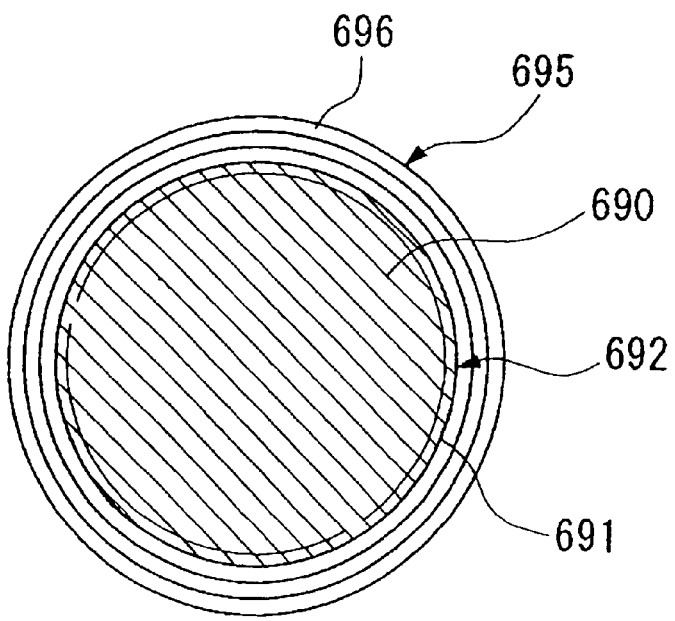
FIG. 44 is a front view of the light emitting device of the motorcycle to which the embodiment of the present invention is applied.
Figure 45:
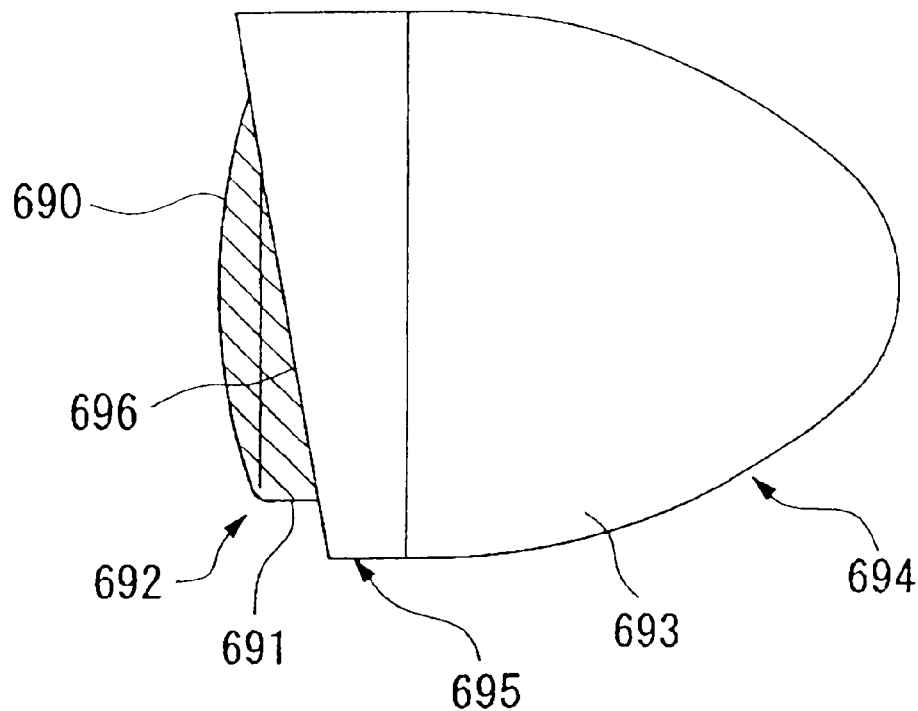
FIG. 45 is a side view of the light emitting device of the motorcycle to which the embodiment of the present invention is applied.

As shown in FIGS. 43 to 45, each of the front winker 5 and the rear winker 17 includes a transparent synthetic resin made lens 692, a light emitting device main body 694, and a non-transparent cover 695. The lens 692 includes a translucent light emitting front surface portion 690 formed into an approximately disk shape, and a translucent light emitting side surface portion 691 formed into an approximately cylindrical shape. An open edge side, opposite to the light emitting front surface portion 690, of the light emitting side surface portion 691, of the lens 692 is mounted to the light emitting device main body 694. The light emitting device main body 694 has a non-transparent housing 693 in which a light emitting portion (not shown) such as a bulb is mounted. The non-transparent cover 695 is separately provided for covering only part of the light emitting side surface portion 691 of the lens 692 mounted to the light emitting device main body 694. The translucent light emitting front surface portion 690 and light emitting side surface portion 691 emits light outwardly by light emission of the internal light emitting portion. The term "front" of the light emitting front surface portion 690 means a primary light emission direction, which is taken as the forward side of the vehicular body for the front winker 5 and is taken as the rearward side of the vehicular body for the rear winker 17.

A front edge portion 696 of the cover 695 is tilted such that the exposure area of the light emitting side surface portion 691 in a side view becomes large toward the lower side of the side surface portion 691, and in other words, the area of the light emitting side surface portion 691 covered with the front edge portion 696 becomes large toward the upper side of the side surface portion 691. The cover 695 is fixed, together with the lens 692, to the housing 693. In addition, a plating layer of, for example, the same color is formed on both the surface of the cover 695 and the surface of the housing 693.

Figure 46:
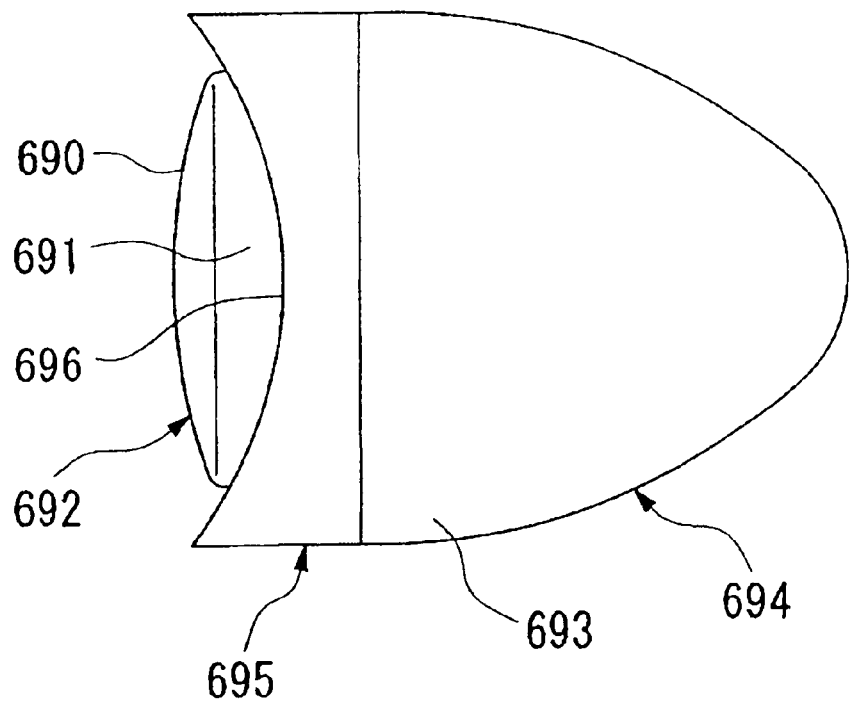
FIG. 46 is a side view of another light emitting device of the motorcycle to which the embodiment of the present invention is applied.

As shown in FIG. 46, the front edge portion 696 of the cover 695 is formed into a circular-arc shape in a side view in such a manner that the exposure area of the light emitting side surface portion 691 of the lens 692 becomes the largest at an intermediate portion in the vertical direction.

According to the meter cover structure in this embodiment, since the chamfer portion 627 having the linear cross-section tilted downwardly toward the front side is formed at the edge portion 626, on the rear side of the opening portion 622, of the meter cover 621, and the upper surface portion 628 of the meter 625 is tilted such that the tilting angle of the upper surface portion 628 of the meter 625 with respect to the chamfer portion 627 of the meter cover 621 is different from the tilting angle of the upper surface portion 628 of the meter 625 with respect to the upper surface portion 632, continuous to the rear end of the chamfer portion 627, of the meter cover 621. As a result, even if light is reflected from both the chamfer portion 627 of the meter cover 621 and the upper surface portion 632, continuous to the rear end of the chamfer portion 627, of the meter cover 621, it is possible to ensure the enhanced visibility of the meter 625.

Further, since the upper surface portion 628 of the meter 625 is not disposed within the same plane as that of each of the chamfer portion 627 and the upper surface portion 632 continuous to the rear end of the chamfer portion 627, even if an object comes in contact with the meter cover 621, the meter 625 can be prevented from being brought into contact with the object. In the case of making the tilting angle of the upper surface portion 628 of the meter 625 with respect to the chamfer portion 627 of the meter cover 621 different from the tilting angle of the upper surface portion 628 of the meter 625 with respect to the upper surface portion 632, continuous to the rear end of the chamfer portion 627, of the meter cover 621, as described above, the height of the rear edge portion 629 of the upper surface portion 628 of the meter 625 is set to be equal to or lower than the height of the lower end portion 630 of the chamfer portion 627, and the height of the front edge portion 634 of the upper surface portion 628 of the meter 625 is set to be equal to the height of the edge portion 633, on the front side of the opening 622, positioned on the extension of the upper surface portion 632 continuous to the rear end of the chamfer portion 627. Accordingly, the upper surface portion 628 of the meter 625 can be sunk from the upper surface portion 632 around the opening 622 of the meter cover 621. As a result, even if an object comes in contact with the meter cover 621, the upper surface portion 628 of the meter 625 can be prevented from being brought into contact with the object.

Accordingly, it is possible to further improve the visibility of the meter 625, and to prevent, even if an object comes in contact with the meter cover 621, the meter 625 from being damaged by the contact with the object.

As described above, according to the meter cover structure of the present invention, since the chamfer portion having the linear cross-section tilted downwardly toward the front side is formed at the edge portion, on the rear side of the opening portion, of the meter cover, and the upper surface portion of the meter is tilted such that the tilting angle of the upper surface portion of the meter with respect to the chamfer portion of the meter cover is different from the tilting angle of the upper surface portion of the meter with respect to the upper surface portion, continuous to the rear end of the chamfer portion, of the meter cover. As a result, even if light is reflected from both the chamfer portion of the meter cover and the upper surface portion, continuous to the rear end of the chamfer portion, of the meter cover, it is possible to ensure the enhanced visibility of the meter. Further, since the upper surface portion of the meter is not disposed within the same plane as that of each of the chamfer portion and the upper surface portion continuous to the rear end of the chamfer portion, even if an object comes in contact with the meter cover, the meter can be prevented from being brought into contact with the object.

Accordingly, it is possible to further improve the visibility of the meter, and to prevent, even if an object comes in contact with the meter cover, the meter from being damaged by the contact with the object.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A meter cover structure including a meter, and a meter cover disposed over a fuel tank, said meter cover having an opening portion in which said meter is disposed comprising:

a chamfer portion having a linear cross-section tilted downwardly toward a front side is formed at an edge portion, on a rear side of said opening portion, of said meter cover; and an upper surface portion of said meter is tilted such that a tilting angle of said upper surface portion of said meter with respect to said chamfer portion of said meter cover is different from a tilting angle of said upper surface portion of said meter with respect to an upper surface portion continuous to the rear end of said chamfer portion of said meter cover.

2. The meter cover structure including a meter, and a meter cover disposed over a fuel tank according to claim 1, wherein said upper surface of said meter is not disposed within the same plane as the upper surface portion continuous to the rear end of the chamfer portion.

3. The meter cover structure including a meter, and a meter cover disposed over a fuel tank according to claim 2, wherein by positioning the upper surface of said meter to not be disposed within the same plane as the upper surface portion continuous to the rear end of the chamfer portion damage to said meter is prevented.

4. The meter cover structure including a meter, and a meter cover disposed over a fuel tank according to claim 1, wherein said linear cross-section of said chamfer portion extends in a longitudinal direction and a vertical direction relative to said meter.

5. The meter cover structure including a meter, and a meter cover disposed over a fuel tank according to claim 1, wherein a height of a rear side edge of said upper surface portion of said meter is set to be substantially equal to a height of a lower end of the chamfer portion.

6. The meter cover structure including a meter, and a meter cover disposed over a fuel tank according to claim 1, wherein a front side edge of said opening is positioned on a forward extension of an upper surface portion adjacent to said chamfer portion and a height of an upper surface portion of said meter is substantially equal to a height of the front side edge.

7. The meter cover structure including a meter, and a meter cover disposed over a fuel tank according to claim 1, wherein a plurality of openings are provided in said meter cover for exposing meters for viewing.

8. A meter cover comprising:

a housing;

a meter disposed within said housing;

a meter cover positioned on said housing;

an opening being provided in said meter cover for viewing said meter;

a chamfer portion having a linear cross-section tilted downwardly toward a front side, said chamfer portion being formed at an edge portion of said housing and being disposed on a rear side of said opening portion of said meter cover; and an upper surface portion of said meter is tilted such that a tilting angle of said upper surface portion of said meter with respect to said chamfer portion of said meter cover is different from a tilting angle of said upper surface portion of said meter with respect to an upper surface portion continuous to the rear end of said chamfer portion of said meter cover.

9. The meter cover according to claim 8, wherein said upper surface of said meter is not disposed within the same plane as the upper surface portion continuous to the rear end of the chamfer portion.

10. The meter cover according to claim 9, wherein by positioning the upper surface of said meter to not be disposed within the same plane as the upper surface portion continuous to the rear end of the chamfer portion damage to said meter is prevented.

11. The meter cover according to claim 8, wherein said linear cross-section of said chamfer portion extends in a longitudinal direction and a vertical direction relative to said meter.

12. The meter cover according to claim 8, wherein a height of a rear side edge of said upper surface portion of said meter is set to be substantially equal to a height of a lower end of the chamfer portion.

13. The meter cover according to claim 8, wherein a front side edge of said opening is positioned on a forward extension of an upper surface portion adjacent to said chamfer portion and a height of an upper surface portion of said meter is substantially equal to a height of the front side edge.

14. The meter according to claim 8, wherein a plurality of openings are provided in said meter cover for exposing meters for viewing.

* * * * *